US011667535B2

(12) United States Patent
Turner et al.

(10) Patent No.: US 11,667,535 B2
(45) Date of Patent: Jun. 6, 2023

(54) METAL BORIDES AND USES THEREOF

(71) Applicant: The Regents of the University of California, Oakland, CA (US)

(72) Inventors: Christopher L. Turner, Lancaster, CA (US); Richard B. Kaner, Pacific Palisades, CA (US); Georgiy Akopov, Ames, IA (US); Michael T. Yeung, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 168 days.

(21) Appl. No.: 16/183,346

(22) Filed: Nov. 7, 2018

(65) Prior Publication Data
US 2019/0135646 A1 May 9, 2019

Related U.S. Application Data

(60) Provisional application No. 62/583,316, filed on Nov. 8, 2017.

(51) Int. Cl.
*C01B 35/04* (2006.01)
*C22C 29/14* (2006.01)
*C22C 1/05* (2006.01)
*C22C 1/051* (2023.01)

(52) U.S. Cl.
CPC .............. *C01B 35/04* (2013.01); *C22C 1/051* (2013.01); *C22C 29/14* (2013.01); *C01P 2002/72* (2013.01); *C01P 2002/77* (2013.01); *C01P 2002/88* (2013.01); *C01P 2004/03* (2013.01)

(58) Field of Classification Search
CPC ......... C01B 35/04; C22C 1/051; C22C 29/14; C01P 2002/72; C01P 2002/77; C01P 2002/88; C01P 2004/03
See application file for complete search history.

(56) References Cited

U.S. PATENT DOCUMENTS

| 3,507,632 | A  | 4/1970  | Swoboda         |
| 3,535,110 | A  | 10/1970 | Hoyt et al.     |
| 5,161,696 | A  | 11/1992 | Seider          |
| 10,125,412 | B2 | 11/2018 | Kaner et al.   |
| 2014/0041313 | A1 | 2/2014 | Kaner et al.   |
| 2017/0209983 | A1 | 7/2017 | Kavanaugh et al. |

FOREIGN PATENT DOCUMENTS

| CN | 106116593 A | 11/2016 |
| EP | 2699703 B1 | 10/2017 |

(Continued)

OTHER PUBLICATIONS

Mohammadi, Reza. "Tungsten tetraboride, an inexpensive superhard material" (Jul. 5, 2011) PNAS vol. 108, No. 27 pp. 10958-10962 (Year: 2011).*

(Continued)

*Primary Examiner* — Pegah Parvini
*Assistant Examiner* — Ross J Christie
(74) *Attorney, Agent, or Firm* — Venable LLP; Henry J. Daley

(57) ABSTRACT

Disclosed herein are compounds, methods, and tools which comprise tungsten borides and mixed transition metal borides.

19 Claims, 12 Drawing Sheets

(56) References Cited

FOREIGN PATENT DOCUMENTS

| WO | WO-2013022503 A2 * | 2/2013 | ............. C23C 30/00 |
| WO | WO-2019094506 A1 * | 5/2019 | ............. C22C 29/14 |

OTHER PUBLICATIONS

Mohammadi, Reza. "Toward Inexpensive Superhard Materials: Tungsten Tetraboride-Based Solid Solutions" (Nov. 21, 2012) JACS vol. 134 pp. 20660-20668 (Year: 2012).*

Mohammadi, Reza. "Enhancing the Hardness of Superhard Transition-Metal Borides: Molybdenum-Doped Tungsten Tetraboride" (Dec. 21, 2015) Chem. Mater. vol. 28 pp. 632-637 (Year: 2015).*

Akopov, Georgiy. "Extrinsic Hardening of Superhard Tungsten Tetraboride Alloys with Group 4 Transition Metals" (Apr. 26, 2016) JACS vol. 138 pp. 5714-5721 (Year: 2016).*

International Search Report and Written Opinion issued in International Application No. PCT/US2018/059680, dated Apr. 11, 2019.

Supplementary Partial European Search Report issued in European Application No. 18 87 5443 dated Nov. 11, 2021.

Itoh et al., "Formation process of tungsten borides by solid state reaction between tungsten and amorphous boron", Journal of Material Science, (Aug. 1, 1987), vol. 22, No. 1, pp. 2811-2815.

Ma et al., "Formation of metastable tungsten tetraboride by reactive hot-pressing", Ceramics Interactional, (Mar. 14, 2017), vol. 43, No. 12, pp. 8551-8555.

Mohammadi et al., "Enhancing the hardness of superhard transition metal borides: molybdenum-doped tungsten tetraboride", Chemistry of Materials, (Dec. 21, 2015) online, vol. 28, No. 2, internal pp. 1-23.

Mohammadi et al., "Tungsten tetraboride, an inexpensive superhard material", PNAS, Jul. 5, 2021, vol. 108, No. 27, pp. 10958-10962.

Office Action issued in corresponding Japanese Patent Application No. 2020-520124 dated Aug. 30, 2022,.

* cited by examiner

METAL BORIDES AND USES THEREOF

CROSS-REFERENCE

This application claims the benefit of U.S. Provisional Application No. 62/583,316, filed Nov. 8, 2017, which application is incorporated herein by reference.

STATEMENT AS TO FEDERALLY SPONSORED RESEARCH

This invention was made with Government support under Grant Numbers 0654431 and 1506860, awarded by the National Science Foundation. The Government has certain rights in the invention.

BACKGROUND OF THE INVENTION

In many manufacturing processes, materials must be cut, formed, or drilled and their surfaces protected with wear-resistant coatings. Diamond has traditionally been the material of choice for these applications, due to its superior mechanical properties, e.g. hardness >70 GPa. However, diamond is rare in nature and difficult to synthesize artificially due to the need for a combination of high temperature and high pressure conditions. Industrial applications of diamond are thus generally limited by cost. Moreover, diamond is not a good option for high-speed cutting of ferrous alloys due to its graphitization on the material's surface and formation of brittle carbides, which leads to poor cutting performance. Metal borides may be an attractive alternative to diamond due to their desirable properties and greater synthetic accessibility.

SUMMARY OF THE INVENTION

Described herein is a method of preparing a composite matrix comprising:
combining a sufficient amount of W with an amount of B and optionally M to generate the composite matrix, wherein the ratio of B to W and M is less than 12 equivalents of B to 1 equivalent of W and M; and
the composite matrix comprises:

$W_{1-x}M_xB_4$ wherein:
W is tungsten;
B is boron;
M is at least one element selected from the group of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), yttrium (Y), osmium (Os), iridium (Ir), lithium (Li) and aluminum (Al); and
x is from 0 to 0.999.

Disclosed herein is a method of producing a thermodynamically stable tungsten tetraboride composite matrix, the method comprising:
a) adding into a compression chamber a mixture of boron (B) and tungsten (W), wherein the ratio of boron to tungsten is between 4 and 11.9 equivalents of boron to 1 equivalent of tungsten;
b) compressing the mixture to generate a compressed raw mixture;
c) adding the compressed raw mixture to a reaction vessel;
d) generating an inert atmosphere within the reaction vessel by applying a vacuum to the reaction vessel, flushing the reaction vessel with inert gas, or a combination thereof; and
e) heating the reaction vessel to a temperature of between about 1200° C. and about 2200° C. to generate the thermodynamically stable $WB_4$ composite matrix.

Disclosed herein is a tool comprising a composite matrix produced by the methods described herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

Various aspects of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
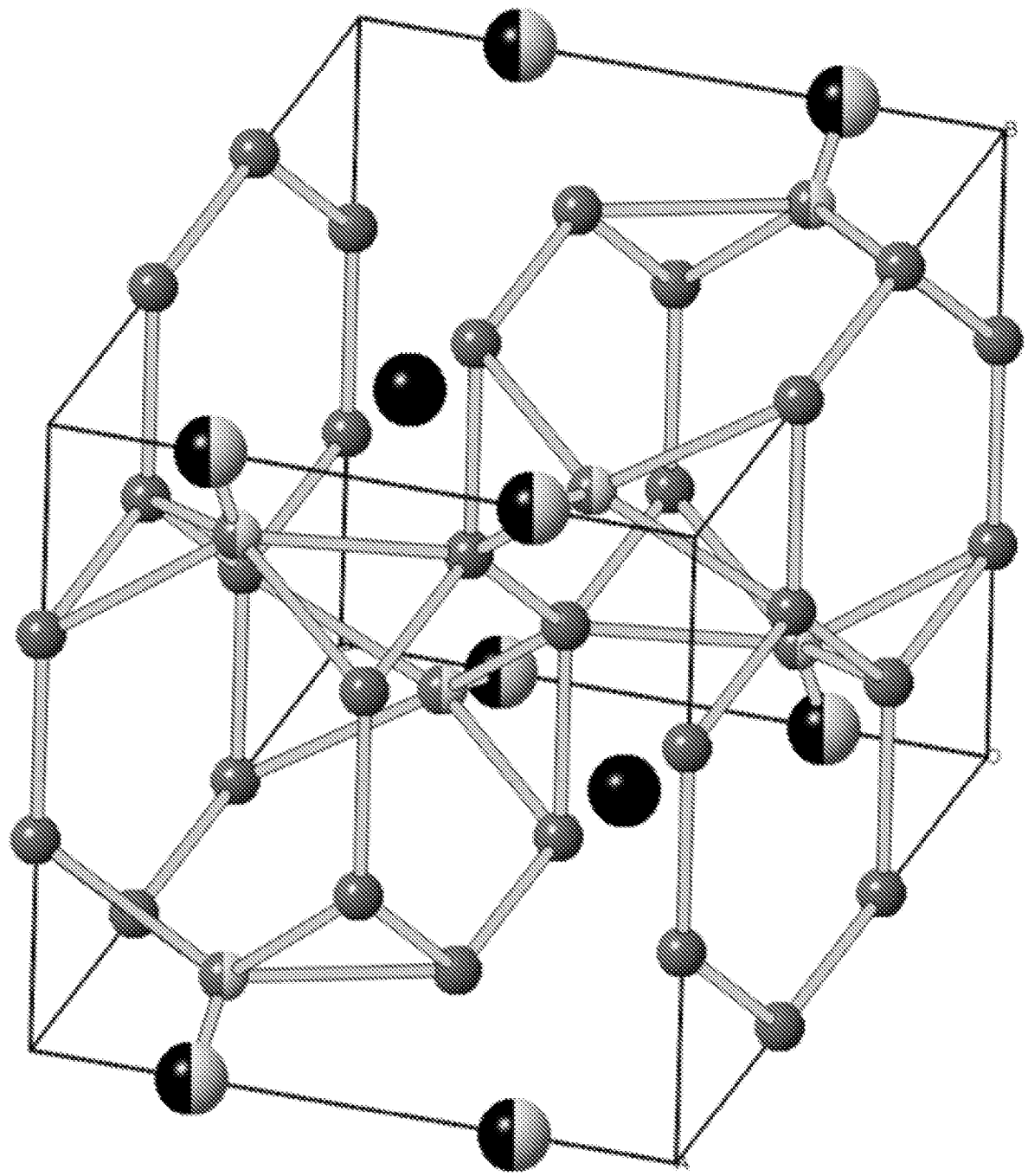
FIG. 1 shows the crystal structure of $WB_4$ as determined by X-ray diffraction techniques.

Tungsten tetraboride is useful as a superhard coating for tools used to cut or abrade. In some instances, tungsten tetraboride is prepared with tungsten and boron at a ratio of 1 equivalent of tungsten to 12 equivalents of boron. In such cases, the high ratio of boron to tungsten eliminates the formation of metal side products such as tungsten monoboride and tungsten diboride, which cannot be separated from the tungsten tetraboride composite. The presence of metal side products negatively affects the mechanical properties of the composite. Furthermore, the excess boron can also be detrimental and expensive in the context of an industrial setting.

Described herein is a method of preparing a composite matrix comprising:

combining a sufficient amount of W with an amount of B and optionally M to generate the composite matrix, wherein the ratio of B to W and M is less than 12 equivalents of B to 1 equivalent of W and M; and the composite matrix comprises:

$W_{1-x}M_xB_4$ wherein:
W is tungsten;
B is boron;
M is at least one element selected from the group of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), yttrium (Y), osmium (Os), iridium (Ir), lithium (Li) and aluminum (Al); and
x is from 0 to 0.999.

In some embodiments, the combining comprises i) mixing W, B, and optionally M to generate a mixture, ii) transferring the mixture to a reaction vessel, and iii) heating the mixture to a temperature sufficient to induce a reaction between W, B, and optionally M to generate the composite matrix.

In some embodiments, the reaction is a solid state reaction. In some embodiments, at least one reaction component is partially melted. In some embodiments, at least one reaction component is completely melted. In some embodiments, the reaction vessel is further subjected under an inert atmosphere after transferring the mixture to the reaction vessel but prior to heating the mixture. In some embodiments, oxygen is removed from the reaction vessel to generate the inert atmosphere.

In some embodiments, a vacuum is applied to the reaction vessel to generate the inert atmosphere. In some embodiments, the vacuum is applied for a time sufficient to remove at least 99% of oxygen from the reaction vessel. In some embodiments, the vacuum is applied for at least 10 minutes, 20 minutes, 30 minutes, or more. In some embodiments, the reaction vessel is purged with an inert gas to generate the inert atmosphere. In some embodiments, the inert gas comprises argon, nitrogen, or helium. In some embodiments, the reaction vessel is subjected to at least one cycle of applying a vacuum and flushing the reaction vessel with an inert gas to remove oxygen from the reaction vessel.

In some embodiments, the mixture is heated to a temperature between about 1200° C. and about 2200° C. In some embodiments, the mixture is heated to a temperature of about 1400° C., 1500° C., 1600° C., 1700° C., 1800° C., 2000° C., 2100° C., or about 2200° C. In some embodiments, the mixture is heated for about 15 minutes, 90 minutes, 120 minutes, 180 minutes, 240 minutes, 360 minutes, or more. In some embodiments, the mixture is heated by an electric arc furnace. In some embodiments, a reaction vessel of the electric arc furnace is subjected to an inert atmosphere after transferring the mixture to the reaction vessel but prior to heating the mixture. In some embodiments, the inert atmosphere is generated by either applying a vacuum to the reaction vessel, flushing the reaction vessel with an inert gas or any combinations thereof. In some embodiments, the reaction vessel is optionally coated with an electrically insulating material. In some embodiments, at most about 95%, 90%, 85%, 80%, 70%, 60%, 50%, 40%, 30%, or less of the surface of the reaction vessel is optionally coated with the electrically insulating material. In some embodiments, the insulating material comprises hexagonal boron nitride (h-BN). In some embodiments, the mixture is heated until a liquid solution is formed.

In some embodiments, the mixture is heated by an induction furnace. In some embodiments, the induction furnace is heated by electromagnetic induction. In some embodiments, the electromagnetic radiation used for electromagnetic induction has the frequency and wavelength of radio waves. In some embodiments, the mixture is heated by hot pressing. In some embodiments, the mixture is heated by plasma spark sintering. In some embodiments, a reaction vessel is subjected to an inert atmosphere after transferring the mixture to the reaction vessel but prior to heating the mixture. In some embodiments, the inert atmosphere is generated by removing oxygen from the reaction vessel in combination with either applying a vacuum to the reaction vessel or flushing the reaction vessel with an inert gas. In some embodiments, the inert gas is high purity argon.

In some embodiments, M is at least one element selected from the group: vanadium (V), chromium (Cr), niobium (Nb), molybdenum (Mo), tantalum (Ta), and rhenium (Re). In some embodiments, x is from 0.001 to 0.999. In some embodiments, x is 0.201-0.400. In some embodiments, x is 0.401-0.600. In some embodiments, x is 0.601-0.800. In some embodiments, x is 0.801-0.999. In some embodiments, the ratio of B to W and M is less than 5 equivalents of B to 1 equivalent of W and M. In some embodiments, the composite matrix comprises W1-xVxB4. In some embodiments, the composite matrix comprises $W_{1-x}Cr_xB_4$. In some embodiments, the composite matrix comprises $W_{1-x}Nb_xB_4$. In some embodiments, the composite matrix comprises $W_{1-x}Mo_xB_4$. In some embodiments, the composite matrix comprises $W_{1-x}Ta_xB_4$. In some embodiments, the composite matrix comprises $W_{1-x}R_exB_4$.

In some embodiments, x is 0. In some embodiments, the ratio of B to W is between about 11.9 and about 9 equivalents of B to 1 equivalent of W. In some embodiments, the ratio of B to W is about 11.6, about 11, about 10.5, about 10, about 9.5, or about 9 equivalents of B to 1 equivalent of W. In some embodiments, the composite matrix comprises $WB_4$. In some embodiments, the composite matrix is formed with a W to B ratio of 1:11.6. In some embodiments, the composite matrix has oxidation resistance below 450° C. In some embodiments, the composite matrix is formed with a W to B ratio of 1:10.5. In some embodiments, the composite matrix is formed with a W to B ratio of 1:9.0. In some embodiments, the composite matrix has oxidation resistance below 465° C.

In some embodiments, the composite matrix has a density at or above 4.0 g/cm3. In some embodiments, the method further generates a metal side product. In some embodiments, the metal side product is tungsten diboride or tungsten monoboride. In some embodiments, the metal side product is less than 10%, 5%, 4%, 3%, 2%, 1%, 0.5%, 0.1%, 0.05%, or 0.01% relative to the percentage of the composite matrix.

Disclosed herein is a method of producing a thermodynamically stable tungsten tetraboride composite matrix, the method comprising:
 a) adding into a compression chamber a mixture of boron (B) and tungsten (W), wherein the ratio of boron to tungsten is between 4 and 11.9 equivalents of boron to 1 equivalent of tungsten;
 b) compressing the mixture to generate a compressed raw mixture;
 c) adding the compressed raw mixture to a reaction vessel;

d) generating an inert atmosphere within the reaction vessel by applying a vacuum to the reaction vessel, flushing the reaction vessel with inert gas, or a combination thereof; and e) heating the reaction vessel to a temperature of between about 1200° C. and about 2200° C. to generate the thermodynamically stable WB$_4$ composite matrix.

In some embodiments, the compressed raw mixture is heated by an electric arc furnace. In some embodiments, the arc furnace electrode comprises graphite or tungsten metal. In some embodiments, the reaction vessel is optionally coated with an electrically insulating material. In some embodiments, at most about 95%, 90%, 85%, 80%, 70%, 60%, 50%, 40%, 30%, or less of the surface of the reaction vessel is optionally coated with the electrically insulating material. In some embodiments, the insulating material comprises hexagonal boron nitride (h-BN). In some embodiments, the insulating material does not contain carbon. In some embodiments, the compressed raw mixture is shielded from the arc furnace electrode by the electrically insulating material, optionally comprising hexagonal boron nitride.

In some embodiments, the composite matrix is composed of grains or crystallites that are less than 1000 micrometer in size. In some embodiments, the composite matrix is composed of grains or crystallites that are less than 100 micrometer in size. In some embodiments, the composite matrix is composed of grains or crystallites that are less than 50 micrometer in size. In some embodiments, the composite matrix is composed of grains or crystallites that are less than 10 micrometer in size. In some embodiments, the composite matrix is composed of grains or crystallites that are less than 1 micrometer in size.

In some embodiments, the compressed raw mixture is heated by an induction furnace. In some embodiments, the induction furnace is heated by electromagnetic induction. In some embodiments, the electromagnetic radiation used for electromagnetic induction has the frequency of radio waves. In some embodiments, the mixture is heated by hot pressing. In some embodiments, the mixture is heated by plasma spark sintering. In some embodiments, the reaction vessel is water cooled. In some embodiments, the reaction vessel is graphite lined. In some embodiments, graphite is heated within the reaction vessel. In some embodiments, the compressed raw mixture is shielded from the graphite lined reaction vessel by an electrically insulating material, optionally comprising hexagonal boron nitride.

In some embodiments, the composite matrix is composed of crystallites that are less than 500 micrometers in size. In some embodiments, the composite matrix is composed of crystallites that are less than 200 micrometers in size. In some embodiments, the composite matrix is composed of crystallites that are less than 50 micrometers in size.

In some embodiments, the density of the composite matrix is between about 5.0 g/cm3 and about 7.0 g/cm3. In some embodiments, the density of the composite matrix is between about 5.1 g/cm3 and about 6.2 g/cm3.

In some embodiments, the composite matrix is formed with a W to B ratio of 1:11.6. In some embodiments, the composite matrix has oxidation resistance below 450° C. In some embodiments, the composite matrix is formed with a W to B ratio of 1:10.5. In some embodiments, the composite matrix is formed with a W to B ratio of 1:9.0. In some embodiments, the composite matrix has oxidation resistance below 465° C. In some embodiments, the composite matrix has a density at or above 4.0 g/cm$^3$.

Described herein is a method of producing a composite matrix of Formula (II):

$$W_{1-x}M_xB_4 \qquad (II)$$

wherein:

W is tungsten;

B is boron;

M is at least one element selected from the group of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), yttrium (Y), osmium (Os), iridium (Ir), lithium (Li) and aluminum (Al);

x is from 0.001 to 0.999; and wherein the method comprises:

a) adding into a compression chamber a mixture of boron, tungsten, and M, wherein the ratio of boron to tungsten and M is between 3.5 and 5.0 equivalents of boron to 1 equivalent of tungsten and M;

b) compressing the mixture to generate a compressed raw mixture;

c) adding the compressed raw mixture to a reaction vessel;

d) generating an inert atmosphere within the reaction vessel by applying a vacuum to the reaction vessel, flushing the reaction vessel with inert gas, or a combination thereof; and e) heating the reaction vessel to a temperature of between about 1200° C. and about 2200° C. to generate the composite matrix of Formula (II).

In some embodiments, the compressed raw mixture is heated by an electric arc furnace. In some embodiments, the arc furnace electrode is made of graphite or tungsten metal. In some embodiments, the compressed raw mixture is partially shielded from the arc furnace electrode by an electrically insulating material, optionally comprising hexagonal boron nitride.

In some embodiments, the composite matrix is composed of grains or crystallites that are less than 100 micrometer in size. In some embodiments, the composite matrix is composed of grains or crystallites that are less than 50 micrometer in size. In some embodiments, the composite matrix is composed of grains or crystallites that are less than 10 micrometer in size. In some embodiments, the composite matrix is composed of crystallites that are less than 1 micrometer in size.

In some embodiments, the compressed raw mixture is heated by an induction furnace. In some embodiments, the induction furnace is heated by electromagnetic induction. In some embodiments, the electromagnetic radiation used for electromagnetic induction has the frequency of radio waves. In some embodiments, the mixture is heated by hot pressing. In some embodiments, the mixture is heated by plasma spark sintering. In some embodiments, the reaction vessel is water cooled. In some embodiments, the reaction vessel is graphite lined. In some embodiments, the radiofrequency induction is tuned to carbon, and the graphite is heated within the reaction vessel. In some embodiments, the compressed raw mixture is shielded from the graphite lined reaction vessel by an electrically insulating material, optionally comprising hexagonal boron nitride.

In some embodiments, the composite matrix is composed of grains or crystallites that are less than 100 micrometer in size. In some embodiments, the composite matrix is composed of grains or crystallites that are less than 50 micrometer in size. In some embodiments, the composite matrix is composed of grains or crystallites that are less than 10 micrometer in size.

In some embodiments, x is 0.001-0.200. In some embodiments, x is 0.201-0.400. In some embodiments, x is 0.401-0.600. In some embodiments, x is 0.601-0.800. In some embodiments, x is 0.801-0.999.

In some embodiments, M is at least one element selected from the group: vanadium (V), chromium (Cr), niobium (Nb), molybdenum (Mo), tantalum (Ta), and rhenium (Re). In some embodiments, composite matrix comprises $W_{1-x}V_xB_4$. In some embodiments, the composite matrix comprises $W_{1-x}Cr_xB_4$. In some embodiments, the composite matrix comprises $W_{1-x}Nb_xB_4$. In some embodiments, the composite matrix comprises $W_{1-x}Mo_xB_4$. In some embodiments, the composite matrix comprises $W_{1-x}Ta_xB_4$. In some embodiments, the composite matrix comprises $W_{1-x}Re_xB_4$.

Disclosed herein is a method of producing a composite material comprising a composite matrix of Formula (III):

$$W_{1-x}M_xB_4 \tag{III}$$

wherein the percentage of the composite matrix of Formula (III) and boron relative to the composite material is at least 95%, wherein,
W is tungsten;
B is boron;
M is at least one element selected from the group of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), yttrium (Y), osmium (Os), iridium (Ir), lithium (Li) and aluminum (Al);
x is from 0 to 0.999; and
wherein the method comprises:
a) adding into a compression chamber a mixture of boron, tungsten, and optionally M, wherein the ratio of boron to tungsten and optionally M is less than 12.0 equivalents of boron to 1 equivalent of tungsten and optionally M;
b) compressing the mixture to generate a compressed raw mixture;
c) partially lining the interior of the reaction vessel with an electric insulator to generate an insulated reaction vessel;
d) adding the compressed raw mixture to the insulated reaction vessel;
e) generating an inert atmosphere within the reaction vessel by applying a vacuum to the insulated reaction vessel, flushing the insulated reaction vessel with inert gas, or a combination thereof;
f) arc melting the compressed raw mixture until at least 95% or more of the compressed raw mixture is melted; and
g) cooling the insulated reaction vessel, thereby generating the composite material comprising the composite matrix of Formula (III).

In some embodiments, the composite material further comprises a metal side product, wherein optionally said metal side product is less than 4%, 3%, 2%, 1%, 0.5%, 0.1%, 0.05%, or 0.01% relative to the percentage of the composite matrix. In some embodiments, the metal side product is tungsten diboride or tungsten monoboride. In some embodiments, at most about 95%, 90%, 85%, 80%, 70%, 60%, 50%, 40%, 30%, or less of the surface of the reaction vessel is coated with the electrically insulating material. In some embodiments, the compressed raw mixture is partially shielded from the arc furnace electrode by an electrically insulating material, optionally comprising hexagonal boron nitride. In some embodiments, the insulating material comprises hexagonal boron nitride (h-BN).

In some embodiments, the compressed raw mixture is melted by an electric arc furnace or plasma arc furnace. In some embodiments, the arc furnace electrode is made of graphite or tungsten metal. In some embodiments, in reaction vessel is water cooled. In some embodiments, the cooling rate of the reaction vessel is controlled. In some embodiments, the reaction vessel is allowed to cool to ambient temperature.

In some embodiments, the composite matrix is composed of grains or crystallites that are less than 100 micrometer in size. In some embodiments, the composite matrix is composed of grains or crystallites that are less than 123-133 micrometer in size. In some embodiments, the composite matrix is composed of grains or crystallites that are less than 10 micrometer in size. In some embodiments, the composite matrix is composed of crystallites that are less than 1 micrometer in size.

In some embodiments, the reaction vessel is purged with an inert gas to generate the inert atmosphere. In some embodiments, the inert gas comprises argon, nitrogen, or helium. In some embodiments, the reaction vessel is subjected to at least one cycle of applying a vacuum and flushing the reaction vessel with an inert gas to remove oxygen from the reaction vessel.

In some embodiments, x is 0. In some embodiments, the composite matrix comprises $WB_4$. In some embodiments, the ratio of B to W is between about 11.9 and about 9 equivalents of B to 1 equivalent of W. In some embodiments, the ratio of B to W is about 11.6, about 11, about 10.5, about 10, about 9.5, or about 9 equivalents of B to 1 equivalent of W. In some embodiments, the composite matrix is formed with a W to B ratio of 1:11.6. In some embodiments, the composite matrix has oxidation resistance below 450° C. In some embodiments, the composite matrix is formed with a W to B ratio of 1:10.5. In some embodiments, the composite matrix is formed with a W to B ratio of 1:9.0. In some embodiments, the composite matrix has oxidation resistance below 465° C. In some embodiments, the composite matrix has a density at or above 4.0 g/cm3.

In some embodiments, x is from 0.001 to 0.999. In some embodiments, x is 0.201-0.400. In some embodiments, x is 0.401-0.600. In some embodiments, x is 0.601-0.800. In some embodiments, x is 0.801-0.999.

In some embodiments, the ratio of B to W and M is less than 5 equivalents of B to 1 equivalent of W and M. In some embodiments, M is at least one element selected from the group: vanadium (V), chromium (Cr), niobium (Nb), molybdenum (Mo), tantalum (Ta), and rhenium (Re). In some embodiments, the composite matrix comprises $W_{1-x}V_xB_4$. In some embodiments, the composite matrix comprises $W_{1-x}Cr_xB_4$. In some embodiments, the composite matrix comprises $W_{1-x}Nb_xB_4$. In some embodiments, the composite matrix comprises $W_{1-x}Mo_xB_4$. In some embodiments, the composite matrix comprises $W_{1-x}Ta_xB_4$. In some embodiments, the composite matrix comprises $W_{1-x}Re_xB_4$.

Disclosed herein is a composite matrix comprising a compound of Formula (I):

$$W_{1-x}M_xB_4 \tag{I}$$

wherein:
W is tungsten;
B is boron;
M is at least one element selected from the group: vanadium (V), chromium (Cr), niobium (Nb), molybdenum (Mo), tantalum (Ta), and rhenium (Re); and x is from 0.001 to 0.999.

In some embodiments, x is 0.001-0.200. In some embodiments, x is 0.201-0.400. In some embodiments, x is 0.401-0.600. In some embodiments, x is 0.601-0.800. In some embodiments, x is 0.801-0.999. In some embodiments, the composite matrix is $W_{1-x}V_xB_4$. In some embodiments, the composite matrix is $W_{1-x}Cr_xB_4$. In some embodiments, the composite matrix is $W_{1-x}Nb_xB_4$. In some embodiments, the composite matrix is $W_{1-x}Mo_xB_4$. In some embodiments, the composite matrix is $W_{1-x}Ta_xB_4$. In some embodiments, the composite matrix is $W_{1-x}Re_xB_4$.

Disclosed herein is a composite matrix produced by any of the methods disclosed herein.

Disclosed herein is a tool comprising a composite matrix produced by any of the methods disclosed herein.

Described herein is a method of preparing a composite matrix comprising: combining an amount of W with an amount of B and optionally M to generate the composite matrix, wherein the ratio of B to W and M is less than 12 equivalents of B to 1 equivalent of W and M; and the composite matrix comprises: $W_{1-x}M_xB_4$ wherein: W is tungsten; B is boron; M is at least one element selected from the group of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), yttrium (Y), osmium (Os), iridium (Ir), lithium (Li) and aluminum (Al); and x is from 0 to 0.999. In some embodiments, the method further comprising i) mixing W, B, and optionally M to generate a mixture, ii) transferring the mixture to a reaction vessel, and iii) heating the mixture to a temperature sufficient to induce a reaction between W, B, and optionally M to generate the composite matrix. In some embodiments, at least 10% of the atmospheric oxygen is removed from the reaction vessel. In some embodiments, the mixture is heated to a temperature between about 1200° C. and about 2200° C. In some embodiments, the mixture is heated for about 15 minutes, 90 minutes, 120 minutes, 180 minutes, 240 minutes, 360 minutes, or more. In some embodiments, the mixture is heated by an induction furnace or conventional furnace. In some embodiments, M is at least one element selected from the group: vanadium (V), chromium (Cr), niobium (Nb), molybdenum (Mo), tantalum (Ta), and rhenium (Re). In some embodiments, x is 0. In some embodiments, the ratio of B to W is between about 11.9 and about 9 equivalents of B to 1 equivalent of W. In some embodiments, x is from 0.001 to 0.999. In some embodiments, the ratio of B to W and M is less than 5 equivalents of B to 1 equivalent of W and M. In some embodiments, the reaction vessel and reaction mixture is separated by a metal liner. In some embodiments, the composite matrix is a crystalline solid characterized by at least one X-ray diffraction pattern reflection at a 2 theta of about 24.2. In some embodiments, the crystalline solid is further characterized by at least one X-ray diffraction pattern reflection at a 2 theta of about 34.5 or about 45.1. Disclosed herein is a method of producing a thermodynamically stable tungsten tetraboride composite matrix, the method comprising: a) adding into a compression chamber a mixture of boron (B) and tungsten (W), wherein the ratio of boron to tungsten is between 4 and 11.9 equivalents of boron to 1 equivalent of tungsten; b) compressing the mixture to generate a compressed raw mixture; c) adding the compressed raw mixture to a reaction vessel; d) generating an inert atmosphere within the reaction vessel by applying a vacuum to the reaction vessel, flushing the reaction vessel with inert gas, or a combination thereof; and e) heating the reaction vessel to a temperature of between about 1200° C. and about 2200° C. to generate the thermodynamically stable $WB_4$ composite matrix. In some embodiments, the compressed raw mixture is heated by an induction furnace or a conventional furnace. In some embodiments, the reaction vessel and reaction mixture is separated by a metal liner. In some embodiments, the composite matrix is a crystalline solid characterized by at least one X-ray diffraction pattern reflection at a 2 theta of about 24.2. In some embodiments, the crystalline solid is further characterized by at least one X-ray diffraction pattern reflection at a 2 theta of about 34.5 or about 45.1. Disclosed herein is a tool comprising a composite matrix produced by the methods described herein.

In certain embodiments, described herein are methods of making a composite matrix comprising tungsten tetraboride with a reduced or non-detectable amount of metal side products (or by-products) (e.g., less than 20%, 15%, 10%, 5%, 4%, 3%, 2%, 1%, 0.5% or less of the composite is metal side products). In some embodiments, also described herein are methods of manufacturing a composite matrix comprising tungsten tetraboride with a ratio of less than 12 equivalents of boron to 1 equivalent of tungsten. Further disclosed herein, are tungsten tetraboride alloys that utilize less than 5 equivalents of boron to 1 equivalent of tungsten and metal. In some embodiments, the tungsten tetraboride composite or the tungsten tetraboride alloys are applied to a tool or abrasive material.

Metal Boride Composite Matrix

Disclosed herein is a composite matrix comprising a compound of Formula (I):

$$W_{1-x}M_xB_4 \qquad (I)$$

wherein:

W is tungsten;

B is boron;

M is at least one element selected from the group: vanadium (V), chromium (Cr), niobium (Nb), molybdenum (Mo), tantalum (Ta), and rhenium (Re); and x is from 0.001 to 0.999.

In some embodiments, the composite matrix is $W_{1-x}M_xB_4$ and prepared with a ratio of all metal atoms to boron atoms from about 1 to 4 to about 1 to 5. In some embodiments, the composite matrix is $W_{1-x}M_xB_4$ and prepared with a ratio of all metal atoms to boron atoms of about 1 to 4.0. In some embodiments, the composite matrix is $W_{1-x}M_xB_4$ and prepared with a ratio of all metal atoms to boron atoms of about 1 to 4.1. In some embodiments, the composite matrix is $W_{1-x}M_xB_4$ and prepared with a ratio of all metal atoms to boron atoms of about 1 to 4.2. In some embodiments, the composite matrix is $W_{1-x}M_xB_4$ and prepared with a ratio of all metal atoms to boron atoms of about 1 to 4.3. In some embodiments, the composite matrix is $W_{1-x}M_xB_4$ and prepared with a ratio of all metal atoms to boron atoms of about 1 to 4.4. In some embodiments, the composite matrix is $W_{1-x}M_xB_4$ and prepared with a ratio of all metal atoms to boron atoms of about 1 to 4.5. In some embodiments, the composite matrix is $W_{1-x}M_xB_4$ and prepared with a ratio of all metal atoms to boron atoms of about 1 to 4.6. In some embodiments, the composite matrix is $W_{1-x}M_xB_4$ and prepared with a ratio of all metal atoms to boron atoms of about 1 to 4.7. In some embodiments, the composite matrix is $W_{1-x}M_xB_4$ and prepared with a ratio of all metal atoms to boron atoms of about 1 to 4.8. In some embodiments, the composite matrix is $W_{1-x}M_xB_4$ and prepared with a ratio of all metal atoms to boron atoms of about 1 to 4.9. In some embodiments, the composite matrix is $W_{1-x}M_xB_4$ and prepared with a ratio of all metal atoms to boron atoms of about 1 to 5.0.

In some embodiments of a composite matrix described herein, or prepared by the methods herein, x has a value within the range 0.001 to 0.999, inclusively. In some embodiments, x has a value within the range 0.005 to 0.99, 0.01 to 0.95, 0.05 to 0.9, 0.1 to 0.9, 0.001 to 0.6, 0.005 to 0.6, 0.01 to 0.6, 0.05 to 0.6, 0.1 to 0.6, 0.2 to 0.6, 0.3 to 0.6, 0.4 to 0.6, 0.001 to 0.55, 0.005 to 0.55, 0.01 to 0.55, 0.05 to 0.55, 0.1 to 0.55, 0.2 to 0.55, 0.3 to 0.55, 0.4 to 0.55, 0.45 to 0.55, 0.001 to 0.5, 0.005 to 0.5, 0.01 to 0.5, 0.05 to 0.5, 0.1 to 0.5, 0.2 to 0.5, 0.3 to 0.5, 0.4 to 0.5, 0.5 to 0.55, 0.45 to 0.5, 0.001 to 0.4, 0.005 to 0.4, 0.01 to 0.4, 0.05 to 0.4, 0.1 to 0.4, 0.2 to 0.4, 0.001 to 0.3, 0.005 to 0.3, 0.01 to 0.3, 0.05 to 0.3, 0.1 to 0.3, 0.001 to 0.2, 0.005 to 0.2, 0.01 to 0.2, 0.05 to 0.2, or 0.1 to 0.2, inclusively. In some embodiments, x has a value within the range 0.1 to 0.9, inclusively. In some embodiments, x has a value within the range 0.001 to 0.6, 0.005 to 0.6, 0.001 to 0.4, or 0.001 to 0.2, inclusively. In some embodiments, x has a value within the range 0.001 to 0.6, inclusively. In some embodiments, x has a value within the range 0.001 to 0.5, inclusively. In some embodiments, x has a value within the range 0.001 to 0.4, inclusively. In some embodiments, x has a value within the range 0.001 to 0.3, inclusively. In some embodiments, x has a value within the range 0.001 to 0.2, inclusively. In some embodiments, x has a value within the range 0.01 to 0.6, inclusively. In some embodiments, x has a value within the range 0.01 to 0.5, inclusively. In some embodiments, x has a value within the range 0.01 to 0.4, inclusively. In some embodiments, x has a value within the range 0.01 to 0.3, inclusively. In some embodiments, x has a value within the range 0.01 to 0.2, inclusively. In some embodiments, x has a value within the range 0.1 to 0.8, inclusively. In some embodiments, x has a value within the range 0.1 to 0.7, inclusively. In some embodiments, x has a value within the range 0.1 to 0.6, inclusively. In some embodiments, x has a value within the range 0.1 to 0.5, inclusively. In some embodiments, x has a value within the range 0.1 to 0.4, inclusively. In some embodiments, x has a value within the range 0.1 to 0.3, inclusively. In some embodiments, x has a value within the range 0.1 to 0.2, inclusively. In some embodiments, x has a value within the range 0.2 to 0.8, inclusively. In some embodiments, x has a value within the range 0.2 to 0.7, inclusively. In some embodiments, x has a value within the range 0.2 to 0.6, inclusively. In some embodiments, x has a value within the range 0.2 to 0.5, inclusively. In some embodiments, x has a value within the range 0.2 to 0.4, inclusively. In some embodiments, x has a value within the range 0.2 to 0.3, inclusively. In some embodiments, x has a value within the range 0.3 to 0.8, inclusively. In some embodiments, x has a value within the range 0.3 to 0.7, inclusively. In some embodiments, x has a value within the range 0.3 to 0.6, inclusively. In some embodiments, x has a value within the range 0.3 to 0.5, inclusively. In some embodiments, x has a value within the range 0.3 to 0.4, inclusively. In some embodiments, x has a value within the range 0.4 to 0.8, inclusively. In some embodiments, x has a value within the range 0.4 to 0.7, inclusively. In some embodiments, x has a value within the range 0.4 to 0.6, inclusively. In some embodiments, x has a value within the range 0.4 to 0.5, inclusively.

In some embodiments of a composite matrix described herein, or prepared by the methods herein, x is at least 0.001 and less than 0.999. In some embodiments, x is at least 0.001 and less than 0.9. In some embodiments, x is at least 0.001 and less than 0.6. In some embodiments, x is at least 0.001 and less than 0.5. In some embodiments, x is at least 0.001 and less than 0.4. In some embodiments, x is at least 0.001 and less than 0.3. In some embodiments, x is at least 0.001 and less than 0.2. In some embodiments, x is at least 0.001 and less than 0.05. In some embodiments, x is at least 0.01 and less than 0.5. In some embodiments, x is at least 0.01 and less than 0.4. In some embodiments, x is at least 0.01 and less than 0.3. In some embodiments, x is at least 0.01 and less than 0.2. In some embodiments, x is at least 0.1 and less than 0.5. In some embodiments, x is at least 0.1 and less than 0.4. In some embodiments, x is at least 0.1 and less than 0.3. In some embodiments, x is at least 0.1 and less than 0.2.

In some embodiments of a composite matrix described herein, or prepared by the methods herein, x has a value of about 0.001, 0.005, 0.01, 0.05, 0.1, 0.15, 0.2, 0.25, 0.3, 0.35, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.65, 0.7, 0.8, 0.9, 0.95, 0.99, or about 0.999. In some embodiments, x has a value of about 0.001. In some embodiments, x has a value of about 0.005. In some embodiments, x has a value of about 0.01. In some embodiments, x has a value of about 0.05. In some embodiments, x has a value of about 0.1. In some embodiments, x has a value of about 0.15. In some embodiments, x has a value of about 0.2. In some embodiments, x has a value of about 0.3. In some embodiments, x has a value of about 0.4. In some embodiments, x has a value of about 0.41. In some embodiments, x has a value of about 0.42. In some embodiments, x has a value of about 0.43. In some embodiments, x has a value of about 0.44. In some embodiments, x has a value of about 0.45. In some embodiments, x has a value of about 0.46. In some embodiments, x has a value of about 0.47. In some embodiments, x has a value of about 0.48. In some embodiments, x has a value of about 0.49. In some embodiments, x has a value of about 0.5. In some embodiments, x has a value of about 0.51. In some embodiments, x has a value of about 0.52. In some embodiments, x has a value of about 0.53. In some embodiments, x has a value of about 0.54. In some embodiments, x has a value of about 0.55. In some embodiments, x has a value of about 0.56. In some embodiments, x has a value of about 0.57. In some embodiments, x has a value of about 0.58. In some embodiments, x has a value of about 0.59. In some embodiments, x has a value of about 0.6. In some embodiments, x has a value of about 0.7. In some embodiments, x has a value of about 0.8. In some embodiments, x has a value of about 0.9. In some embodiments, x has a value of about 0.99.

In some embodiments of a composite matrix described herein, or prepared by the methods herein, x is 0.001-0.200. In some embodiments, x is 0.201-0.400. In some embodiments, x is 0.401-0.600. In some embodiments, x is 0.601-0.800. In some embodiments, x is 0.801-0.999.

In some embodiments of a composite matrix described herein, or prepared by the methods herein, x is about 0.05. In some embodiments, x is about 0.25. In some embodiments, x is about 0.50. In some embodiments, x is about 0.75. In some embodiments, x is about 0.80. In some embodiments, x is about 0.85. In some embodiments, x is about 0.90. In some embodiments, x is about 0.95.

In some embodiments, a composite matrix described herein, or prepared by the methods herein, is comprised of a metal side product is less than 20%, 15%, 12%, 10%, 9%, 8%, 7%, 6%, 5%, 4%, 3%, 2%, 1%, 0.5%, 0.1%, 0.05%, or 0.01% relative to the percentage of the composite matrix. In some embodiments, the metal side product is tungsten diboride ($WB_2$) or tungsten monoboride (WB). In some embodiments, the metal side product is a non-tungsten metal boride. In some embodiments, the non-tungsten metal boride is $TiB_2$, $ZrB_2$, $HfB_2$, VB, $VB_2$, $NbB_2$, $NbB_2$, CrB, $CrB_2$, $Cr_2B$, $Cr_3B_4$, $Cr_4B$, $Cr_5B_3$, MoB, $MoB_2$, $Mo_2B_4$, $Mo_2B_5$, MnB, $MnB_2$, $MNB_4$, $Mn_2B$, $Mn_4B$, $Mn_3B_4$, $ReB_2$, $Re_3B$, $Re_7B_2$, FeB, $Fe_2B$, $RuB_2$, $Ru_2B_3$, OsB, $Os_2B_3$, $OsB_2$, CoB, $Co_2B$, IrB, $Ir_2B$, NiB, $Ni_2B$, $Ni_3B$, CuB, or ZnB.

In some embodiments, at least one allotrope of elemental boron is present in the composite matrix. Allotropes of boron include the following states of boron: alpha rhombohedral, alpha tetragonal, beta rhombohedral, beta tetragonal, orthorhombic (gamma), borophen, borospherene and amorphous boron.

In some embodiments, a composite matrix described herein, or prepared by the methods herein, contain a compound of Formulas (I-IV), boron, and a metal side product. In some embodiments, a compound of Formulas (I-IV) and boron account for 80% or more of the composite matrix's weight. In some embodiments, a compound of Formulas (I-IV) and boron account for 85% or more of the composite matrix's weight. In some embodiments, a compound of Formulas (I-IV) and boron account for 88% or more of the composite matrix's weight. In some embodiments, a compound of Formulas (I-IV) and boron account for 90% or more of the composite matrix's weight. In some embodiments, a compound of Formulas (I-IV) and boron account for 91% or more of the composite matrix's weight. In some embodiments, a compound of Formulas (I-IV) and boron account for 92% or more of the composite matrix's weight. In some embodiments, a compound of Formulas (I-IV) and boron account for 93% or more of the composite matrix's weight. In some embodiments, a compound of Formulas (I-IV) and boron account for 94% or more of the composite matrix's weight. In some embodiments, a compound of Formulas (I-IV) and boron account for 95% or more of the composite matrix's weight. In some embodiments, a compound of Formulas (I-IV) and boron account for 96% or more of the composite matrix's weight. In some embodiments, a compound of Formulas (I-IV) and boron account for 97% or more of the composite matrix's weight. In some embodiments, a compound of Formulas (I-IV) and boron account for 98% or more of the composite matrix's weight. In some embodiments, a compound of Formulas (I-IV) and boron account for 99% or more of the composite matrix's weight. In some embodiments, a compound of Formulas (I-IV) and boron account for 99.5% or more of the composite matrix's weight. In some embodiments, a compound of Formulas (I-IV) and boron account for 99.9% or more of the composite matrix's weight. In some embodiments, a compound of Formulas (I-IV) and boron account for 99.95% or more of the composite matrix's weight. In some embodiments, a compound of Formulas (I-IV) and boron account for 99.99% or more of the composite matrix's weight.

In some embodiments, in a composite matrix described herein, or prepared by the methods herein, the percentage of the composite matrix of Formula (I) and boron relative to the composite material is at least 80%, 85%, 88%, 90%, 91%, 92%, 93%, 94%, 95%, 96%, 97%, 98%, 99%, 99.5%, 99.9%, 99.95%, or 99.99%. In some embodiments, in a composite matrix described herein, or prepared by the methods herein, the percentage of the composite matrix of Formula (II) and boron relative to the composite material is at least 80%, 85%, 88%, 90%, 91%, 92%, 93%, 94%, 95%, 96%, 97%, 98%, 99%, 99.5%, 99.9%, 99.95%, or 99.99%. In some embodiments, in a composite matrix described herein, or prepared by the methods herein, the percentage of the composite matrix of Formula (III) and boron relative to the composite material is at least 80%, 85%, 88%, 90%, 91%, 92%, 93%, 94%, 95%, 96%, 97%, 98%, 99%, 99.5%, 99.9%, 99.95%, or 99.99%. In some embodiments, in a composite matrix described herein, or prepared by the methods herein, the percentage of the composite matrix of Formula (IV) and boron relative to the composite material is at least 80%, 85%, 88%, 90%, 91%, 92%, 93%, 94%, 95%, 96%, 97%, 98%, 99%, 99.5%, 99.9%, 99.95%, or 99.99%.

In some embodiments, the composite matrix is $W_{1-x}V_xB_4$. In some embodiments, the composite matrix is $W_{0.95}V_{0.05}B_4$. In some embodiments, the composite matrix is $W_{0.90}V_{0.10}B_4$. In some embodiments, the composite matrix is $W_{0.85}V_{0.15}B_4$. In some embodiments, the composite matrix is $W_{0.80}V_{0.20}B_4$. In some embodiments, the composite matrix is $W_{0.75}V_{0.25}B_4$. In some embodiments, the composite matrix is $W_{0.70}V_{0.30}B_4$. In some embodiments, the composite matrix is $W_{0.65}V_{0.35}B_4$. In some embodiments, the composite matrix is $W_{0.60}V_{0.40}B_4$. In some embodiments, the composite matrix is $W_{0.55}V_{0.45}B_4$. In some embodiments, the composite matrix is $W_{0.50}V_{0.50}B_4$. In some embodiments, the composite matrix is $W_{0.45}V_{0.55}B_4$. In some embodiments, the composite matrix is $W_{0.40}V_{0.60}B_4$. In some embodiments, the composite matrix is $W_{0.35}V_{0.65}B_4$. In some embodiments, the composite matrix is $W_{0.30}V_{0.70}B_4$. In some embodiments, the composite matrix is $W_{0.25}V_{0.75}B_4$. In some embodiments, the composite matrix is $W_{0.20}V_{0.80}B_4$. In some embodiments, the composite matrix is $W_{0.15}V_{0.85}B_4$. In some embodiments, the composite matrix is $W_{0.10}V_{0.90}B_4$. In some embodiments, the composite matrix is $W_{0.05}V_{0.95}B_4$.

In some embodiments, the composite matrix is $W_{1-x}Cr_xB_4$. In some embodiments, the composite matrix is $W_{0.95}Cr_{0.05}B_4$. In some embodiments, the composite matrix is $W_{0.90}Cr_{0.10}B_4$. In some embodiments, the composite matrix is $W_{0.85}Cr_{0.15}B_4$. In some embodiments, the composite matrix is $W_{0.80}Cr_{0.20}B_4$. In some embodiments, the composite matrix is $W_{0.75}Cr_{0.25}B_4$. In some embodiments, the composite matrix is $W_{0.70}Cr_{0.30}B_4$. In some embodiments, the composite matrix is $W_{0.65}Cr_{0.35}B_4$. In some embodiments, the composite matrix is $W_{0.60}Cr_{0.40}B_4$. In some embodiments, the composite matrix is $W_{0.55}Cr_{0.45}B_4$. In some embodiments, the composite matrix is $W_{0.50}Cr_{0.50}B_4$. In some embodiments, the composite matrix is $W_{0.45}Cr_{0.55}B_4$. In some embodiments, the composite matrix is $W_{0.40}Cr_{0.60}B_4$. In some embodiments, the composite matrix is $W_{0.35}Cr_{0.65}B_4$. In some embodiments, the composite matrix is $W_{0.30}Cr_{0.70}B_4$. In some embodiments, the composite matrix is $W_{0.25}Cr_{0.75}B_4$. In some embodiments, the composite matrix is $W_{0.20}Cr_{0.80}B_4$. In some embodiments, the composite matrix is $W_{0.15}Cr_{0.85}B_4$. In some embodiments, the composite matrix is $W_{0.10}Cr_{0.90}B_4$. In some embodiments, the composite matrix is $W_{0.05}Cr_{0.95}B_4$.

In some embodiments, the composite matrix is $W_{1-x}Nb_xB_4$. In some embodiments, the composite matrix is $W_{0.95}Nb_{0.05}B_4$. In some embodiments, the composite matrix is $W_{0.90}Nb_{0.10}B_4$. In some embodiments, the composite matrix is $W_{0.85}Nb_{0.15}B_4$. In some embodiments, the composite matrix is $W_{0.80}Nb_{0.20}B_4$. In some embodiments, the composite matrix is $W_{0.75}Nb_{0.25}B_4$. In some embodiments, the composite matrix is $W_{0.70}Nb_{0.30}B_4$. In some embodiments, the composite matrix is $W_{0.65}Nb_{0.35}B_4$. In some embodiments, the composite matrix is $W_{0.60}Nb_{0.40}B_4$. In some embodiments, the composite matrix is $W_{0.55}Nb_{0.45}B_4$. In some embodiments, the composite matrix is $W_{0.50}Nb_{0.50}B_4$. In some embodiments, the composite matrix is $W_{0.45}Nb_{0.55}B_4$. In some embodiments, the composite matrix is $W_{0.40}Nb_{0.60}B_4$. In some embodiments, the composite matrix is $W_{0.35}Nb_{0.65}B_4$. In some embodiments, the composite matrix is $W_{0.30}Nb_{0.70}B_4$. In some embodiments, the composite matrix is $W_{0.25}Nb_{0.75}B_4$. In some embodiments, the composite matrix is $W_{0.20}Nb_{0.80}B_4$. In some embodiments, the composite matrix is $W_{0.15}Nb_{0.85}B_4$. In some embodiments, the composite matrix is $W_{0.10}Nb_{0.90}B_4$. In some embodiments, the composite matrix is $W_{0.05}Nb_{0.95}B_4$.

In some embodiments, the composite matrix is $W_{1-x}Mo_xB_4$. In some embodiments, the composite matrix is $W_{0.95}Mo_{0.05}B_4$. In some embodiments, the composite matrix is $W_{0.90}Mo_{0.10}B_4$. In some embodiments, the composite matrix is $W_{0.85}Mo_{0.15}B_4$. In some embodiments, the composite matrix is $W_{0.80}Mo_{0.20}B_4$. In some embodiments, the composite matrix is $W_{0.75}Mo_{0.25}B_4$. In some embodiments, the composite matrix is $W_{0.70}Mo_{0.30}B_4$. In some embodiments, the composite matrix is $W_{0.65}Mo_{0.35}B_4$. In some embodiments, the composite matrix is $W_{0.60}Mo_{0.40}B_4$. In some embodiments, the composite matrix is $W_{0.55}Mo_{0.45}B_4$. In some embodiments, the composite matrix is $W_{0.50}Mo_{0.50}B_4$. In some embodiments, the composite matrix is $W_{0.45}Mo_{0.55}B_4$. In some embodiments, the composite matrix is $W_{0.40}Mo_{0.60}B_4$. In some embodiments, the composite matrix is $W_{0.35}Mo_{0.65}B_4$. In some embodiments, the composite matrix is $W_{0.30}Mo_{0.70}B_4$. In some embodiments, the composite matrix is $W_{0.25}Mo_{0.75}B_4$. In some embodiments, the composite matrix is $W_{0.20}Mo_{0.80}B_4$. In some embodiments, the composite matrix is $W_{0.15}Mo_{0.85}B_4$. In some embodiments, the composite matrix is $W_{0.10}Mo_{0.90}B_4$. In some embodiments, the composite matrix is $W_{0.05}Mo_{0.95}B_4$.

In some embodiments, the composite matrix is $W_{1-x}Ta_xB_4$. In some embodiments, the composite matrix is $W_{0.95}Ta_{0.05}B_4$. In some embodiments, the composite matrix is $W_{0.90}Ta_{0.10}B_4$. In some embodiments, the composite matrix is $W_{0.85}Ta_{0.15}B_4$. In some embodiments, the composite matrix is $W_{0.80}Ta_{0.20}B_4$. In some embodiments, the composite matrix is $W_{0.75}Ta_{0.25}B_4$. In some embodiments, the composite matrix is $W_{0.70}Ta_{0.30}B_4$. In some embodiments, the composite matrix is $W_{0.65}Ta_{0.35}B_4$. In some embodiments, the composite matrix is $W_{0.60}Ta_{0.40}B_4$. In some embodiments, the composite matrix is $W_{0.55}Ta_{0.45}B_4$. In some embodiments, the composite matrix is $W_{0.50}Ta_{0.50}B_4$. In some embodiments, the composite matrix is $W_{0.45}Ta_{0.55}B_4$. In some embodiments, the composite matrix is $W_{0.40}Ta_{0.60}B_4$. In some embodiments, the composite matrix is $W_{0.35}Ta_{0.65}B_4$. In some embodiments, the composite matrix is $W_{0.30}Ta_{0.70}B_4$. In some embodiments, the composite matrix is $W_{0.25}Ta_{0.75}B_4$. In some embodiments, the composite matrix is $W_{0.20}Ta_{0.80}B_4$. In some embodiments, the composite matrix is $W_{0.15}Ta_{0.85}B_4$. In some embodiments, the composite matrix is $W_{0.10}Ta_{0.90}B_4$. In some embodiments, the composite matrix is $W_{0.05}Ta_{0.95}B_4$.

In some embodiments, the composite matrix is $W_{1-x}Re_xB_4$. In some embodiments, the composite matrix is $W_{0.95}Re_{0.05}B_4$. In some embodiments, the composite matrix is $W_{0.90}Re_{0.10}B_4$. In some embodiments, the composite matrix is $W_{0.85}Re_{0.15}B_4$. In some embodiments, the composite matrix is $W_{0.80}Re_{0.20}B_4$. In some embodiments, the composite matrix is $W_{0.75}Re_{0.25}B_4$. In some embodiments, the composite matrix is $W_{0.70}Re_{0.30}B_4$. In some embodiments, the composite matrix is $W_{0.65}Re_{0.35}B_4$. In some embodiments, the composite matrix is $W_{0.60}Re_{0.40}B_4$. In some embodiments, the composite matrix is $W_{0.55}Re_{0.45}B_4$. In some embodiments, the composite matrix is $W_{0.50}Re_{0.50}B_4$. In some embodiments, the composite matrix is $W_{0.45}Re_{0.55}B_4$. In some embodiments, the composite matrix is $W_{0.40}Re_{0.60}B_4$. In some embodiments, the composite matrix is $W_{0.35}Re_{0.65}B_4$. In some embodiments, the composite matrix is $W_{0.30}Re_{0.70}B_4$. In some embodiments, the composite matrix is $W_{0.25}Re_{0.75}B_4$. In some embodiments, the composite matrix is $W_{0.20}Re_{0.80}B_4$. In some embodiments, the composite matrix is $W_{0.15}Re_{0.85}B_4$. In some embodiments, the composite matrix is $W_{0.10}Re_{0.90}B_4$. In some embodiments, the composite matrix is $W_{0.05}Re_{0.95}B_4$.

In some embodiments, the hardness described herein is measured by a Vickers hardness test. In some embodiments, the hardness is measured under a load of 0.49 Newton (N).

In some embodiments, a composite matrix described herein, or prepared by the methods herein, has a hardness of about 10 to about 70 GPa. In some embodiments, a composite matrix described herein has a hardness of about 10 to about 60 GPa, about 10 to about 50 GPa, about 10 to about 40 GPa, about 10 to about 30 GPa, about 20 to about 70 GPa, about 20 to about 60 GPa, about 20 to about 50 GPa, about 20 to about 40 GPa, about 20 to about 30 GPa, about 30 to about 70 GPa, about 30 to about 60 GPa, about 30 to about 50 GPa, about 30 to about 45 GPa, about 30 to about 40 GPa, about 30 to about 35 GPa, about 35 to about 70 GPa, about 35 to about 60 GPa, about 35 to about 50 GPa, about 35 to about 40 GPa, about 40 to about 70 GPa, about 40 to about 60 GPa, about 40 to about 50 GPa, about 45 to about 60 GPa or about 45 to about 50 GPa. In some embodiments, a composite matrix described herein has a hardness of about 30 to about 50 GPa, about 30 to about 45 GPa, about 30 to about 40 GPa, about 30 to about 35 GPa, about 35 to about 50 GPa, about 35 to about 40 GPa, about 40 to about 50 GPa, or about 45 to about 50 GPa.

In some embodiments, a composite matrix described herein, or prepared by the methods herein, has a hardness of about 10 GPa, about 15 GPa, about 20 GPa, about 25 GPa, about 30 GPa, about 31 GPa, about 32 GPa, about 33 GPa, about 34 GPa, about 35 GPa, about 36 GPa, about 37 GPa, about 38 GPa, about 39 GPa, about 40 GPa, about 41 GPa, about 42 GPa, about 43 GPa, about 44 GPa, about 45 GPa, about 46 GPa, about 47 GPa, about 48 GPa, about 49 GPa, about 50 GPa, about 51 GPa, about 52 GPa, about 53 GPa, about 54 GPa, about 55 GPa, about 56 GPa, about 57 GPa, about 58 GPa, about 59 GPa, about 60 GPa or higher. In some embodiments, a composite matrix described herein has a hardness of about 10 GPa or higher. In some embodiments, a composite matrix described herein has a hardness of about 15 GPa or higher. In some embodiments, a composite matrix described herein has a hardness of about 20 GPa or higher. In some embodiments, a composite matrix described herein has a hardness of about 25 GPa or higher. In some embodiments, a composite matrix described herein has a hardness of about 30 GPa or higher. In some embodiments, a composite matrix described herein has a hardness of about 31 GPa or higher. In some embodiments, a composite matrix described herein has a hardness of about 32 GPa or higher. In some embodiments, a composite matrix described herein has a hardness of about 33 GPa or higher. In some embodiments, a composite matrix described herein has a hardness of about 34 GPa or higher. In some embodiments, a composite matrix described herein has a hardness of about 35 GPa or higher. In some embodiments, a composite matrix described herein has a hardness of about 36 GPa or higher. In some embodiments, a composite matrix described herein has a hardness of about 37 GPa or higher. In some embodiments, a composite matrix described herein has a hardness of about 38 GPa or higher. In some embodiments, a composite matrix described herein has a hardness of about 39 GPa or higher. In some embodiments, a composite matrix described herein has a hardness of about 40 GPa or higher. In some embodiments, a composite matrix described herein has a hardness of about 41 GPa or higher. In some embodiments, a composite matrix described herein has a hardness of about 42 GPa or higher. In some embodiments, a composite matrix described herein has a hardness of about 43 GPa or higher. In some embodiments, a composite matrix described herein has a hardness of about 44 GPa or higher. In some embodiments, a composite matrix described herein has a hardness of about 45 GPa or higher. In some embodiments, a composite matrix described herein has a hardness of about 46 GPa or higher. In some embodiments, a composite matrix described herein has a hardness of about 47 GPa or higher. In some embodiments, a composite matrix described herein has a hardness of about 48 GPa or higher. In some embodiments, a composite matrix described herein has a hardness of about 49 GPa or higher. In some embodiments, a composite matrix described herein has a hardness of about 50 GPa or higher. In some embodiments, a composite matrix described herein has a hardness of about 51 GPa or higher. In some embodiments, a composite matrix described herein has a hardness of about 52 GPa or higher. In some embodiments, a composite matrix described herein has a hardness of about 53 GPa or higher. In some embodiments, a composite matrix described herein has a hardness of about 54 GPa or higher. In some embodiments, a composite matrix described herein has a hardness of about 55 GPa or higher. In some embodiments, a composite matrix described herein has a hardness of about 56 GPa or higher. In some embodiments, a composite matrix described herein has a hardness of about 57 GPa or higher. In some embodiments, a composite matrix described herein has a hardness of about 58 GPa or higher. In some embodiments, a composite matrix described herein has a hardness of about 59 GPa or higher. In some embodiments, a composite matrix described herein has a hardness of about 60 GPa or higher.

In some embodiments, a composite matrix described herein, or prepared by the methods herein, has a grain size or crystallite size of about 20 µm or less. In some embodiments, the composite matrix has a grain size or crystallite size of about 15 µm or less, about 12 µm or less, about 10 µm or less, about 8 µm or less, about 5 µm or less, about 2 µm or less or about 1 µm or less. In some embodiments, the composite matrix has a grain size or crystallite size of about 15 µm or less. In some embodiments, the composite matrix has a grain size or crystallite size of about 12 µm or less. In some embodiments, the composite matrix has a grain size or crystallite size of about 10 µm or less. In some embodiments, the composite matrix has a grain size or crystallite size of about 9 µm or less. In some embodiments, the composite matrix has a grain size or crystallite size of about 8 µm or less. In some embodiments, the composite matrix has a grain size or crystallite size of about 7 µm or less. In some embodiments, the composite matrix has a grain size or crystallite size of about 6 µm or less. In some embodiments, the composite matrix has a grain size or crystallite size of about 5 µm or less. In some embodiments, the composite matrix has a grain size or crystallite size of about 4 µm or less. In some embodiments, the composite matrix has a grain size or crystallite size of about 3 µm or less. In some embodiments, the composite matrix has a grain size or crystallite size of about 2 µm or less. In some embodiments, the composite matrix has a grain size or crystallite size of about 1 µm or less.

In some embodiments, the grain size is an averaged grain size. In some embodiments, the crystallite size is an averaged crystallite size. In some embodiments, a composite matrix described herein, or prepared by the methods herein, has an averaged grain size or averaged crystallite size of about 100 µm or less, 50 µm or less, 40 µm or less, 30 µm or less, 20 µm or less, 10 µm or less, 8 µm or less, 6 µm or less, 5 µm or less, 4 µm or less, 3 µm or less, 2 µm or less, 1 µm or less, In some embodiments, a composite matrix described herein, or prepared by the methods herein, is a densified composite matrix. In some embodiments, the density is 12.0 g/cm$^3$ or less. In some embodiments, the density is 9.0 g/cm$^3$ or less. In some embodiments, the density is 8.0 g/cm$^3$ or less. In some embodiments, the density is 7.0 g/cm$^3$ or less. In some embodiments, the density is 6.0 g/cm$^3$ or less. In some embodiments, the density is 5.0 g/cm$^3$ or less. In some embodiments, the density is 4.0 g/cm$^3$ or less. In some embodiments, a composite matrix described herein has a density of or between 4.0-9.0 g/cm$^3$. In some embodiments, a composite matrix described herein has a density of or between 4.0-7.0 g/cm$^3$. In some embodiments, a composite matrix described herein has a density of or between 4.0-6.0 g/cm$^3$. In some embodiments, a composite matrix described herein has a density of or between 5.0-6.0 g/cm$^3$.

In some embodiments, a composite matrix comprising $WB_4$ has a density of 10.0 g/cm$^3$ or less. In some embodiments, a composite matrix comprising $WB_4$ has a density of 9.0 g/cm$^3$ or less. In some embodiments, a composite matrix comprising $WB_4$ has a density of 8.5 g/cm$^3$ or less. In some embodiments, a composite matrix comprising $WB_4$ has a density of 8.0 g/cm$^3$ or less. In some embodiments, a composite matrix comprising $WB_4$ has a density of 7.5 g/cm$^3$ or less. In some embodiments, a composite matrix comprising $WB_4$ has a density of 7.0 g/cm$^3$ or less. In some embodiments, a composite matrix comprising $WB_4$ has a density of 6.5 g/cm$^3$ or less. In some embodiments, a composite matrix comprising $WB_4$ has a density of 6.0 g/cm$^3$ or less. In some embodiments, a composite matrix comprising $WB_4$ has a density of 5.5 g/cm$^3$ or less. In some embodiments, a composite matrix comprising $WB_4$ has a density of 5.0 g/cm$^3$ or less. In some embodiments, a composite matrix comprising $WB_4$ has a density of 4.5 g/cm$^3$ or less.

In some embodiments, the composite matrix described herein, or prepared by the methods herein, is resistant to oxidation. In some embodiments, the composite matrix is resistant to oxidation below 400° C. In some embodiments, the composite matrix is resistant to oxidation below 410° C. In some embodiments, the composite matrix is resistant to oxidation below 420° C. In some embodiments, the composite matrix is resistant to oxidation below 440° C. In some embodiments, the composite matrix is resistant to oxidation below 450° C. In some embodiments, the composite matrix is resistant to oxidation below 460° C. In some embodiments, the composite matrix is resistant to oxidation below 465° C. In some embodiments, the composite matrix is resistant to oxidation below 475° C. In some embodiments, the composite matrix is resistant to oxidation below 490° C. In some embodiments, the composite matrix is resistant to oxidation below 500° C. In some embodiments, the composite matrix is resistant to oxidation below 550° C. In some embodiments, the composite matrix is resistant to oxidation below 600° C. In some embodiments, the composite matrix is resistant to oxidation below 650° C. In some embodiments, the composite matrix is resistant to oxidation below 700° C. In some embodiments, the composite matrix is resistant to oxidation below 800° C. In some embodiments, the composite matrix is resistant to oxidation below 900° C.

In some embodiments, a composite material described herein is resistant to oxidation. In some embodiments, a composite material described herein has anti-oxidation property. For example, when the composite material is coated on the surface of a tool, the composite material reduces the rate of oxidation of the tool in comparison to a tool not coated with the composite material. In an alternative example, when the composite material is coated on the surface of a tool, the composite material prevents oxidation of the tool in comparison to a tool not coated with the composite material. In some embodiments, the composite material inhibits the formation of oxidation or reduces the rate of oxidation. In some embodiments, a coating of the composite matrix reduced the rate of oxidation of the tool as compared to the uncoated tool. In some embodiments, the composite matrix reduces the rate of oxidation by at least 1%, at least 2%, at least 3%, least 4%, at least 5%, at least 6%, at least 7%, at least 8%, at least 9%, at least 10%, at least 15%, at least 20%, at least 25%, at least 30%, at least 35 at least 40%, at least 45%, at least 50%, at least 55%, at least 60%, at least 65%, at least 70%, at least 75%, at least 80%, or at least 90%.

In some embodiments, the unit cell a composite matrix described herein is hexagonal as determined and characterized by X-ray diffraction. In some embodiments, the unit cell a composite matrix described herein is P6$_3$/mmm or P6$_3$/mmc. In some embodiments, the unit cell of the composite matrix is hexagonal and the length of a is between 5.100 and 5.300 Å, where a is the shortest length between two adjacent vertices in the unit cell, and the length of c is between 6.200 and 6.500 Å, where c is the longest length between two adjacent vertices in the unit cell.

In some embodiments, a composite matrix $W_{1-x}Ta_xB_4$ is hexagonal and the length of a is between 5.150 and 5.300 Å, and the length of c is between 6.300 and 6.450 Å.

In some embodiments, a composite matrix described herein comprises a solid solution phase. In some embodiments, a composite material described herein forms a solid solution.

Methods of Manufacture

Disclosed herein, in certain embodiments, is a method of preparing a composite matrix, in which the method comprises:

combining a sufficient amount of W with an amount of B and optionally M to generate the composite matrix, wherein the ratio of B to W and M is less than 12 equivalents of B to 1 equivalent of W and M; and the composite matrix comprises:

$$W_{1-x}M_xB_4$$

wherein:
W is tungsten;
B is boron;
M is at least one element selected from the group of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), yttrium (Y), osmium (Os), iridium (Ir), lithium (Li) and aluminum (Al); and
x is from 0 to 0.999

In some embodiments, the combining step comprises i) mixing W, B, and optionally M to generate a mixture, ii) transferring the mixture to a reaction vessel, and iii) heating the mixture to a temperature sufficient to induce a reaction between W, B, and optionally M to generate the composite matrix. In some embodiments, the combining step comprises i) mixing W, and B to generate a mixture, ii) transferring the mixture to a reaction vessel, and iii) heating the mixture to a temperature sufficient to induce a reaction between W and B to generate the composite matrix. In some embodiments, the combining step comprises i) mixing W, B, and M to generate a mixture, ii) transferring the mixture to a reaction vessel, and iii) heating the mixture to a temperature sufficient to induce a reaction between W, B, and M to generate the composite matrix.

In some embodiments, the combining step comprises i) mixing W, B, and optionally M to generate a mixture, ii) transferring the mixture to a reaction vessel, iii) arc melting the mixture to until the mixture is melted; and iv) cooling the mixture.

Also disclosed herein, in certain embodiments, is a method of producing a composite matrix of Formula (II):

$$W_{1-x}M_xB_4 \tag{II}$$

wherein:
W is tungsten;
B is boron;
M is at least one element selected from the group of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), yttrium (Y), osmium (Os), iridium (Ir), lithium (Li) and aluminum (Al);
x is from 0.001 to 0.999; and
wherein the method comprises:
a) adding into a compression chamber a mixture of boron, tungsten, and M, wherein the ratio of boron to tungsten and M is between 3.5 and 8.0 equivalents of boron to 1 equivalent of tungsten and M;
b) compressing the mixture to generate a compressed raw mixture;
c) adding the compressed raw mixture to a reaction vessel;
d) generating an inert atmosphere within the reaction vessel by applying a vacuum to the reaction vessel, flushing the reaction vessel with inert gas, or a combination thereof; and
e) heating the reaction vessel to a temperature of between about 1200° C. and about 2200° C. to generate the composite matrix of Formula (II).

Further disclosed herein, in certain embodiments, is a method of producing a composite material comprising a composite matrix of Formula (III):

$$W_{1-x}M_xB_4 \tag{III}$$

wherein the percentage of the composite matrix of Formula (III) and boron relative to the composite material is at least 95%, wherein,
W is tungsten;
B is boron;
M is at least one element selected from the group of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), yttrium (Y), osmium (Os), iridium (Ir), lithium (Li) and aluminum (Al);
x is from 0 to 0.999; and
wherein the method comprises:

a) adding into a compression chamber a mixture of boron, tungsten, and optionally M, wherein the ratio of boron to tungsten and optionally M is less than 12.0 equivalents of boron to 1 equivalent of tungsten and optionally M;
b) compressing the mixture to generate a compressed raw mixture;
c) partially lining the interior of the reaction vessel with an electric insulator to generate an insulated reaction vessel;
d) adding the compressed raw mixture to the insulated reaction vessel;
e) generating an inert atmosphere within the reaction vessel by applying a vacuum to the insulated reaction vessel, flushing the insulated reaction vessel with inert gas, or a combination thereof;
f) arc melting the compressed raw mixture until at least 95% or more of the compressed raw mixture is melted; and
g) cooling the insulated reaction vessel, thereby generating the composite material comprising the composite matrix of Formula (III).

Disclosed herein, in certain embodiments, is a method of preparing a composite matrix, in which the method comprises:
combining a sufficient amount of W with an amount of Z and M to generate the composite matrix, wherein the ratio of Z to W and M is less than 12 equivalents of B to 1 equivalent of W and M; and the composite matrix comprises:

$$W_{1-x}M_xZ_y$$

wherein:
W is tungsten;
Z is boron (B), silicon (Si) or beryllium (Be);
M is at least one element selected from the group of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), yttrium (Y), osmium (Os), iridium (Ir), lithium (Li) and aluminum (Al);
x is at least 0.001 and less than 0.999; and
y is at least 3.5.

Also disclosed herein, in certain embodiments, is a method of producing a composite matrix of Formula (IV):

$$W_{1-x}M_xZ_y \qquad (IV)$$

wherein:
W is tungsten;
Z is boron (B), silicon (Si) or beryllium (Be);
M is at least one element selected from the group of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), yttrium (Y), osmium (Os), iridium (Ir), lithium (Li) and aluminum (Al);
x is from 0.001 to 0.999;
y is from 3.5 to 12.0; and
wherein the method comprises:
a) adding into a compression chamber a mixture of boron, tungsten, and M, wherein the ratio of boron to tungsten and M is between 3.5 and 5.0 equivalents of boron to 1 equivalent of tungsten and M;
b) compressing the mixture to generate a compressed raw mixture;
c) adding the compressed raw mixture to a reaction vessel;
d) generating an inert atmosphere within the reaction vessel by applying a vacuum to the reaction vessel, flushing the reaction vessel with inert gas, or a combination thereof; and
e) heating the reaction vessel to a temperature of between about 1200° C. and about 2200° C. to generate the composite matrix of Formula (IV).

In some embodiments, x is 0 and the composite matrix comprises $WB_4$. In some embodiments, the ratio of B to W is between about 15.0 and about 4 equivalents of B to 1 equivalent of W. In some embodiments, the ratio of B to W is between about 12 and about 4 equivalents of B to 1 equivalent of W. In some embodiments, the ratio of B to W is between about 12 and about 6 equivalents of B to 1 equivalent of W. In some embodiments, the ratio of B to W is between about 12 and about 8 equivalents of B to 1 equivalent of W. In some embodiments, the ratio of B to W is between about 11.9 and about 9 equivalents of B to 1 equivalent of W. In some embodiments, the ratio of B to W is between about 11 and about 9 equivalents of B to 1 equivalent of W. In some embodiments, the ratio of B to W is between about 10.5 and about 9.5 equivalents of B to 1 equivalent of W.

In some embodiments, the ratio of B to W is about 15.0, about 13.0, about 12.0, about 11.9, about 11.8, about 11.6, about 11.4, about 11.2, about 11.0, about 10.8, about 10.7, about 10.6, about 10.5, about 10.4, about 10.3, about 10.2, about 10.1, about 10, about 9.9, about 9.8, about 9.7, about 9.6, about 9.5, about 9.3, about 9.1, about 8.8, about 8.5, about 8.2, about 8.0, about 7, about 6, about 5, or about 4 equivalents of B to 1 equivalent of W.

In some embodiments, M is at least one element selected from the group: vanadium (V), chromium (Cr), niobium (Nb), molybdenum (Mo), tantalum (Ta), and rhenium (Re).

In some embodiments, the ratio of B to W and M is less than 4 equivalents of B to 1 equivalent of W and M. In some embodiments, the ratio of B to W and M is less than 4.5 equivalents of B to 1 equivalent of W and M. In some embodiments, the ratio of B to W and M is less than 4.6 equivalents of B to 1 equivalent of W and M. In some embodiments, the ratio of B to W and M is less than 4.7 equivalents of B to 1 equivalent of W and M. In some embodiments, the ratio of B to W and M is less than 4.8 equivalents of B to 1 equivalent of W and M. In some embodiments, the ratio of B to W and M is less than 4.9 equivalents of B to 1 equivalent of W and M. In some embodiments, the ratio of B to W and M is less than 5 equivalents of B to 1 equivalent of W and M. In some embodiments, the ratio of B to W and M is less than 5.1 equivalents of B to 1 equivalent of W and M. In some embodiments, the ratio of B to W and M is less than 5.2 equivalents of B to 1 equivalent of W and M. In some embodiments, the ratio of B to W and M is less than 5.3 equivalents of B to 1 equivalent of W and M. In some embodiments, the ratio of B to W and M is less than 5.4 equivalents of B to 1 equivalent of W and M. In some embodiments, the ratio of B to W and M is less than 5.5 equivalents of B to 1 equivalent of W and M. In some embodiments, the ratio of B to W and M is less than 6 equivalents of B to 1 equivalent of W and M. In some embodiments, the ratio of B to W and M is less than 10 equivalents of B to 1 equivalent of W and M.

In some embodiments, x has a value within the range 0.001 to 0.999, inclusive. In some embodiments, x has a value within the range 0.005 to 0.99, 0.01 to 0.95, 0.05 to 0.9, 0.1 to 0.9, 0.001 to 0.6, 0.005 to 0.6, 0.01 to 0.6, 0.05 to 0.6, 0.1 to 0.6, 0.2 to 0.6, 0.3 to 0.6, 0.4 to 0.6, 0.001 to 0.55, 0.005 to 0.55, 0.01 to 0.55, 0.05 to 0.55, 0.1 to 0.55, 0.2 to 0.55, 0.3 to 0.55, 0.4 to 0.55, 0.45 to 0.55, 0.001 to 0.5, 0.005 to 0.5, 0.01 to 0.5, 0.05 to 0.5, 0.1 to 0.5, 0.2 to 0.5, 0.3 to 0.5, 0.4 to 0.5, 0.5 to 0.55, 0.45 to 0.5, 0.001 to 0.4, 0.005 to 0.4, 0.01 to 0.4, 0.05 to 0.4, 0.1 to 0.4, 0.2 to 0.4, 0.001 to 0.3, 0.005 to 0.3, 0.01 to 0.3, 0.05 to 0.3, 0.1 to 0.3, 0.001 to 0.2, 0.005 to 0.2, 0.01 to 0.2, 0.05 to 0.2, or 0.1 to 0.2, inclusively. In some embodiments, x has a value within the range 0.1 to 0.9, inclusively. In some embodiments, x has a value within the range 0.001 to 0.6, 0.005 to 0.6, 0.001 to 0.4, or 0.001 to 0.2, inclusively. In some embodiments, x has a value within the range 0.001 to 0.6, inclusively. In some embodiments, x has a value within the range 0.001 to 0.5, inclusively. In some embodiments, x has a value within the range 0.001 to 0.4, inclusively. In some embodiments, x has a value within the range 0.001 to 0.3, inclusively. In some embodiments, x has a value within the range 0.001 to 0.2, inclusively. In some embodiments, x has a value within the range 0.01 to 0.6, inclusively. In some embodiments, x has a value within the range 0.01 to 0.5, inclusively. In some embodiments, x has a value within the range 0.01 to 0.4, inclusively. In some embodiments, x has a value within the range 0.01 to 0.3, inclusively. In some embodiments, x has a value within the range 0.01 to 0.2, inclusively. In some embodiments, x has a value within the range 0.1 to 0.8, inclusively. In some embodiments, x has a value within the range 0.1 to 0.7, inclusively. In some embodiments, x has a value within the range 0.1 to 0.6, inclusively. In some embodiments, x has a value within the range 0.1 to 0.5, inclusively. In some embodiments, x has a value within the range 0.1 to 0.4, inclusively. In some embodiments, x has a value within the range 0.1 to 0.3, inclusively. In some embodiments, x has a value within the range 0.1 to 0.2, inclusively. In some embodiments, x has a value within the range 0.2 to 0.8, inclusively. In some embodiments, x has a value within the range 0.2 to 0.7, inclusively. In some embodiments, x has a value within the range 0.2 to 0.6, inclusively. In some embodiments, x has a value within the range 0.2 to 0.5, inclusively. In some embodiments, x has a value within the range 0.2 to 0.4, inclusively. In some embodiments, x has a value within the range 0.2 to 0.3, inclusively. In some embodiments, x has a value within the range 0.3 to 0.8, inclusively. In some embodiments, x has a value within the range 0.3 to 0.7, inclusively. In some embodiments, x has a value within the range 0.3 to 0.6, inclusively. In some embodiments, x has a value within the range 0.3 to 0.5, inclusively. In some embodiments, x has a value within the range 0.3 to 0.4, inclusively. In some embodiments, x has a value within the range 0.4 to 0.8, inclusively. In some embodiments, x has a value within the range 0.4 to 0.7, inclusively. In some embodiments, x has a value within the range 0.4 to 0.6, inclusively. In some embodiments, x has a value within the range 0.4 to 0.5, inclusively.

In some embodiments, x is at least 0.001 and less than 0.999. In some embodiments, x is at least 0.001 and less than 0.9. In some embodiments, x is at least 0.001 and less than 0.6. In some embodiments, x is at least 0.001 and less than 0.5. In some embodiments, x is at least 0.001 and less than 0.4. In some embodiments, x is at least 0.001 and less than 0.3. In some embodiments, x is at least 0.001 and less than 0.2. In some embodiments, x is at least 0.001 and less than 0.05. In some embodiments, x is at least 0.01 and less than 0.5. In some embodiments, x is at least 0.01 and less than 0.4. In some embodiments, x is at least 0.01 and less than 0.3. In some embodiments, x is at least 0.01 and less than 0.2. In some embodiments, x is at least 0.1 and less than 0.5. In some embodiments, x is at least 0.1 and less than 0.4. In some embodiments, x is at least 0.1 and less than 0.3. In some embodiments, x is at least 0.1 and less than 0.2.

In some embodiments, x has a value of about 0.001, 0.005, 0.01, 0.05, 0.1, 0.15, 0.2, 0.25, 0.3, 0.35, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.65, 0.7, 0.8, 0.9, 0.95, 0.99, or about 0.999. In some embodiments, x has a value of about 0.001. In some embodiments, x has a value of about 0.005. In some embodiments, x has a value of about 0.01. In some embodiments, x has a value of about 0.05. In some embodiments, x has a value of about 0.1. In some embodiments, x has a value of about 0.15. In some embodiments, x has a value of about 0.2. In some embodiments, x has a value of about 0.3. In some embodiments, x has a value of about 0.4. In some embodiments, x has a value of about 0.41. In some embodiments, x has a value of about 0.42. In some embodiments, x has a value of about 0.43. In some embodiments, x has a value of about 0.44. In some embodiments, x has a value of about 0.45. In some embodiments, x has a value of about 0.46. In some embodiments, x has a value of about 0.47. In some embodiments, x has a value of about 0.48. In some embodiments, x has a value of about 0.49. In some embodiments, x has a value of about 0.5. In some embodiments, x has a value of about 0.51. In some embodiments, x has a value of about 0.52. In some embodiments, x has a value of about 0.53. In some embodiments, x has a value of about 0.54. In some embodiments, x has a value of about 0.55. In some embodiments, x has a value of about 0.56. In some embodiments, x has a value of about 0.57. In some embodiments, x has a value of about 0.58. In some embodiments, x has a value of about 0.59. In some embodiments, x has a value of about 0.6. In some embodiments, x has a value of about 0.7. In some embodiments, x has a value of about 0.8. In some embodiments, x has a value of about 0.9. In some embodiments, x has a value of about 0.99.

In some embodiments, x is 0.001-0.200. In some embodiments, x is 0.201-0.400. In some embodiments, x is 0.401-0.600. In some embodiments, x is 0.601-0.800. In some embodiments, x is 0.801-0.999.

In some embodiments, x is about 0.05. In some embodiments, x is about 0.25. In some embodiments, x is about 0.50. In some embodiments, x is about 0.75. In some embodiments, x is about 0.80. In some embodiments, x is about 0.85. In some embodiments, x is about 0.90. In some embodiments, x is about 0.95.

In some embodiments, y is about 3.5. In some embodiments, y is about 3.75. In some embodiments, y is about 4.0. In some embodiments, y is about 4.25. In some embodiments, y is about 4.5. In some embodiments, y is about 4.75. In some embodiments, y is about 5.0. In some embodiments, y is about 5.5. In some embodiments, y is about 6.0. In some embodiments, y is about 6.5. In some embodiments, y is about 7.0. In some embodiments, y is about 7.5. In some embodiments, y is about 8.0. In some embodiments, y is about 8.5. In some embodiments, y is about 9.0. In some embodiments, y is about 9.5. In some embodiments, y is about 10.0. In some embodiments, y is about 10.5. In some embodiments, y is about 11.0. In some embodiments, y is about 11.5. In some embodiments, y is about 12.0.

In some embodiments, Z is boron. In some embodiments, Z is beryllium. In some embodiments, Z is silicon.

In some embodiments, the composite matrix comprises $W_{1-x}V_xB_4$. In some embodiments, the composite matrix comprises $W_{1-x}Cr_xB_4$. In some embodiments, the composite matrix comprises $W_{1-x}Nb_xB_4$. In some embodiments, the composite matrix comprises $W_{1-x}Mo_xB_4$. In some embodiments, the composite matrix comprises $W_{1-x}Ta_xB_4$. In some embodiments, the composite matrix comprises $W_{1-x}Re_xB_4$.

Additionally disclosed herein, in certain embodiments, is a method of producing a thermodynamically stable tungsten tetraboride composite matrix; the method comprising:
a) adding into a compression chamber a mixture of boron (B) and tungsten (W), wherein the ratio of boron to tungsten is between 4 and 11.9 equivalents of boron to 1 equivalent of tungsten;
b) compressing the mixture to generate a compressed raw mixture;
c) adding the compressed raw mixture to a reaction vessel;
d) generating an inert atmosphere within the reaction vessel by applying a vacuum to the reaction vessel, flushing the reaction vessel with inert gas, or a combination thereof; and
e) heating the reaction vessel to a temperature of between about 1200° C. and about 2200° C. to generate the thermodynamically stable $WB_4$ composite matrix.

In some embodiments, the mixture is heated, melted or sintered in an electrical arc furnace, an induction furnace, or a hot press optionally equipped with a spark plasma sinter.

In some embodiments, the reaction is a solid state reaction. In some embodiments, the reaction requires the partial melting of at least one component in the mixture. In some embodiments, the reaction requires the complete melting of at least one component in the mixture.

In certain embodiments, described herein include methods of making an oxidative resistant composite matrix. In some embodiments, the method of preparing an oxidative resistant composite matrix comprises (a) mixing together the boron and metals for a time sufficient to produce a powder mixture; (b) pressing the powder mixture under a pressure sufficient to generate a pellet; and (c) sintering, heating, or melting the pellet at a temperature sufficient to produce a composite matrix.

In some embodiments, the methods described herein, e.g., for generating a composite matrix of Formula II, a composite matrix of Formula III, a composite matrix of Formula IV, the thermodynamically stable tungsten tetraboride composite matrix, and/or the oxidative resistant composite matrix, require sintering, heating, or melting a mixture of elements under an inert atmosphere or vacuum. In some embodiments, the inert or vacuum atmosphere is introduced after transferring the mixture into the reaction vessel and prior to any heating. In some embodiments, a vacuum is applied to the reaction vessel. In some embodiments, the vacuum is applied for at least 10 minutes, 20 minutes, 30 minutes, or more. In some embodiments, oxygen is removed from the reaction vessel. In some embodiments, vacuum is applied for a time sufficient to remove at least 99% of oxygen from the reaction vessel.

In some embodiments the inert atmosphere is an inert gas such as helium, argon or dinitrogen. In some embodiments, the reaction vessel is purged with an inert gas to generate the inert atmosphere. In some embodiments, the reaction vessel is subjected to at least one cycle of applying a vacuum and flushing the reaction vessel with an inert gas to remove oxygen from the reaction vessel. In some cases, the reaction vessel is subjected to 2, 3, 4, 5, 6, or more cycles of applying a vacuum and flushing the reaction vessel with an inert gas to remove oxygen from the reaction vessel. In some cases, this process is repeated until desired oxygen levels persist.

In some embodiments, the mixture is heated until the boron melts and dissolves the other metals, forming a liquid solution. In some embodiments, the liquid boron does not dissolve the metals, and the mixture is heated until the boron and metals are melted, e.g., in which at least 80%, 85%, 90%, 95%, 99%, or 100% of the boron and metals are melted. In some embodiments, some amount of boron (e.g., less than 10%, 5%, 1%, 0.5%, or 0.1% of boron) is volatilized during heating.

In some embodiments, a mixing time is about 5 minutes to about 6 hours. In some embodiments, the mixing time is about 5 minutes, about 10 minutes, about 15 minutes, about 20 minutes, about 30 minutes, about 45 minutes, about 1 hour, about 1.5 hour, about 2 hours, about 3 hours, about 4 hours, about 5 hours, or about 6 hours. In some embodiments, the mixing time is at least 5 minutes or more. In some embodiments, the mixing time is about 10 minutes or more. In some embodiments, the mixing time is about 20 minutes or more. In some embodiments, the mixing time is about 30 minutes or more. In some embodiments, the mixing time is about 45 minutes or more. In some embodiments, the mixing time is about 1 hour or more. In some embodiments, the mixing time is about 2 hours or more. In some embodiments, the mixing time is about 3 hours or more. In some embodiments, the mixing time is about 4 hours or more. In some embodiments, the mixing time is about 5 hours or more. In some embodiments, the mixing time is about 6 hours or more. In some embodiments, the mixing time is about 8 hours or more. In some embodiments, the mixing time is about 10 hours or more. In some embodiments, the mixing time is about 12 hours or more.

In some embodiments, a pressure of up to 36,000 psi is utilized to generate a pellet. In some embodiments, the pressure is up to 34,000 psi. In some embodiments, the pressure is up to 32,000 psi. In some embodiments, the pressure is up to 30,000 psi. In some embodiments, the pressure is up to 28,000 psi. In some embodiments, the pressure is up to 26,000 psi. In some embodiments, the pressure is up to 24,000 psi. In some embodiments, the pressure is up to 22,000 psi. In some embodiments, the pressure is up to 20,000 psi. In some embodiments, the pressure is up to 18,000 psi. In some embodiments, the pressure is up to 16,000 psi. In some embodiments, the pressure is up to 15,000 psi. In some embodiments, the pressure is up to 14,000 psi. In some embodiments, the pressure is up to 10,000 psi. In some embodiments, the pressure is up to 8,000 psi. In some embodiments, the pressure is up to 5,000 psi. In some embodiments, the pressure is up to 3,000 psi. In some embodiments, the pressure is up to 2,000 psi. In some embodiments, the pressure is up to 1,000 psi.

In some embodiments, the pellets are compressed using a hydraulic press. In some embodiments, the powder is compressed under a 1-20 ton load. In some embodiments, the powder is compressed under a 2-18 ton load. In some embodiments, the powder is compressed under a 4-16 ton load. In some embodiments, the powder is compressed under a 6-14 ton load. In some embodiments, the powder is compressed under a 8-12 ton load. In some embodiments, the powder is compressed under a 9-11 ton load.

In some embodiments, the pellets are compressed using a hydraulic press. In some embodiments, the powder is compressed under a 1 ton load. In some embodiments, the powder is compressed under a 2 ton load. In some embodiments, the powder is compressed under a 3 ton load. In some embodiments, the powder is compressed under a 4 ton load. In some embodiments, the powder is compressed under a 5 ton load. In some embodiments, the powder is compressed under a 6 ton load. In some embodiments, the powder is compressed under a 7 ton load. In some embodiments, the powder is compressed under an 8 ton load. In some embodiments, the powder is compressed under a 9 ton load. In some embodiments, the powder is compressed under a 10 ton load. In some embodiments, the powder is compressed under a 11 ton load. In some embodiments, the powder is compressed under a 12 ton load. In some embodiments, the powder is compressed under a 13 ton load. In some embodiments, the powder is compressed under a 14 ton load. In some embodiments, the powder is compressed under a 15 ton load. In some embodiments, the powder is compressed under a 20 ton load. In some embodiments, the metal and boron are compressed into a form that is not a pellet.

In some embodiments, a method described herein further comprises sintering, heating, or melting a mixture of elements. In some embodiments, the mixture has been blended. In some embodiments, the sintering, heating, or melting generates a composite matrix. In some embodiments, the temperature during sintering, heating, or melting is from 1000° C. to 4000° C. In some embodiments, the temperature during sintering, heating, or melting is from 1100° C. to 3600° C. In some embodiments, the temperature during sintering, heating, or melting is from 1200° C. to 2200° C. In some embodiments, the temperature during sintering, heating, or melting is from 1300° C. to 2200° C. In some embodiments, the temperature during sintering, heating, or melting is from 1400° C. to 2200° C. In some embodiments, the temperature during sintering, heating, or melting is from 1000° C. to 1800° C. In some embodiments, the temperature during sintering, heating, or melting is from 1000° C. to 1700° C. In some embodiments, the temperature during sintering, heating, or melting is from 1200° C. to 1800° C. In some embodiments, the temperature during sintering, heating, or melting is from 1300° C. to 1700° C. In some embodiments, the temperature during sintering, heating, or melting is from 1000° C. to 1600° C. In some embodiments, the temperature during sintering, heating, or melting is from 1500° C. to 1800° C. In some embodiments, the temperature during sintering, heating, or melting is from 1500° C. to 1700° C. In some embodiments, the temperature during sintering, heating, or melting is from 1500° C. to 1600° C. In some embodiments, the temperature during sintering, heating, or melting is from 1600° C. to 2200° C. In some embodiments, the temperature during sintering, heating, or melting is from 1600° C. to 1900° C. In some embodiments, the temperature during sintering, heating, or melting is from 1600° C. to 1800° C. In some embodiments, the temperature during sintering, heating, or melting is from 1600° C. to 1700° C. In some embodiments, the temperature during sintering, heating, or melting is from 1700° C. to 2200° C. In some embodiments, the temperature during sintering, heating, or melting is from 1700° C. to 1900° C. In some embodiments, the temperature during sintering, heating, or melting is from 1700° C. to 1800° C. In some embodiments, the temperature during sintering, heating, or melting is from 1800° C. to 2000° C. In some embodiments, the temperature during sintering, heating, or melting is from 1800° C. to 1900° C. In some embodiments, the temperature during sintering, heating, or melting is from 1900° C. to 2200° C.

In some embodiments, the temperature for sintering, heating or melting is about 1000° C., about 1100° C., about 1200° C., about 1300° C., about 1400° C., about 1500° C., about 1600° C., about 1700° C., about 1800° C., about 1900° C., about 2000° C., 2100° C., 2200° C., or 2300° C. In some embodiments, the temperature is about 1000° C. In some embodiments, the temperature is about 1100° C. In some embodiments, the temperature is about 1200° C. In some embodiments, the temperature is about 1300° C. In some embodiments, the temperature is about 1400° C. In some embodiments, the temperature is about 1500° C. In some embodiments, the temperature is about 1600° C. In some embodiments, the temperature is about 1700° C. In some embodiments, the temperature is about 1800° C. In some embodiments, the temperature is about 1900° C. In some embodiments, the temperature is about 2000° C. In some embodiments, the temperature is about 2100° C. In some embodiments, the temperature is about 2200° C. In some embodiments, the temperature is about 2300° C.

In some embodiments the mixture is heated for about 5 minutes, 10 minutes, 15 minutes, 20 minutes, 30 minutes, 60 minutes, 90 minutes, 120 minutes, 180 minutes, 240 minutes, 300 minutes, 360 minutes, 420 minutes, 480 minutes, 540 minutes, or more.

In some embodiments, heating occurs through heating the crucible or heating the composition to a target temperature. In some embodiments, heating the crucible or reaction occurs at a rate of about 1° C. per minute. In some embodiments, heating the crucible or reaction occurs at a rate of about 5° C. per minute. In some embodiments, heating the crucible or reaction occurs at a rate of about 10° C. per minute. In some embodiments, heating the crucible or reaction occurs at a rate of about 15° C. per minute. In some embodiments, heating the crucible or reaction occurs at a rate of about 20° C. per minute. In some embodiments, heating the crucible or reaction occurs at a rate of about 25° C. per minute. In some embodiments, heating the crucible or reaction occurs at a rate of about 30° C. per minute. In some embodiments, heating the crucible or reaction occurs at a rate of about 35° C. per minute. In some embodiments, heating the crucible or reaction occurs at a rate of about 40° C. per minute. In some embodiments, heating the crucible or reaction occurs at a rate of about 45° C. per minute. In some embodiments, heating the crucible or reaction occurs at a rate of about 50° C. per minute. In some embodiments, heating the crucible or reaction occurs at a rate of about 55° C. per minute. In some embodiments, heating the crucible or reaction occurs at a rate of about 60° C. per minute. In some embodiments, heating the crucible or reaction occurs at a rate of about 65° C. per minute. In some embodiments, heating the crucible or reaction occurs at a rate of about 70° C. per minute. In some embodiments, heating the crucible or reaction occurs at a rate of about 75° C. per minute. In some embodiments, heating the crucible or reaction occurs at a rate of about 80° C. per minute. In some embodiments, heating the crucible or reaction occurs at a rate of about 90° C. per minute. In some embodiments, heating the crucible or reaction occurs at a rate of about 100° C. per minute.

In some embodiments, heating the crucible or reaction occurs at a rate of about 1° C. to about 100° C. In some embodiments, heating the crucible or reaction occurs at a rate of at least about 1° C. In some embodiments, heating the crucible or reaction occurs at a rate of at most about 100° C. In some embodiments, heating the crucible or reaction occurs at a rate of about 1° C. to about 5° C., about 1° C. to about 10° C., about 1° C. to about 20° C., about 1° C. to about 30° C., about 1° C. to about 40° C., about 1° C. to about 50° C., about 1° C. to about 60° C., about 1° C. to about 70° C., about 1° C. to about 80° C., about 1° C. to about 90° C., about 1° C. to about 100° C., about 5° C. to about 10° C., about 5° C. to about 20° C., about 5° C. to about 30° C., about 5° C. to about 40° C., about 5° C. to about 50° C., about 5° C. to about 60° C., about 5° C. to about 70° C., about 5° C. to about 80° C., about 5° C. to about 90° C., about 5° C. to about 100° C., about 10° C. to about 20° C., about 10° C. to about 30° C., about 10° C. to about 40° C., about 10° C. to about 50° C., about 10° C. to about 60° C., about 10° C. to about 70° C., about 10° C. to about 80° C., about 10° C. to about 90° C., about 10° C. to about 100° C., about 20° C. to about 30° C., about 20° C. to about 40° C., about 20° C. to about 50° C., about 20° C. to about 60° C., about 20° C. to about 70° C., about 20° C. to about 80° C., about 20° C. to about 90° C., about 20° C. to about 100° C., about 30° C. to about 40° C., about 30° C. to about 50° C., about 30° C. to about 60° C., about 30° C. to about 70° C., about 30° C. to about 80° C., about 30° C. to about 90° C., about 30° C. to about 100° C., about 40° C. to about 50° C., about 40° C. to about 60° C., about 40° C. to about 70° C., about 40° C. to about 80° C., about 40° C. to about 90° C., about 40° C. to about 100° C., about 50° C. to about 60° C., about 50° C. to about 70° C., about 50° C. to about 80° C., about 50° C. to about 90° C., about 50° C. to about 100° C., about 60° C. to about 70° C., about 60° C. to about 80° C., about 60° C. to about 90° C., about 60° C. to about 100° C., about 70° C. to about 80° C., about 70° C. to about 90° C., about 70° C. to about 100° C., about 80° C. to about 90° C., about 80° C. to about 100° C., or about 90° C. to about 100° C.

In some embodiments, heating occurs through heating the crucible or heating the composition to a target temperature. The reaction or crucible temperature is then held for a period of time. In some embodiments, the reaction or crucible is held at a target temperature for about 5 minutes, 10 minutes, 15 minutes, 20 minutes, 30 minutes, 60 minutes, 90 minutes, 120 minutes, 180 minutes, 240 minutes, 300 minutes, 360 minutes, 420 minutes, 480 minutes, 540 minutes, or more.

In some embodiments, sintering, heating, or melting is carried out using an electrical current. In some embodiments, melting is carried out by arc-melting. In some embodiments, arc melting is carried out with a current (I) of 50 Amps (A) or more. In some embodiments, arc melting is carried out with a I of 60 A or more. In some embodiments, arc melting is carried out with a I of 65 A or more. In some embodiments, arc melting is carried out with a I of 70 A or more. In some embodiments, arc melting is carried out with a I of 75 A or more. In some embodiments, arc melting is carried out with a I of 80 A or more. In some embodiments, arc melting is carried out with a I of 90 A or more. In some embodiments, arc melting is carried out with a I of 100 A or more.

In some embodiments, the arc furnace electrode is made of graphite or tungsten metal. In some embodiments, the reaction vessel is water cooled.

In some embodiments, arc melting is performed in an inert gas atmosphere. In some embodiments, arc melting is performed in an argon atmosphere. In some embodiments, arc melting is performed in a helium atmosphere. In some embodiments, arc melting is performed in a dinitrogen atmosphere.

In some embodiments, arc melting is performed for 0.01-10 mins. In some embodiments, arc melting is performed for 0.01-8 mins. In some embodiments, arc melting is performed for 0.01-6 mins. In some embodiments, arc melting is performed for 0.01-5 mins. In some embodiments, arc melting is performed for 0.01-4 mins. In some embodiments, arc melting is performed for 0.5-3 mins. In some embodiments, arc melting is performed for 0.8-2.5 mins. In some embodiments, arc melting is performed for 1-2 mins.

In some embodiments, arc melting is performed until the mixture has become melted. The melting of the mixture may be observed by visually, or by changes in mixtures properties, for example changes in resistance, heat capacity, heat flow, or temperature. In some embodiments, arc melting is performed until the mixture has become partially melted. In some embodiments, arc melting is performed until the mixture has become mostly melted. In some embodiments, arc melting is performed until the mixture has become completely melted. In some embodiments, arc melting is performed until the mixture has become at least 50%, 60%, 70%, 80%, 85%, 90%, 95%, or 99% melted. In some embodiments, arc melting is performed until the mixture has become about 50%, 60%, 70%, 80%, 85%, 90%, 95%, or 99% melted.

In some embodiments, sintering is carried out at room temperature. In some cases, sintering is carried out at a temperature range of between about 23° C. and about 27° C. In some cases, sintering is carried out at a temperature of about 24° C., about 25° C., or about 26° C.

In some embodiments, a sintering, heating, or melting described herein involves an elevated temperature and an elevated pressure, e.g., hot pressing. Hot pressing is a process involving a simultaneous application of pressure and high temperature, which can accelerate the rate of densification of a material (e.g., a composite matrix described herein). In some embodiments, a temperature from 1000° C. to 2200° C. and a pressure of up to 36,000 psi are used during hot pressing. In some embodiments, heating is achieved by plasma spark sintering.

In other embodiments, a sintering step described herein involves an elevated pressure and room temperature, e.g., cold pressing. In such embodiments, pressure of up to 36,000 psi is used.

In some embodiment, a sintering, heating, or melting described herein is carried out in a furnace. In some embodiments the furnace is an induction furnace. In some embodiments, the induction furnace is heated by electromagnetic induction. In some embodiments, the electromagnetic radiation used for electromagnetic induction has the frequency and wavelength of radio waves. In some embodiments, the electromagnetic radiation used for electromagnetic induction has the frequency from about 3 Hz to about 300 GHz and a wavelength from 1 mm to 10,000 km. In some embodiments, the frequency is from about 3 Hz to about 30 Hz. In some embodiments, the frequency is from about 30 Hz to about 300 Hz. In some embodiments, the frequency is from about 300 Hz to about 3000 Hz. In some embodiments, the frequency is from about 3 kHz to about 30 kHz. In some embodiments, the frequency is from about 30 kHz to about 300 kHz. In some embodiments, the frequency is from about 300 kHz to about 3000 kHz. In some embodiments, the frequency is from about 3 MHz to about 30 MHz. In some embodiments, the frequency is from about 30 MHz to about 300 MHz. In some embodiments, the frequency is from about 300 MHz to about 3000 MHz. In some embodiments, the frequency is from about 3 GHz to about 30 GHz. In some embodiments, the frequency is from about 30 GHz to about 300 GHz.

In some embodiments, the reaction vessel is lined with carbon graphite which is inductively heated by electromagnetic radiation with a frequency of 10-50 kHz. In some embodiments, the frequency is from about 50 Hz to about 400 kHz. In some embodiments, the frequency is from about 60 Hz to about 400 kHz. In some embodiments, the frequency is from about 100 Hz to about 400 kHz. In some embodiments, the frequency is from about 1 kHz to about 400 kHz. In some embodiments, the frequency is from about 10 kHz to about 300 kHz.

In some embodiments, the frequency is from about 50 kHz to about 200 kHz. In some embodiments, the frequency is from about 100 kHz to about 200 kHz. In some embodiments, the frequency is from about 1 kHz to about 50 kHz. In some embodiments, the frequency is from about 50 kHz to about 100 kHz.

In some embodiments, heating or melting described herein is carried out in a conventional furnace. In some embodiments, a conventional furnace heats the crucible or sample through the use of metal coils or combustion.

In some embodiments, the raw mixtures react with oxygen and carbon upon heating. Heating the mixture by electrical arc furnace, induction furnace, conventional furnace, hot pressing or plasma sintering requires that the majority of the raw mixture not come in contact with oxygen or carbon. In some embodiments, the reaction mixture (compressed or otherwise) is optionally shielded from the reaction chamber by an insulating material. In some embodiments, the reaction mixture is optionally shielded from the reaction chamber by an electrically insulating material. In some embodiments, at most about 95%, 90%, 85%, 80%, 70%, 60%, 50%, 40%, 30%, or less of the surface of the mixture is optionally shielded from the reaction chamber by the electrically insulating material. In some embodiments, the insulating material comprises hexagonal boron nitride (h-BN). In some embodiments, the insulating material does not contain carbon. In some embodiments, the compressed raw mixture is shielded from the arc furnace electrode by the electrically insulating material, optionally comprising hexagonal boron nitride.

In some embodiments, the reaction chamber is separated from the reaction mixture by a liner. In some embodiments, the liner is an h-BN liner. In some embodiments, the liner is a metal liner. In some embodiments, the liner is comprised of one or more transition elements. In some embodiments, the metal liner comprises a group 4, group 5, group 6, or group 7 transition metal. In some embodiments, the metal liner comprises at least one of the following elements: Ti, Zr, Hf, V, Nb, Ta, Cr, Mo, W, Mn, Tc, and Re. In some embodiments, the metal liner comprises Nb, Ta, Mo, or W. In some embodiments, the metal liner comprises Nb. In some embodiments, the metal liner comprises Ta. In some embodiments, the metal liner comprises Mo. In some embodiments, the metal liner comprises W.

In some embodiments, the liner has a thickness of about 0.05 mm. In some embodiments, the liner has a thickness of about 0.10 mm. In some embodiments, the liner has a thickness of about 0.15 mm. In some embodiments, the liner has a thickness of about 0.20 mm. In some embodiments, the liner has a thickness of about 0.25 mm. In some embodiments, the liner has a thickness of about 0.30 mm. In some embodiments, the liner has a thickness of about 0.05 mm. In some embodiments, the liner has a thickness of about 0.35 mm. In some embodiments, the liner has a thickness of about 0.40 mm. In some embodiments, the liner has a thickness of about 0.05 mm. In some embodiments, the liner has a thickness of about 0.45 mm. In some embodiments, the liner has a thickness of about 0.50 mm. In some embodiments, the liner has a thickness of about 0.75 mm. In some embodiments, the liner has a thickness of about 1.0 mm. In some embodiments, the liner has a thickness of about 5.0 mm. In some embodiments, the liner has a thickness of about 10.0 mm.

In some embodiments, the liner has a thickness of greater than or about 0.05 mm. In some embodiments, the liner has a thickness of greater than or about 0.10 mm. In some embodiments, the liner has a thickness of greater than or about 0.15 mm. In some embodiments, the liner has a thickness of greater than or about 0.20 mm. In some embodiments, the liner has a thickness of greater than or about 0.25 mm. In some embodiments, the liner has a thickness of greater than or about 0.30 mm. In some embodiments, the liner has a thickness of greater than or about 0.05 mm. In some embodiments, the liner has a thickness of greater than or about 0.35 mm. In some embodiments, the liner has a thickness of greater than or about 0.40 mm. In some embodiments, the liner has a thickness of greater than or about 0.05 mm. In some embodiments, the liner has a thickness of greater than or about 0.45 mm. In some embodiments, the liner has a thickness of greater than or about 0.50 mm. In some embodiments, the liner has a thickness of greater than or about 0.75 mm. In some embodiments, the liner has a thickness of greater than or about 1.0 mm. In some embodiments, the liner has a thickness of greater than or about 5.0 mm. In some embodiments, the liner has a thickness of greater than or about 10.0 mm.

In some embodiments, the mixture is completely melted by arc melting, induction furnace, or conventional furnace and allowed to cool. The rate of cooling contributes to the size of the crystallites that form within the composite matrix. In some embodiments, the composite matrix is composed of crystallites that are less than 10,000 micrometer in size. In some embodiments, the composite matrix is composed of crystallites that are less than 1000 micrometer in size. In some embodiments, the composite matrix is composed of crystallites that are less than 500 micrometer in size. In some embodiments, the composite matrix is composed of crystallites that are less than 400 micrometer in size. In some embodiments, the composite matrix is composed of crystallites that are less than 300 micrometer in size. In some embodiments, the composite matrix is composed of crystallites that are less than 200 micrometer in size. In some embodiments, the composite matrix is composed of crystallites that are less than 100 micrometer in size. In some embodiments, the composite matrix is composed of crystallites that are less than 75 micrometer in size. In some embodiments, the composite matrix is composed of crystallites that are less than 50 micrometer in size. In some embodiments, the composite matrix is composed of crystallites that are less than 25 micrometer in size. In some embodiments, the composite matrix is composed of crystallites that are less than 20 micrometer in size. In some embodiments, the composite matrix is composed of crystallites that are less than 10 micrometer in size. In some embodiments, the composite matrix is composed of crystallites that are less than 5 micrometer in size. In some embodiments, the composite matrix is composed of crystallites that are less than 4 micrometer in size. In some embodiments, the composite matrix is composed of crystallites that are less than 3 micrometer in size. In some embodiments, the composite matrix is composed of crystallites that are less than 2 micrometer in size. In some embodiments, the composite matrix is composed of crystallites that are less than 1 micrometer in size.

In some embodiments, the reaction vessel is water cooled. In some embodiments, the reaction vessel is graphite lined.

In some embodiments, the composite matrix is crystalline. In some embodiments, the composite matrix exhibits an X-ray powder diffraction pattern containing one or more peaks found in the X-ray powder diffraction pattern of $WB_4$ seen in Table 3. In some embodiments, the composite matrix exhibits at least one X-ray powder diffraction pattern peak at about 24.2. In some embodiments, the composite matrix exhibits at least one X-ray powder diffraction pattern peak at about 34.5. In some embodiments, the composite matrix exhibits at least one X-ray powder diffraction pattern peak at about 45.1. In some embodiments, the composite matrix exhibits at least one X-ray powder diffraction pattern peak at about 47.5. In some embodiments, the composite matrix exhibits at least one X-ray powder diffraction pattern peak at about 61.8. In some embodiments, the composite matrix exhibits at least one X-ray powder diffraction pattern peak at about 69.2. In some embodiments, the composite matrix exhibits at least one X-ray powder diffraction pattern peak at about 69.4. In some embodiments, the composite matrix exhibits at least one X-ray powder diffraction pattern peak at about 79.7. In some embodiments, the composite matrix exhibits at least one X-ray powder diffraction pattern peak at about 89.9. In some embodiments, the composite matrix exhibits at least one X-ray powder diffraction pattern peak at about 110.2. In some embodiments, the composite matrix exhibits at least one X-ray powder diffraction pattern peak at about 34.5 or about 45.1. In some embodiments, the composite matrix exhibits at least one X-ray powder diffraction pattern peak at about 47.5, about 61.8, about 69.2, about 69.4, about 79.7, about 89.9, about or about 110.2. In some embodiments, the composite matrix exhibits at least one X-ray powder diffraction pattern peak at about 24.2, about 28.1, about 34.5, about 42.5, about 45.1, about 47.5, about 55.9, about 61.8, about 69.2, about 69.4±0.2, 79.7, about 89.9, or about 110.2. In some embodiments, the composite matrix exhibits at least two X-ray powder diffraction pattern peaks at about 24.2, about 28.1, about 34.5, about 42.5, about 45.1, about 47.5, about 55.9, about 61.8, about 69.2, about 69.4±0.2, 79.7, about 89.9, or about 110.2. In some embodiments, the composite matrix exhibits at least three X-ray powder diffraction pattern peaks at about 24.2, about 28.1, about 34.5, about 42.5, about 45.1, about 47.5, about 55.9, about 61.8, about 69.2, about 69.4±0.2, 79.7, about 89.9, or about 110.2. In some embodiments, the composite matrix exhibits at least four X-ray powder diffraction pattern peaks at about 24.2, about 28.1, about 34.5, about 42.5, about 45.1, about 47.5, about 55.9, about 61.8, about 69.2, about 69.4±0.2, 79.7, about 89.9, or about 110.2. In some embodiments, the composite matrix exhibits at least five X-ray powder diffraction pattern peaks at about 24.2, about 28.1, about 34.5, about 42.5, about 45.1, about 47.5, about 55.9, about 61.8, about 69.2, about 69.4±0.2, 79.7, about 89.9, or about 110.2. In some embodiments, the composite matrix exhibits at least six X-ray powder diffraction pattern peaks at about 24.2, about 28.1, about 34.5, about 42.5, about 45.1, about 47.5, about 55.9, about 61.8, about 69.2, about 69.4±0.2, 79.7, about 89.9, or about 110.2.

Tools and Abrasive Materials

Wear and tear are part of the normal use of tools and machines. There are different types of wear mechanisms, including, for example, abrasion wear, adhesion wear, attrition wear, diffusion wear, fatigue wear, edge chipping (or premature wear), and oxidation wear (or corrosive wear). Abrasion wear occurs when the hard particle or debris, such as chips, passes over or abrades the surface of a cutting tool. Adhesion wear or attrition wear occurs when debris removes microscopic fragments from a tool. Diffusion wear occurs when atoms in a crystal lattice move from a region of high concentration to a region of low concentration and the move weakens the surface structure of a tool. Fatigue wear occurs at a microscopic level when two surfaces slide in contact with each other under high pressure, generating surface cracks. Edge chipping or premature wear occurs as small breaking away of materials from the surface of a tool. Oxidation wear or corrosive wear occurs as a result of a chemical reaction between the surface of a tool and oxygen.

In some embodiments, a composite matrix described herein (e.g., a composite matrix of Formula I, a composite matrix of Formula II, a composite matrix of Formula III, and/or a composite matrix of Formula IV) is used to make, modify, or coat a tool or an abrasive material. In some embodiments, a composite matrix described herein (e.g., a composite matrix of Formula I, a composite matrix of Formula II, a composite matrix of Formula III, and/or a composite matrix of Formula IV) is coated onto the surface of a tool or an abrasive material. In some embodiments, the surface of a tool or an abrasive material is modified with a composite matrix described herein (e.g., a composite matrix of Formula I, a composite matrix of Formula II, a composite matrix of Formula III, and/or a composite matrix of Formula IV). In some embodiments, the surface of a tool or abrasive material comprises a composite matrix described herein (e.g., a composite matrix of Formula I, a composite matrix of Formula II, a composite matrix of Formula III, and/or a composite matrix of Formula IV).

In some embodiments, a tool or abrasive material comprises a cutting tool. In some embodiments, a tool or abrasive material comprises a tool or a component of a tool for cutting, drilling, etching, engraving, grinding, carving, or polishing. In some embodiments, a tool or abrasive material comprises a metal bond abrasive tool, for example, such as a metal bond abrasive wheel or grinding wheel. In some embodiments, a tool or abrasive material comprises drilling tools. In some embodiments, a tool or abrasive material comprises drill bits, inserts or dies. In some embodiments, a tool or abrasive material comprises tools or components used in downhole tooling. In some embodiments, a tool or abrasive material comprises an etching tool. In some embodiments, a tool or abrasive material comprises an engraving tool. In some embodiments, a tool or abrasive material comprises a grinding tool. In some embodiments, a tool or abrasive material comprises a carving tool. In some embodiments, a tool or abrasive material comprises a polishing tool.

Certain Terminologies

Unless defined otherwise, all technical and scientific terms used herein have the same meaning as is commonly understood by one of skill in the art to which the claimed subject matter belongs. It is to be understood that the detailed description are exemplary and explanatory only and are not restrictive of any subject matter claimed. In this application, the use of the singular includes the plural unless specifically stated otherwise. It must be noted that, as used in the specification, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

Although various features of the disclosure may be described in the context of a single embodiment, the features may also be provided separately or in any suitable combination. Conversely, although the disclosure may be described herein in the context of separate embodiments for clarity, the disclosure may also be implemented in a single embodiment.

Reference in the specification to "some embodiments", "an embodiment", "one embodiment" "another embodiment" or "other embodiments" means that a particular feature, structure, or characteristic described in connection with the embodiments is included in at least some embodiments, but not necessarily all embodiments, of the disclosure.

As used herein, ranges and amounts can be expressed as "about" a particular value or range. About also includes the exact amount. Hence "about 5 GPa" means "about 5 GPa" and also "5 GPa." Generally, the term "about" includes an amount that would be expected to be within experimental error, e.g., ±5%, ±10% or ±15%. In some embodiments, "about" includes ±5%. In some embodiments, "about" includes ±10%. In some embodiments, "about" includes ±15%. In some embodiments, when refereeing to X-ray powder diffraction peaks at 2 theta, the term "about" includes ±0.2 Angstroms.

The term "partially" is meant to describe an amount that is less that is less than 95%.

The term "completely" is meant to describe an amount that is equal to or more than 95%.

The term "thermodynamically stable" or "stable" describes a state of matter that that is in chemical equilibrium with its environment at 23° C. and at 1 atmosphere of pressure. Stable states described herein do not consume or release energy at 23° C. and 1 atm.

The term "composite matrix" and "composite" can be used interchangeably, and refers to a collection of atoms wherein at least one component is crystalline $W_{1-x}M_xB_4$ with variables M and x described above. The at least one component of crystalline $W_{1-x}M_xB_4$ exhibits X-ray powder diffraction peaks as disclosed herein. In some embodiments, the composite matrix comprises crystalline $W_{1-x}M_xB_4$. In some embodiments, the composite matrix consists essentially of crystalline $W_{1-x}M_xB_4$.

The section headings used herein are for organizational purposes only and are not to be construed as limiting the subject matter described.

EXAMPLES

These examples are provided for illustrative purposes only and not to limit the scope of the claims provided herein.

Example 1. X-Ray Diffraction

Powder XRD was carried out on a Bruker D8 Discover Powder X-ray Diffractometer (Bruker Corporation, Germany) utilizing $Cu_{K\alpha}$ X-ray radiation ($\lambda=1.5418$ Å). The following scan parameters were used: 5-100° 2θ range, time per step of 0.3 sec, step size of 0.0353° with a scan speed of 0.1055°/sec. In order to determine the phases present in the powder X-ray diffraction data, the Joint Committee on Powder Diffraction Standards (JCPDS) database was utilized. The composition and purity of the samples were determined on an FEI Nova 230 high resolution scanning electron microscope (FEI Company, U.S.A.) with an Ultra-Dry EDS detector (Thermo Scientific, U.S.A.). Rietveld refinement utilizing Maud software was carried out to determine the cell parameters.

Table 1 shows unit cell data, density and % phase for $WB_4$ prepared with variable boron to metal ratios by arc-melting. The density of "pure" $WB_4$ is between 8.5-9.5 g/cm3, which would not account for the excess boron which precipitates at the grain boundaries. In the case of "real world" samples, with an excess of boron, such that the formulation is W:B, 1:10 (up to 1:12), samples will have a density of 5.15 g/cm3. The density decreases as the boron content increases due to the presence of crystalline boron at grain boundaries. Boron has a density of 2.29 g/cm3, therefore the weighted average is shifted to a lower overall density.

Figure 2:
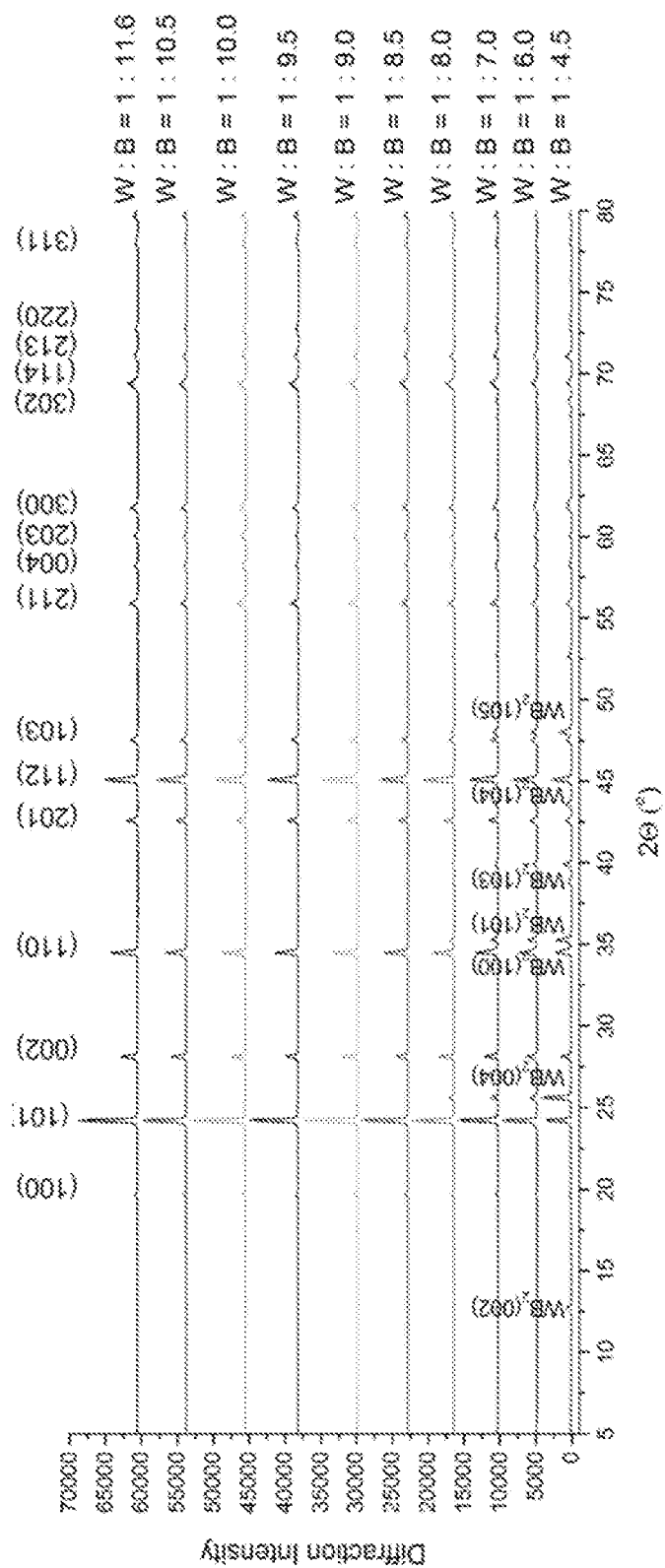
FIG. 2 shows X-ray powder diffractograms of $WB_x$ with variable boron content.

The crystal structure of tungsten tetraboride ($P6_3$/mmc) is shown in FIG. 1. Tungsten atoms are shown in black, while boron atoms are shown in half grey; half-filled atoms to depict partial occupancy. X-ray powder diffractograms of $WB_4$ prepared by arc melting with a variable boron composition FIG. 2. Tungsten tetraboride forms at all ratios of W:B; tungsten diboride, $WB_2$ appears below W:B ratio of 1:9.0.

TABLE 1

| W:B | a (Å) | c (Å) | ρ (g/cm³) | % β-B | % WB₂ + WB₄ |
|---|---|---|---|---|---|
| 1:11.6 | 5.202(1) | 6.341(1) | 5.15$^d$ | 44.42 | 55.78 |
| 1:11.0 | 5.201(3) | 6.338(1) | 5.38 | — | — |
| 1:10.5 | 5.202(3) | 6.338(3) | 5.44 | 48.28 | 51.72 |
| 1:10.0 | 5.203(5) | 6.340(2) | 5.69 | — | — |
| 1:9.5 | 5.201(1) | 6.337(3) | 5.73 | 43.15 | 56.85 |
| 1:9.0 | 5.201(2) | 6.336(2) | 6.12 | 42.95 | 57.05 |
| 1:8.5 | 5.201(4) | 6.337(2) | 6.29 | 36.18 | 63.82 |
| 1:8.0 | 5.203(4) | 6.338(4) | 6.82 | 34.89 | 65.11 |
| 1:7.0 | 5.200(2) | 6.335(1) | 7.51 | 32.81 | 67.19 |
| 1:6.0 | 5.202(1) | 6.338(1) | 7.94 | 30.53 | 69.47 |
| 1:4.5 | 5.200(1) | 6.336(2) | 8.46 | 21.50 | 78.50 |

The standard deviations are given in brackets; % phase values calculated from area analysis of SEM images; density of tungsten tetraboride phase from XRD is 8.40 g/cm³.

Density (ρ) measurements were performed utilizing a density determination kit (Mettler-Toledo, U.S.A.) by measuring the weights of the samples in air and in an auxiliary liquid (ethanol); the density was calculated using the following formula:

$$\rho = \frac{A}{A-B}(\rho_0 - \rho_L) + \rho_L$$

where A is the weight of the sample in air, B is the weight of the sample in the auxiliary liquid (ethanol), $\rho_0$ is the density of auxiliary liquid (ethanol—0.789 g/cm³), and $\rho_L$ is the density of air (0.0012 g/cm³).

These data show that the tungsten tetraboride phase, is present at all tungsten to boron ratios. Moreover, $WB_4$ without any secondary tungsten-boron phases can be readily prepared with a W:B ratio of 1:11.6 to 1:9.0; however, due to the stoichiometry used, excess crystalline boron (β-rhombohedral boron) will be present in the samples. A lower boride phase, tungsten diboride appears at W:B ratios of less than or equal to 1:11.6, as seen from the phase diagram; from the pXRD, the diboride peaks show at W:B ratios at 1:8.5 and lower. Analyzing the phase diagram for the tungsten-boron system, it should be noted that since tungsten tetraboride is an incongruently melting phase and a peritectic decomposition product, it can coexist with excess boron upon cooling a melt of nominal composition W:B of 1:4. Table 1 provides the unit cell data for $WB_4$, which indicates that for boron ratios of 11.6 down to 4.5 there are no significant changes in the lattice parameters for the tungsten tetraboride phase.

Table 2 shows unit cell data for $W_{1-x}Ta_xB_4$ prepared by arc melting and with a boron to metal ratio of 4.5 to 1. X-ray powder diffractograms of $W_{1-x}Ta_xB_4$ shown in FIG. 2. Tungsten tetraboride, forms at all concentrations of Ta; tungsten diboride, $WB_2$ disappears at a tantalum content of 25 at. % Ta, visible $TaB_2$ peaks appear at a tantalum content of 50 at. % Ta. The sample with a composition of $W_{0.668}Ta_{0.332}B_4$ contains only $WB_4$ peaks.

TABLE 2

| Alloy | at. % Ta | a (Å) | c (Å) |
|---|---|---|---|
| $WB_4$ | 0.0 | 5.200(1) | 6.336(2) |
| $W_{0.917}Ta_{0.083}B_4$ | 8.3 | 5.209(2) | 6.353(3) |
| $W_{0.834}Ta_{0.166}B_4$ | 16.6 | 5.216(3) | 6.365(2) |
| $W_{0.750}Ta_{0.250}B_4$ | 25.0 | 5.217(2) | 6.365(4) |
| $W_{0.668}Ta_{0.332}B_4$ | 33.2 | 5.224(3) | 6.377(4) |
| $W_{0.585}Ta_{0.415}B_4$ | 41.5 | 5.232(2) | 6.398(3) |
| $W_{0.500}Ta_{0.500}B_4$ | 50.0 | 5.242(1) | 6.417(2) |

The standard deviations are given in brackets.

Table 3 shows X-ray powder diffraction data collected from the crystalline $WB_4$ synthesized by the methods disclosed herein. Table 3 contains the location of each diffraction peak in terms of Miller indices (h,k,l), distance (Angstroms), and 2 theta (degrees). Table 3 also contains the relative intensity of each diffraction peak as compared to the diffraction peak located at 2 theta=24.232. The diffraction data was collected at 293 K with an X-ray diffractometer utilizing a Copper radiation source ($\lambda$=1.5418 Å).

TABLE 3

| No. | h | k | l | d[Å] | 2 Theta[deg] | I[%] |
|---|---|---|---|---|---|---|
| 1 | 1 | 0 | 0 | 4.51000 | 19.668 | 4.0 |
| 2 | 1 | 0 | 1 | 3.67000 | 24.232 | 100.0 |
| 3 | 0 | 0 | 2 | 3.17000 | 28.127 | 30.0 |
| 4 | 1 | 1 | 0 | 2.59800 | 34.495 | 65.0 |
| 5 | 2 | 0 | 0 | 2.25000 | 40.041 | 2.0 |
| 6 | 2 | 0 | 1 | 2.12500 | 42.507 | 25.0 |
| 7 | 1 | 1 | 2 | 2.01000 | 45.068 | 80.0 |
| 8 | 1 | 0 | 3 | 1.91100 | 47.543 | 20.0 |
| 9 | 2 | 0 | 2 | 1.83600 | 49.613 | 2.0 |
| 10 | 2 | 1 | 0 | 1.70000 | 53.888 | 2.0 |
| 11 | 2 | 1 | 1 | 1.64400 | 55.881 | 25.0 |
| 12 | 0 | 0 | 4 | 1.58400 | 58.195 | 10.0 |
| 13 | 2 | 0 | 3 | 1.54000 | 60.026 | 10.0 |
| 14 | 3 | 0 | 0 | 1.50100 | 61.753 | 20.0 |
| 15 | 3 | 0 | 2 | 1.35600 | 69.231 | 20.0 |
| 16 | 1 | 1 | 4 | 1.35300 | 69.407 | 20.0 |
| 17 | 2 | 1 | 3 | 1.32500 | 71.092 | 10.0 |
| 18 | 2 | 2 | 0 | 1.30000 | 72.675 | 8.0 |
| 19 | 3 | 1 | 1 | 1.22500 | 77.926 | 10.0 |
| 20 | 1 | 0 | 5 | 1.22000 | 78.306 | 4.0 |
| 21 | 2 | 2 | 2 | 1.20200 | 79.710 | 20.0 |
| 22 | 2 | 1 | 4 | 1.16100 | 83.132 | 2.0 |
| 23 | 4 | 0 | 0 | 1.12500 | 86.426 | 2.0 |
| 24 | 4 | 0 | 1 | 1.10900 | 87.989 | 4.0 |
| 25 | 2 | 0 | 5 | 1.10500 | 88.390 | 4.0 |
| 26 | 3 | 0 | 4 | 1.09000 | 89.934 | 20.0 |
| 27 | 3 | 1 | 3 | 1.07500 | 91.542 | 6.0 |
| 28 | 4 | 0 | 2 | 1.06100 | 93.106 | 2.0 |
| 29 | 0 | 0 | 6 | 1.05700 | 93.565 | 2.0 |
| 30 | 3 | 2 | 0 | 1.03400 | 96.313 | 2.0 |
| 31 | 3 | 2 | 1 | 1.02000 | 98.085 | 6.0 |
| 32 | 2 | 1 | 5 | 1.01700 | 98.475 | 6.0 |
| 33 | 2 | 2 | 4 | 1.00300 | 100.349 | 6.0 |
| 34 | 4 | 0 | 3 | 0.99300 | 101.743 | 2.0 |
| 35 | 4 | 1 | 0 | 0.98300 | 103.187 | 8.0 |
| 36 | 1 | 1 | 6 | 0.97900 | 103.779 | 10.0 |
| 37 | 2 | 0 | 6 | 0.95600 | 107.366 | 2.0 |
| 38 | 4 | 1 | 2 | 0.93900 | 110.238 | 16.0 |
| 39 | 3 | 2 | 3 | 0.92800 | 112.211 | 6.0 |

Data collected at ambient temperature (293 K), radiation source $Cu_{K\alpha}$ ($\lambda$=1.5418 Å)

Figure 3:
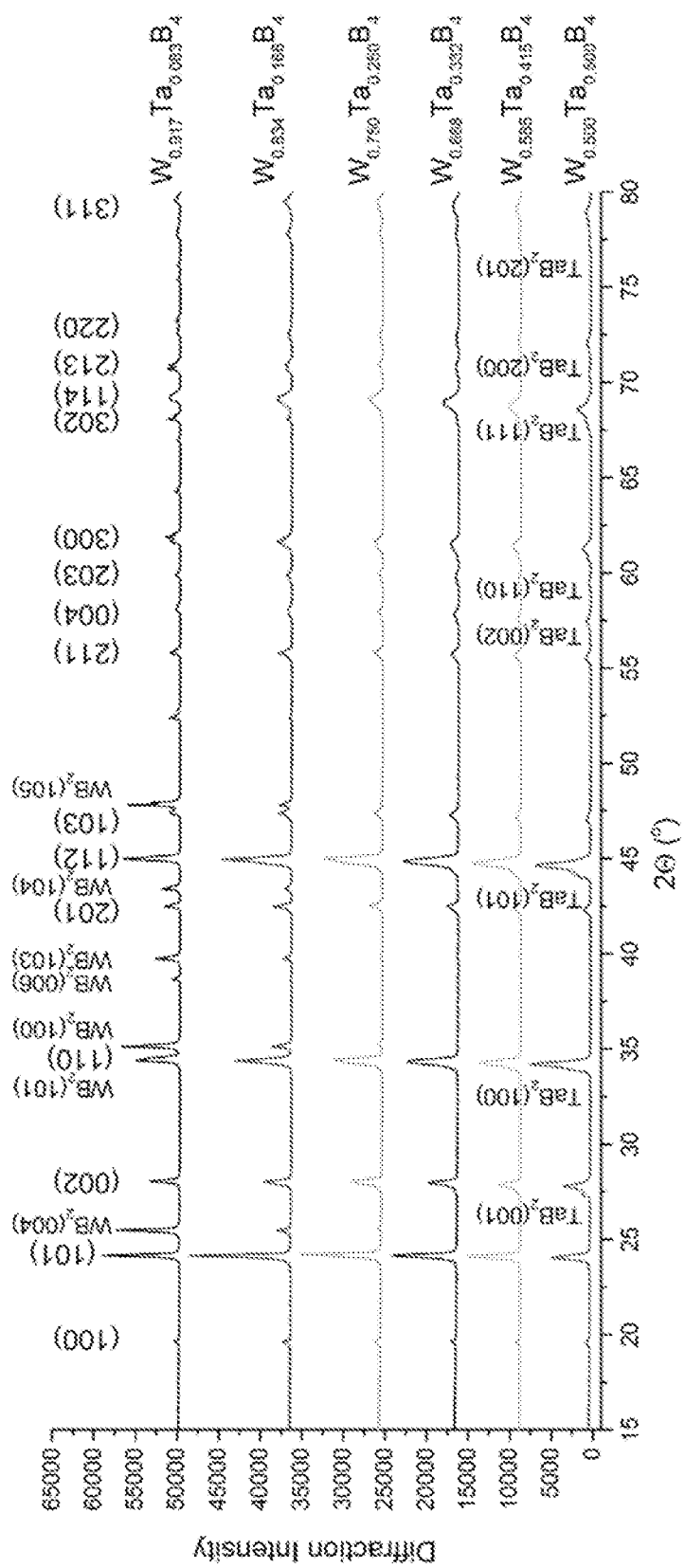
FIG. 3 shows X-ray powder diffractograms of $W_{1-x}Ta_xB_4$.

FIG. 3 shows X-ray powder diffractograms of $W_{1-x}Ta_xB_4$ prepared by arc melting and with a boron to metal ratio of 4.5 to 1.

Figure 4:
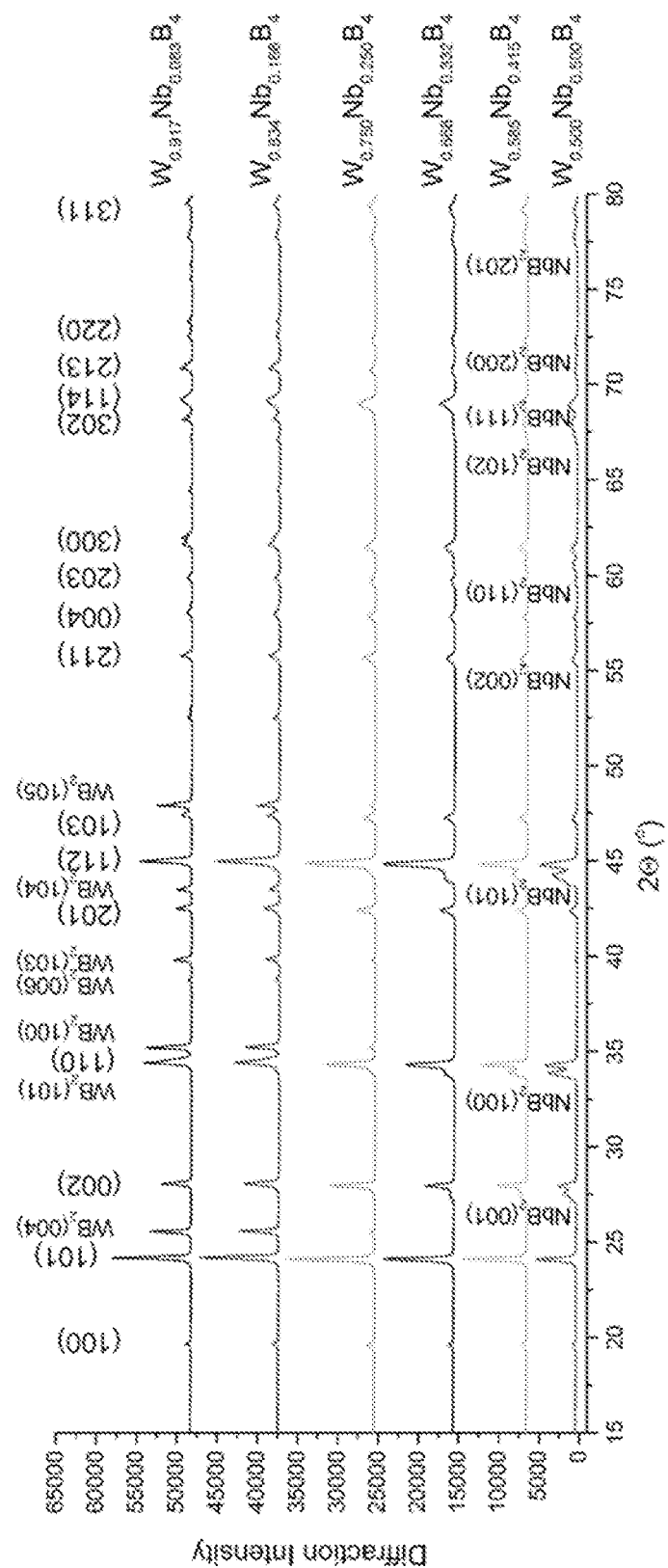
FIG. 4 shows X-ray powder diffractograms of $W_{1-x}Nb_xB_4$.

FIG. 4 shows X-ray powder diffractograms of $W_{1-x}Nb_xB_4$ prepared by arc melting and wih a boron to metal ratio of 4.5 to 1. Tungsten tetraboride forms at all concentrations of Nb. Tungsten diboride, $WB_2$ disappears at a niobium content of 33.2 at. % Nb, visible $NbB_2$ peaks appear at a niobium content of 33.2 at. % Nb.

Figure 5:
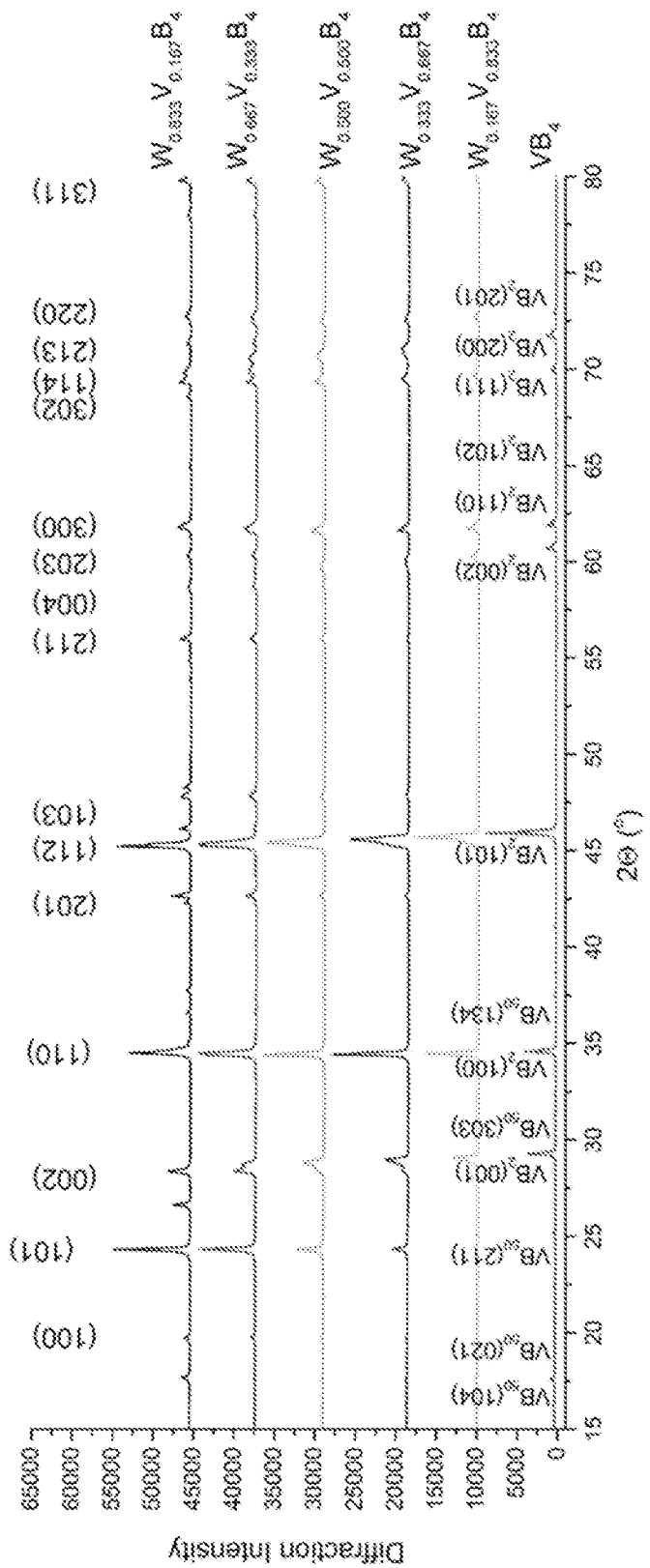
FIG. 5 shows X-ray powder diffractograms of $W_{1-x}V_xB_4$.

FIG. 5 shows X-ray powder diffractograms of $W_{1-x}V_xB_4$ prepared by arc melting and wih a boron to metal ratio of 4.5 to 1. Tungsten tetraboride forms at all concentrations of V. Visible $VB_2$ peaks appear at a vanadium content of 33.3 at. % V.

Figure 6:
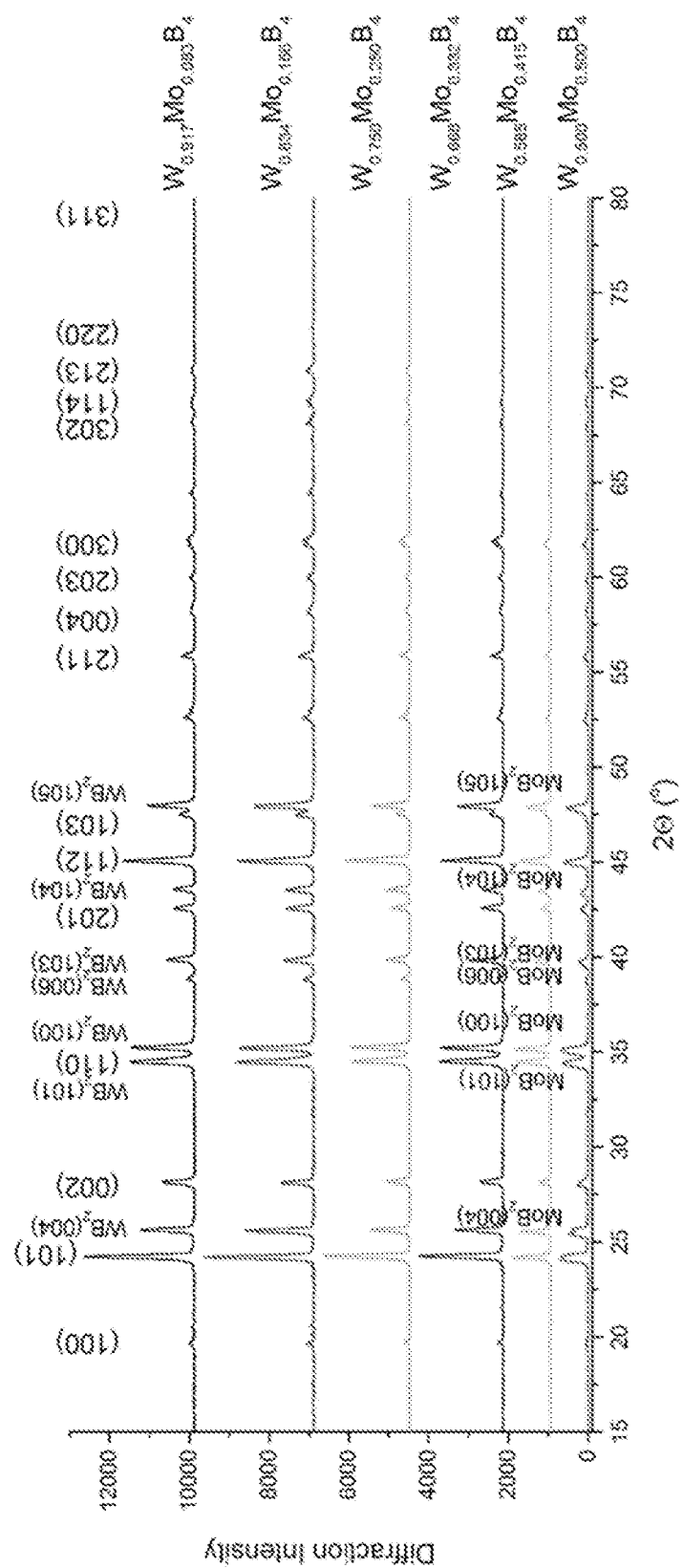
FIG. 6 shows X-ray powder diffractograms of $W_{1-x}Mo_xB_4$.

FIG. 6 shows X-ray powder diffractograms of $W_{1-x}Mo_xB_4$ prepared by arc melting and wih a boron to metal ratio of 4.5 to 1. Powder XRD patterns (15-80° 2Θ) of alloys of $W_{1-x}Mo_xB_4$, prepared with a M:B ratio of 1:4.5. Tungsten tetraboride forms at all concentrations of Mo, as molybdenum also forms a tetraboride with a similar crystal structure, $MoB_4$. Tungsten diboride, $WB_2$ is present at all concentrations of Mo; $MoB_2$ forms at ~50 at. % Mo.

Figure 7:
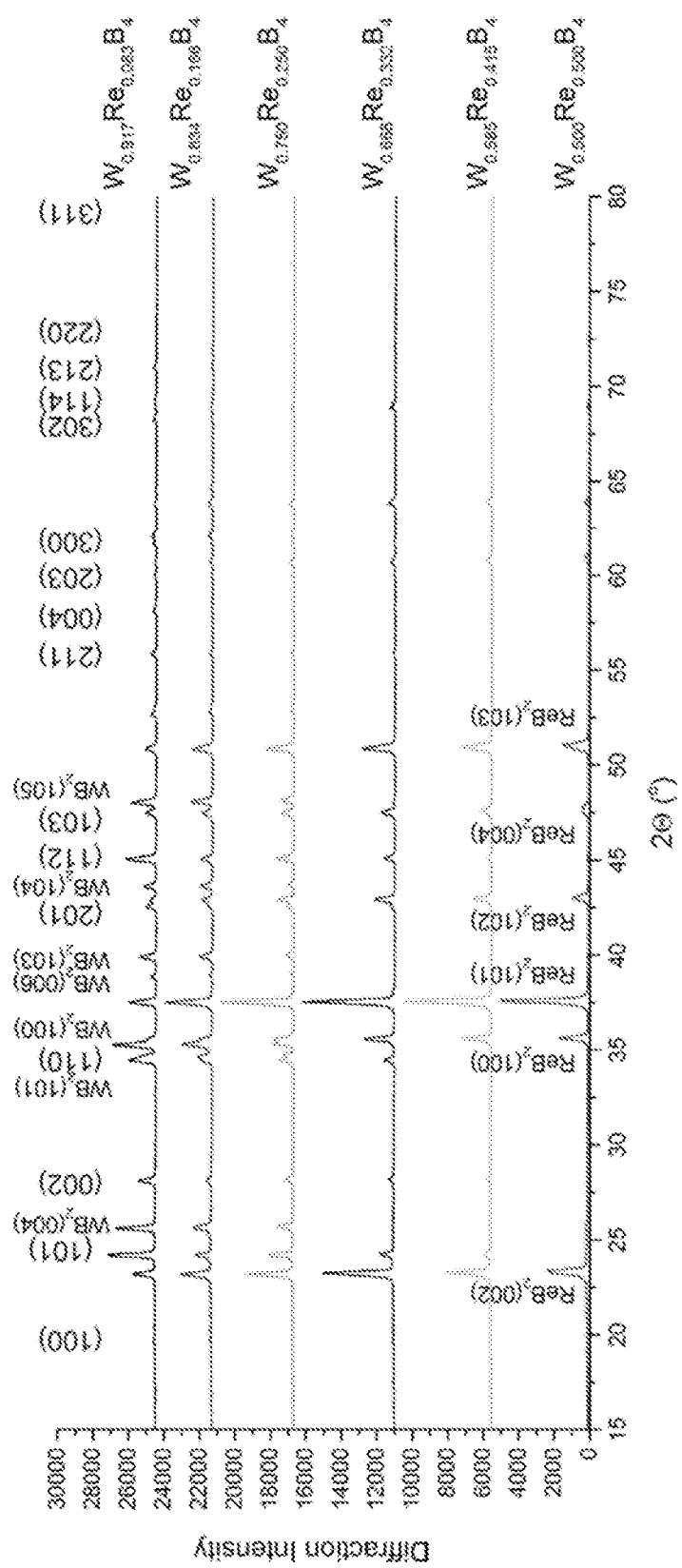
FIG. 7 shows X-ray powder diffractograms of $W_{1-x}Re_xB_4$.

FIG. 7 shows X-ray powder diffractograms of $W_{1-x}Re_xB_4$ prepared by arc melting and wih a boron to metal ratio of 4.5 to 1. Powder XRD patterns (15-80° 2Θ) of alloys of $W_{1-x}Re_xB_4$ prepared with a M:B ratio of 1:4.5. Tungsten tetraboride, forms at concentrations of Re from 0-41.5 at. % Re. Tungsten diboride, $WB_2$ is present at concentrations of Re from 0-25.0 at. % Re; $ReB_2$ forms at all concentrations of Re.

Figure 8:
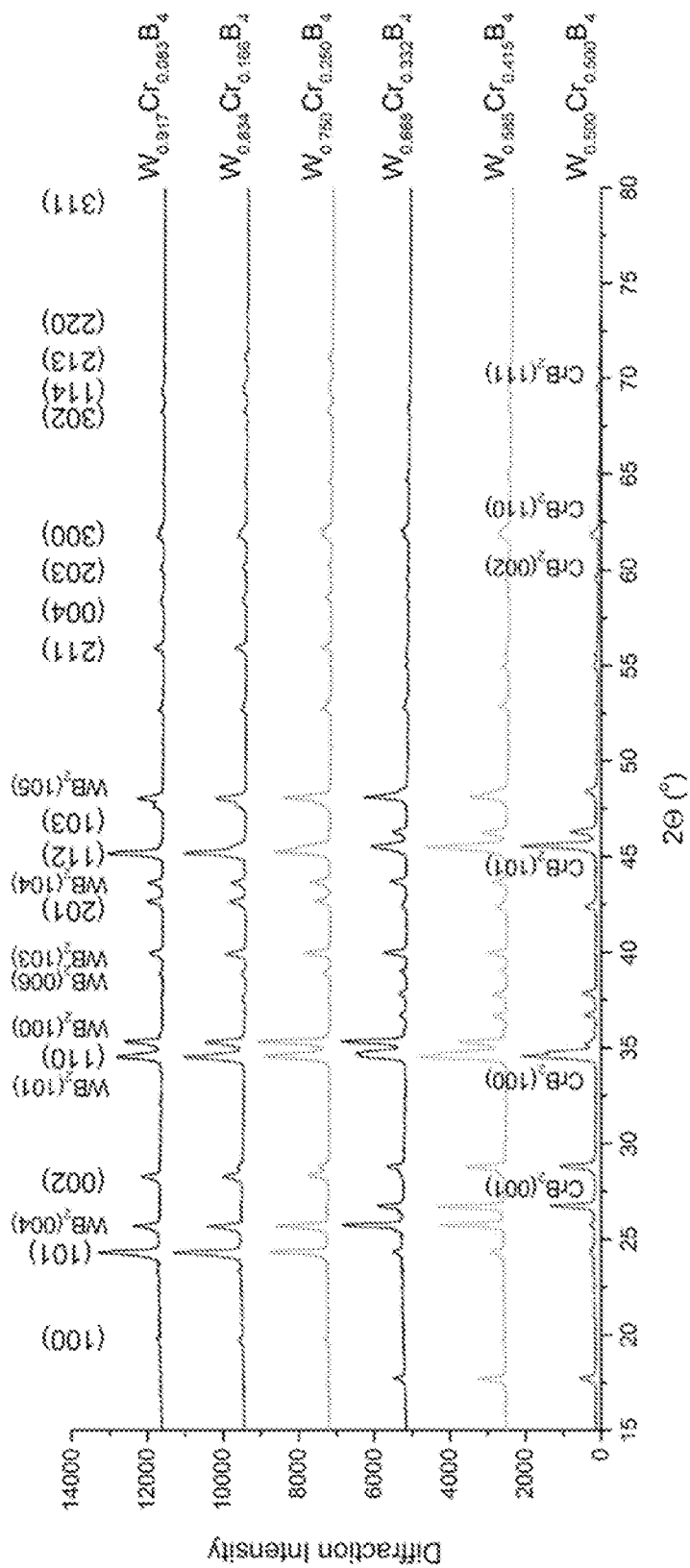
FIG. 8 shows X-ray powder diffractograms of $W_{1-x}Cr_xB_4$.

FIG. 8 shows X-ray powder diffractograms of $W_{1-x}Cr_xB_4$ prepared by arc melting and wih a boron to metal ratio of 4.5 to 1. Powder XRD patterns (15-80° 2Θ) of alloys of $W_{1-x}Cr_xB_4$, prepared with a M:B ratio of 1:4.5. Tungsten tetraboride, forms at concentrations of Cr from 0-41.5 at. % Cr. Tungsten diboride, $WB_2$ is present at concentrations of Re from 0-41.5 at. % Cr; $CrB_2$ forms at all concentrations of Cr from 25-50 at. % Cr.

Example 2. Thermal Analysis

A Pyris Diamond TGA/DTA unit (TG-DTA, Perkin-Elmer Instruments, U.S.A.) was utilized in order to perform the thermogravimetric analyses, each with the following heating profile: heat in air from 25 to 200° C. at a rate of 20° C./min, hold at 200° C. for 30 minutes to remove any moisture, heat from 200 to 1000° C. at a rate of 2° C./min, hold at 1000° C. for 2 hours and cool from 1000 to 25° C. at a rate of 5° C./min. XRD analysis was then performed in order to identify the resulting phase(s).

Figure 9:
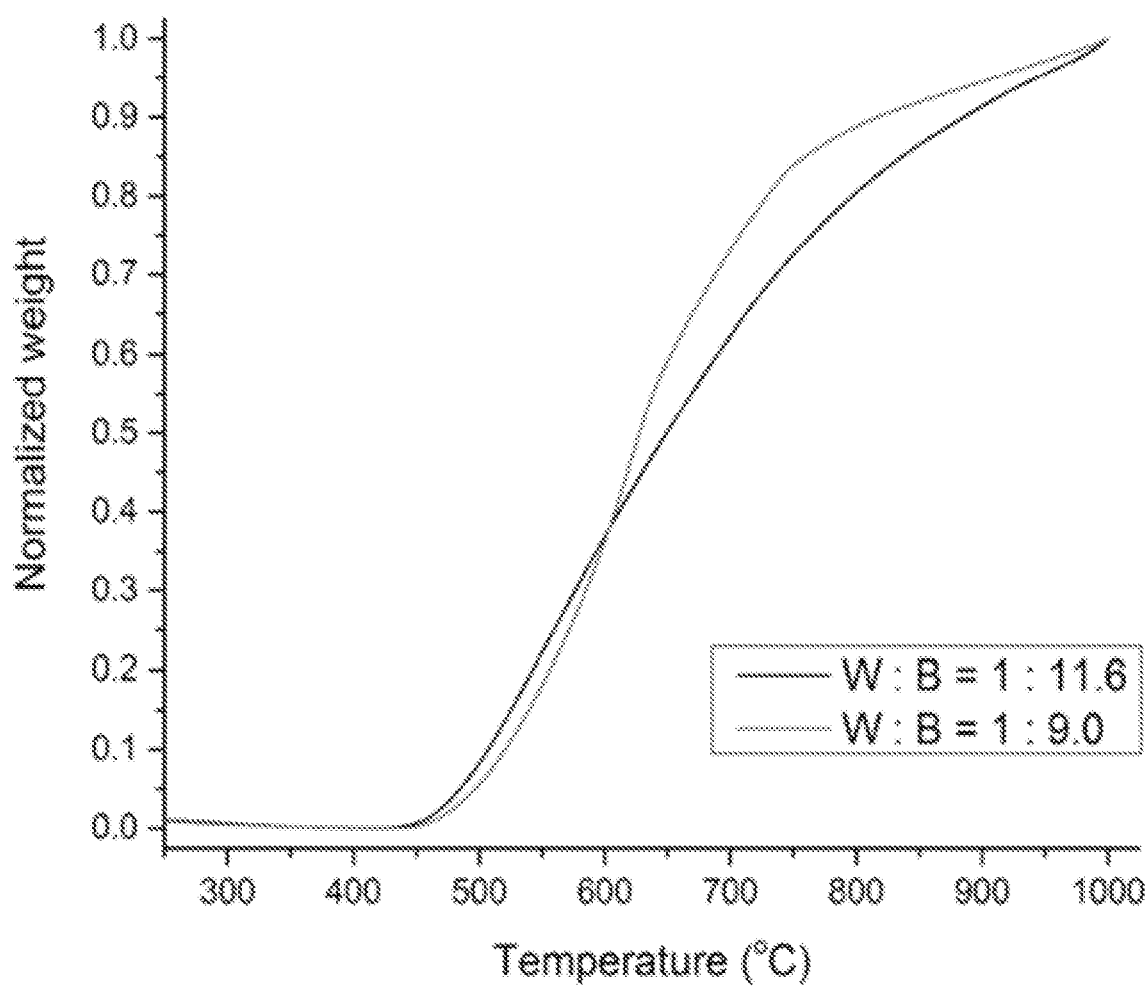
FIG. 9 shows the thermal stability of $WB_4$ prepared with a W:B ratio of 1:11.6 and 1:9.0 as measure by thermal gravimetric analysis in air.

FIG. 9 shows the thermal stability of tungsten tetraboride alloys prepared with a W:B ratio of 1:11.6 and 1:9.0, as measured by thermal gravimetric analysis in air. These data show that both of these alloys are stable to a temperature of ~455° C., using the extrapolated onset method (~450° C. for $WB_4$ with W:B=11.6 and ~465° C. for W:B=1:9.0).

Example 3. Hardness Determination

Hardness measurements were done on polished samples using a load-cell type multi-Vickers hardness tester (Leco, U.S.A.) with a pyramidal diamond indenter tip. Under each applied load: 0.49, 0.98, 1.96, 2.94 and 4.9 N, 10 indents were made in randomly chosen spots on the sample surface. The lengths of the diagonals of the indents were measured using a high-resolution optical microscope, Zeiss Axiotech 100HD (Carl Zeiss Vision GmbH, Germany) with a 500× magnification. Vickers hardness values ($H_v$, in GPa) were calculated using the following formula and the values of all 10 indents per load were averaged:

$$H_v = \frac{1854.4F}{d^2}$$

where d is the arithmetic average length of the diagonals of each indent in microns and F is the applied load in Newtons (N).

Figure 10:
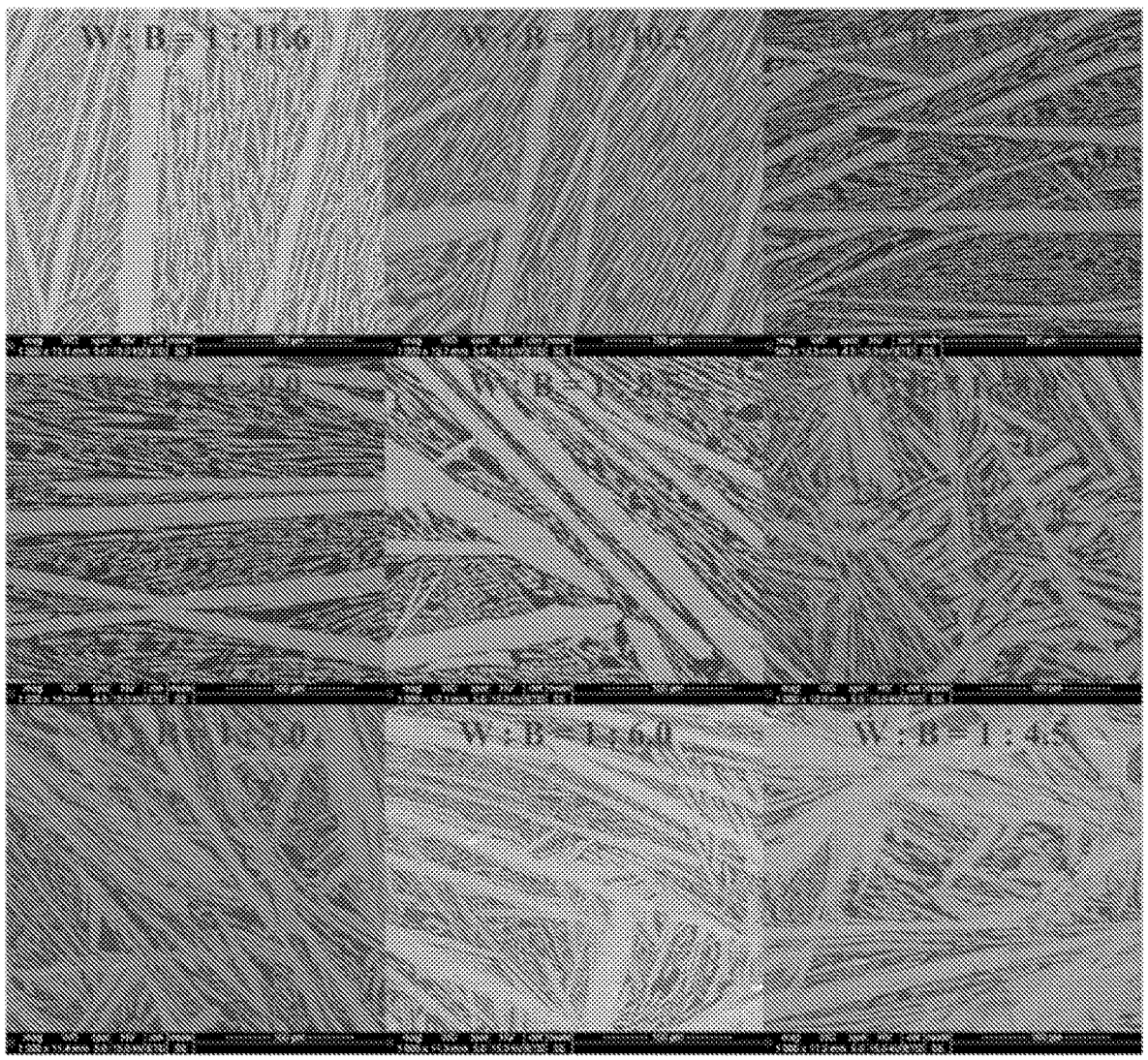
FIG. 10 shows SEM images of selected samples of $WB_x$ prepared with a W to B ratio from 1:11.6 to 1:4.5.

Measurements of Vickers microindentation hardness of $W_{1-x}Ta_xB_4$, c-BN, diamond, $WB_4$ and $Re_4$ are show in Table 4. Measurements of Vickers microindentation hardness of $WB_4$ prepared with variable boron to metal ratios is shown in FIG. 10. The hardness of $WB_4$ prepared with a B:W ratio from 9.0-11.6 to 1 have a hardness of about 40 GPa or more at 0.49 N.

TABLE 4

| Composition | Vickers Hardness (GPa) | Load (N) |
|---|---|---|
| c-BN | 47[a] | 9.8 |
| Diamond | 85[a] | 9.8 |
| $WB_4$ | 46.2[b] | 0.49 |
| $ReB_2$ | 48[a] | 0.49 |
| $W_{0.668}Ta_{0.332}B_4$ | 33.7[c] | 0.49 |

Example 4. Scanning Electron Microscopy and Energy Dispersive X-Ray Analysis (SEM & EDS)

Figure 11:
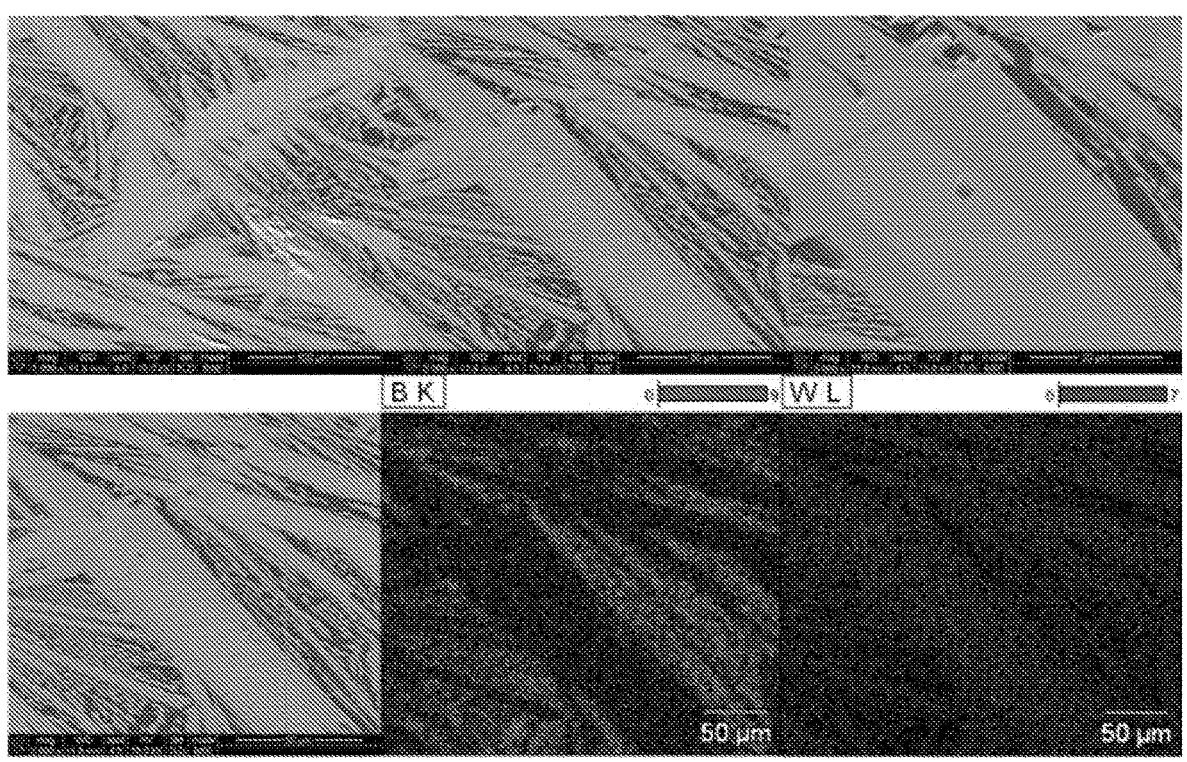
FIG. 11 shows SEM images and elemental maps of selected samples of $WB_x$ prepared with a W to B ratio 1:4.5.

FIG. 11 shows SEM images of $WB_4$ prepared by arc melting with a variable boron content from 4.5 to 11.6. Black areas correspond to boron, while gray areas correspond to metallic phases (tungsten tetra- and diborides). For samples with a W:B of more than 1:8.5, only tungsten tetraboride and boron are present; for samples with W:B of less than 1:8.5, $WB_2$ (lighter gray areas) can be seen alongside tungsten tetraboride. All images were taken at a magnification of 1000× and the scale bar in the images is 100 μm.

Figure 12:
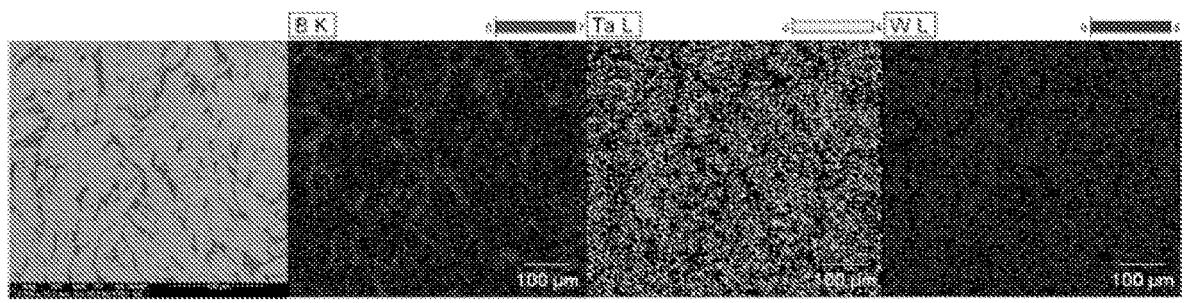
FIG. 12 shows SEM images and elemental maps of the $W_{0.668}Ta_{0.332}B_4$ alloy.

FIG. 12 shows SEM images of surfaces of alloys of $WB_4$ with a ratio of W:B=1:4.5. Black areas correspond to boron, while gray areas correspond to metallic phases: tungsten tetraboride (dark gray) and $WB_2$ (light gray). The images were taken at a magnification of 1000× (left), 2000× (Middle) and 5000× (right) and the scale bars in the images are 100, 50 and 20 respectively. (Bottom) SEM image and EDS maps (boron K line and tungsten L line) for a sample of $WB_4$ with a ratio of W:B=1:4.5. Black areas correspond to crystalline β-rhombohedral boron (seen in B map). The W map shows the tungsten "rich" areas corresponding to $WB_2$ and more tungsten "poor" areas corresponding to tungsten tetraboride. The image and maps were taken at 2000× magnification; the scale bar in the images is 50 μm.

FIG. 13 shows EDS elemental maps for boron (K line), tantalum (L line) and tungsten (L line) for the $W_{0.668}Ta_{0.332}B_{4.5}$ alloy, showing the presence of both tantalum and tungsten in the metal-boron phase; the boron rich areas are β-rhombohedral boron.

Example 5. Preparation with Electric Arc Furnace

Electric Arc Furnace (EAF, also known as a Plasma Arc Furnace): uses electric current discharge to provide localized, superheated gases to melt materials. It is advantageous to have electrically conductive materials in order to facilitate faster melting, but not necessary. The electrode is commonly made of graphite (carbon) or tungsten metal. The reaction vessel is made of metals (such as copper, tungsten, or molybdenum); both the reaction vessel and the electrode must be water cooled, otherwise they will be consumed in the melting process. In EAF synthesis, the reaction charge is completely melted. This melting facilitates the formation of the tetraboride phase so long as the stoichiometry is above M:B 1:4. If the reaction mixture is sub-stoichiometric, it will produce a mixture of $WB_2$ and $WB_4$. For EAF furnaces, the presence of a conductive path necessitates a conductive point for the arc to strike. As such, the crucible/cauldron may not be entirely covered with an electrically insulated material such as h-BN. Therefore it is necessary for a portion of the conductive hearth/cauldron to be exposed. In some instances the material may be melted with or without a h-bn coating, so long as the conductive path is not prevented.

Alloys of $WB_4$ with a variable boron content (boron ratio of 11.6, 10.5, 10.0, 9.5, 9.0, 8.5, 8.0, 7.0, 6.0 and 4.5 to 1 tungsten), and alloys of $WB_4$ with Ta, Nb, V, Mo, Re and Cr were prepared using: tungsten (99.95%, Strem Chemicals, U.S.A.), amorphous boron (99+%, Strem Chemicals, U.S.A.), tantalum (99.9%, Materion, U.S.A.), niobium (99.8%, Strem Chemicals, U.S.A.), vanadium (99.5%, Strem Chemicals, U.S.A.), molybdenum (99.9%, Strem Chemicals, U.S.A.), rhenium (99.99%, Cerac Specialty Inorganics, now Materion), chromium (99.9%, Research Organics/Inorganics Chemical Corp.). For these alloys of $WB_4$ the M:B ratio was kept at 1:4.5. For samples of 1-x W:x Ta:4.5 B, 1-x W:x Nb:4.5 B, 1-x W:x Mo:4.5 B, 1-x W:x Re:4.5 B and 1-x W:x Cr:4.5 B, x=0.083, 0.166, 0.250, 0.332, 0.415 and 0.500. For 1-y W:y V:4.5 B, y=0.166, 0.332, 0.500, 0.668 and 0.854.

Metal powders and boron in desired proportions were calculated, weighed and mixed with a pestle in an agate mortar to ensure homogeneity. The mixtures of powders were pressed into pellets under a 10-ton load using a hydraulic press (Carver). These cold-pressed pellets were then placed into an arc-melter chamber on top of a water-cooled copper hearth and arc-melted in an argon atmosphere using a current of I=70 amps for t=1-2 minutes.

Synthesis of $WB_4$ by Arc Furnace

A reaction mixture (W to B ratio of 1 to 8.0) was inserted into a reaction vessel with a water cooled carbon (or copper) hearth. Parts of the hearth were coated with h-BN to prevent interaction between the carbon and the mixture carbon hearth. Only partial coverage was maintained in order to provide a conductive path for electrical transmittance. No h-BN coating is needed when using a copper hearth. The reaction vessel was self-contained. The reaction vessel was pulled under vacuum and held for approximately 10 minutes to facilitate the removal of oxygen from the atmosphere, and then back filled to ambient pressure with high purity argon. During heating, the reaction was a dynamically purged with argon, though a dynamic flow of another shield gas, such as helium, for example, may also be used. A static atmosphere has also yielded acceptable results. An electric arc was established between the electrode and the hearth plate. As the amperage/power was increased, the reaction mixture began to melt and consolidate. Following the melting of the mixture, the electric arc was terminated and the composite permitted to cool. Composite crystallite size was on the order of millimeters, but can be decreased by increasing the cooling rate or decreasing the reaction mass. Reaction masses of 0.5 g yield sub-micron crystalline composites.

Example 6. Preparation with Induction Furnace

The induction furnace uses tunable radio-frequency (RF) induction to locally heat the crucible or the raw material.

Boron is an electrical insulator, so in most circumstances is not susceptible to RF. Tungsten is RF sensitive, and in some cases, larger particle sizes are used in the raw materials to start the reaction with boron. On an industrial scale, the reaction vessel is water cooled, and graphite lined. The RF system is generally tuned to heat the carbon, which through physical contact heats the materials for melting. If the reaction charge is not at least 95% and up to 100% melted, only a solid state reaction will take place. Preventing the direct contact of the reaction charge with the graphite crucible walls is necessary. Hexagonal Boron Nitride (h-BN) is an exemplary material to be used for physically insulating the reaction charge from the carbon crucible walls. This material is thermally conducting but electrically insulating; and will not influence the efficacy of the RF coil. Induction heating requires a material susceptible to radiofrequency; carbon is traditionally used as a crucible so a liner is necessary.

Synthesis of $WB_4$ by Induction Furnace

A reaction mixture (W to B ratio of 1 to 8.0) was inserted into a carbon crucible physically insulated with layers/coatings of h-BN or inserted into a carbon crucible with an inner h-BN crucible. If the reaction mixture is exposed to carbon directly, such as a contaminant in the reaction mixture, or through contact with the reactor walls, the synthesis of $WB_2$ will be facilitated. The carbon present is slightly soluble in the tungsten, thereby competing with boron, and catalyzing the diboride phase over the metastable tetraboride phase.

The reaction vessel was pulled under vacuum and held for approximately 10 minutes to facilitate the removal of oxygen from the atmosphere. The reaction vessel was back-filled with high purity argon to ambient pressure and heating commenced. The atmosphere was static. The ramp rate of the heating was targeted as 20° C. per minute to a temperature of 1700° C. This temperature was held for 180 minutes. After the hold, the power supply was shutdown and the reaction vessel allowed to cool. The reaction product was $WB_4$ with minimal to non-detectable levels of $WB_2$ present. The product yielded micron-size crystallites (≤50 μm) of $WB_4$.

Example 7. Preparation with Hot Press with Spark Plasma Sintering

Hot pressing is a high-pressure, low strain process for forming powder compacts at a high enough temperature to induce sintering. A h-BN lined mold is used to separate the reaction mixture from any reactive materials. A graphite mold is used when spark plasma sintering is employed to allow for electrical conductivity and thermal heating at high pressures. The reaction mixture is insulated from the graphite lining during the reaction to minimize or decrease side product formation relative to an equivalent reaction without insulating the reaction mixture. Spark plasma sintering utilizes directed pulse DC currents to sinter the compacted reaction mixtures.

Synthesis of $WB_4$ by Hot Press

A reaction mixture (W to B ratio of 1 to 8.0) was loaded into a non-carbon container which was then inserted into a graphite containing reaction vessel, which provided a thermally and electrically conductive pathway. It was essential to avoid immediate contact of the reaction mixture with carbon. The reaction vessel is a contained environment with vacuum and/or inert gas atmosphere present. The reaction vessel was pulled under vacuum and held for approximately 10 minutes to facilitate the removal of oxygen from the atmosphere. The reaction vessel was back-filled with high purity argon to ambient pressure and heating commenced. The synthesis may also be carried out under vacuum. A mechanical or hydraulic pressure ranging from a minimum of 0.5 MPa up to 50 MPa or more was applied and maintained throughout the synthesis process. The ramp rate of the heating was targeted as 50° C. per minute to a temperature of 1400° C. This temperature was held for 60 minutes. After the hold at temperature, the power supply was shutdown and the reaction vessel allowed to cool to ambient temperature. The reaction product was $WB_4$ with minimal to non-detectable levels of $WB_2$ present.

Example 8. Preparation with Conventional Furnace

The conventional furnace uses metal coils to locally heat the crucible and melt the raw material. On an industrial scale, the reaction vessel is water cooled, and graphite lined. If the reaction charge is not at least 95% and up to 100% melted, only a solid state reaction will take place. Preventing the direct contact of the reaction charge with the graphite crucible walls is necessary. A Hexagonal Boron Nitride (h-BN), molybdenum, or tungsten liner is an exemplary material to be used for physically insulating the reaction charge from the carbon crucible walls.

Synthesis of $WB_4$ by Conventional Furnace

A reaction mixture (W to B ratio of 1 to 8.0) was inserted into a carbon crucible fitted with a physically insulating molybdenum, tungsten, niobium, or tantalum liner with a thickness of 0.25 mm. The reaction vessel was pulled under vacuum and held for approximately 10 minutes to facilitate the removal of oxygen from the atmosphere. The reaction vessel was back-filled with high purity argon to ambient pressure and heating commenced. The atmosphere was static. The ramp rate of the heating was targeted as 20° C. per minute to a temperature of 1700° C. This temperature was held for 180 minutes. After the hold, the reaction vessel allowed to cool. The reaction product was $WB_4$ with minimal to non-detectable levels of $WB_2$ present. The product yielded micron-size crystallites (≤50 μm) of $WB_4$.

EXPERIMENTAL

Alloys of $WB_4$ with a variable boron content and alloys of $WB_4$ with Ta, Nb, V, Mo, Re and Cr were prepared using: tungsten (99.95%, Strem Chemicals, U.S.A.), amorphous boron (99+%, Strem Chemicals, U.S.A.), tantalum (99.9%, Materion, U.S.A.), niobium (99.8%, Strem Chemicals, U.S.A.), vanadium (99.5%, Strem Chemicals, U.S.A.), molybdenum (99.9%, Strem Chemicals, U.S.A.), rhenium (99.99%, Cerac Specialty Inorganics, now Materion), chromium (99.9%, Research Organics/Inorganics Chemical Corp.).

Metal powders and boron in desired proportions were calculated, weighed and mixed with a pestle in an agate mortar to ensure homogeneity. The mixtures of powders were pressed into pellets under a 10-ton load using a hydraulic press (Carver). These cold-pressed pellets were then placed into an arc-melter chamber on top of a water-cooled copper hearth and arc-melted in an argon atmosphere using a current of I=70 amps for t=1-2 minutes.

Prepared samples were cut into two halves using a diamond saw (Ameritool Inc., U.S.A.). One half was used for powder X-ray diffraction analysis (PXRD) analysis and crushed into powder (<40 μm) using a Plattner-style crusher. The other half was used for scanning electron microscopy (SEM)/energy dispersion spectroscopy (EDS) and Vickers hardness testing and was encapsulated into epoxy using an epoxy/hardener set (Allied High Tech Products Inc., U.S.A.).

To achieve an optically flat surface, the samples were polished using SiC papers (120-1200 grit sizes, Allied High Tech Products Inc., U.S.A.) and diamond films (30 to 1 micron particle sizes, South Bay Technology Inc., U.S.A.) on a semi-automated polishing station (South Bay Technology Inc., U.S.A.).

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

NUMBERED EMBODIMENTS

The following embodiments recite nonlimiting permutations of combinations of features disclosed herein. Other permutations of combinations of features are also contemplated. In particular, each of these numbered embodiments is contemplated as depending from or relating to every previous or subsequent numbered embodiment, independent of their order as listed. 1. A method of preparing a composite matrix comprising: combining a sufficient amount of W with an amount of B and optionally M to generate the composite matrix, wherein the ratio of B to W and M is less than 12 equivalents of B to 1 equivalent of W and M; and the composite matrix comprises: $W_{1-x}M_xB_4$ wherein: W is tungsten; B is boron; M is at least one element selected from the group of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), yttrium (Y), osmium (Os), iridium (Ir), lithium (Li) and aluminum (Al); and x is from 0 to 0.999. 2. The method of embodiment 1, wherein the combining comprises i) mixing W, B, and optionally M to generate a mixture, ii) transferring the mixture to a reaction vessel, and iii) heating the mixture to a temperature sufficient to induce a reaction between W, B, and optionally M to generate the composite matrix. 3. The method of embodiment 2, wherein the reaction is a solid state reaction. 4. The method of embodiment 2, wherein at least one reaction component is partially melted. 5. The method of embodiment 2, wherein at least one reaction component is completely melted. 6. The method of embodiment 2, wherein the reaction vessel is further subjected under an inert atmosphere after transferring the mixture to the reaction vessel but prior to heating the mixture. 7. The method of embodiment 6, wherein oxygen is removed from the reaction vessel to generate the inert atmosphere. 8. The method of any one of embodiments 6-7, wherein a vacuum is applied to the reaction vessel to generate the inert atmosphere. 9. The method of embodiment 8, wherein the vacuum is applied for a time sufficient to remove at least 99% of oxygen from the reaction vessel. 10. The method of embodiment 8 or 9, wherein the vacuum is applied for at least 10 minutes, 20 minutes, 30 minutes, or more. 11. The method of any one of embodiments 2-10, wherein the reaction vessel is purged with an inert gas to generate the inert atmosphere. 12. The method of embodiment 11, wherein the inert gas comprises argon, nitrogen, or helium. 13. The method of any one of embodiments 2-12, wherein the reaction vessel is subjected to at least one cycle of applying a vacuum and flushing the reaction vessel with an inert gas to remove oxygen from the reaction vessel. 14. The method of any one of embodiments 2-13, wherein the mixture is heated to a temperature between about 1200° C. and about 2200° C. 15. The method of embodiment 14, wherein the mixture is heated to a temperature of about 1400° C., 1500° C., 1600° C., 1700° C., 1800° C., 2000° C., 2100° C., or about 2200° C. 16. The method of any one of embodiments 2-15, wherein the mixture is heated for about 15 minutes, 90 minutes, 120 minutes, 180 minutes, 240 minutes, 360 minutes, or more. 17. The method of any one of embodiments 2-16, wherein the mixture is heated by an electric arc furnace. 18. The method of embodiment 17, wherein a reaction vessel of the electric arc furnace is subjected to an inert atmosphere after transferring the mixture to the reaction vessel but prior to heating the mixture. 19. The method of embodiment 17 or 18, wherein the inert atmosphere is generated by either applying a vacuum to the reaction vessel, flushing the reaction vessel with an inert gas or any combinations thereof 20. The method of any one of embodiments 17-19, wherein the reaction vessel is optionally coated with an electrically insulating material. 21. The method of embodiment 20, wherein at most about 95%, 90%, 85%, 80%, 70%, 60%, 50%, 40%, 30%, or less of the surface of the reaction vessel is optionally coated with the electrically insulating material. 22. The method of embodiment 20 or 21, wherein the insulating material comprises hexagonal boron nitride (h-BN). 23. The method of any one of embodiments 17-22, wherein the mixture is heated until a liquid solution is formed. 24. The method of any one of embodiments 2-16, wherein the mixture is heated by an induction furnace. 25. The method of embodiment 24, wherein the induction furnace is heated by electromagnetic induction. 26. The method of embodiment 25, wherein the electromagnetic radiation used for electromagnetic induction has the frequency and wavelength of radio waves. 27. The method of any one of embodiments 2-16, wherein the mixture is heated by hot pressing. 28. The method of any one of embodiments 2-16, wherein the mixture is heated by plasma spark sintering. 29. The method of any one of embodiments 25-28, wherein a reaction vessel is subjected to an inert atmosphere after transferring the mixture to the reaction vessel but prior to heating the mixture. 30. The method of any one of embodiments 25-29, wherein the inert atmosphere is generated by removing oxygen from the reaction vessel in combination with either applying a vacuum to the reaction vessel or flushing the reaction vessel with an inert gas. 31. The method of embodiment 30, wherein the inert gas is high purity argon. 32. The method of any one of embodiments 1-31, wherein M is at least one element selected from the group: vanadium (V), chromium (Cr), niobium (Nb), molybdenum (Mo), tantalum (Ta), and rhenium (Re). 33. The method of any one of embodiments 1-31, wherein x is 0. 34. The method of embodiment 33, wherein the ratio of B to W is between about 11.9 and about 9 equivalents of B to 1 equivalent of W. 35. The method of embodiment 34, wherein the ratio of B to W is about 11.6, about 11, about 10.5, about 10, about 9.5, or about 9 equivalents of B to 1 equivalent of W. 36. The method of any one of embodiments 1-32, wherein x is from 0.001 to 0.999. 37. The method of embodiment 36, wherein x is 0.201-0.400. 38. The method of embodiment 36, wherein x is 0.401-0.600. 39. The method of embodiment 36, wherein x is 0.601-0.800. 40. The method of embodiment 36, wherein x is 0.801-0.999. 41. The method of any one of embodiments 37-40, wherein the ratio of B to W and M is less than 5 equivalents of B to 1 equivalent of W and M. 42. The method of embodiment 41, wherein the composite matrix comprises $W_{1-x}V_xB_4$. 43. The method of embodiment 41, wherein the composite matrix comprises $W_{1-x}Cr_xB_4$. 44. The method of embodiment 41, wherein the composite matrix comprises $W_{1-x}Nb_xB_4$. 45. The method of embodiment 41, wherein the composite matrix comprises $W_{1-x}Mo_xB_4$. 46. The method of embodiment 41, wherein the composite matrix comprises $W_{1-x}Ta_xB_4$. 47. The method of embodiment 41, wherein the composite matrix comprises $W_{1-x}Re_xB_4$. 48. The method of embodiment 35, wherein the composite matrix comprises $WB_4$. 49. The method of embodiment 48, wherein the composite matrix is formed with a W to B ratio of 1:11.6. 50. The method of embodiment 49, wherein the composite matrix has oxidation resistance below 450° C. 51. The method of embodiment 48, wherein the composite matrix is formed with a W to B ratio of 1:10.5. 52. The method of embodiment 48, wherein the composite matrix is formed with a W to B ratio of 1:9.0. 53. The method of embodiment 52, wherein the composite matrix has oxidation resistance below 465° C. 54. The method of any one of embodiments 1-53, wherein the composite matrix has a density at or above 4.0 g/cm3. 55. The method of any one of embodiments 1-54, wherein the method further generates a metal side product. 56. The method of embodiment 55, wherein the metal side product is tungsten diboride or tungsten monoboride. 57. The method of embodiment 55, wherein the metal side product is less than 10%, 5%, 4%, 3%, 2%, 1%, 0.5%, 0.1%, 0.05%, or 0.01% relative to the percentage of the composite matrix. 58. A method of producing a thermodynamically stable tungsten tetraboride composite matrix, the method comprising: f) adding into a compression chamber a mixture of boron (B) and tungsten (W), wherein the ratio of boron to tungsten is between 4 and 11.9 equivalents of boron to 1 equivalent of tungsten; g) compressing the mixture to generate a compressed raw mixture; h) adding the compressed raw mixture to a reaction vessel; i) generating an inert atmosphere within the reaction vessel by applying a vacuum to the reaction vessel, flushing the reaction vessel with inert gas, or a combination thereof; and j) heating the reaction vessel to a temperature of between about 1200° C. and about 2200° C. to generate the thermodynamically stable $WB_4$ composite matrix. 59. The method of embodiment 58, wherein the compressed raw mixture is heated by an electric arc furnace. 60. The method of embodiment 59, wherein the arc furnace electrode comprises graphite or tungsten metal. 61. The method of embodiment 60, wherein the reaction vessel is optionally coated with an electrically insulating material. 62. The method of embodiment 61, wherein at most about 95%, 90%, 85%, 80%, 70%, 60%, 50%, 40%, 30%, or less of the surface of the reaction vessel is optionally coated with the electrically insulating material. 63. The method of embodiment 61 or 62, wherein the insulating material comprises hexagonal boron nitride (h-BN). 64. The method of embodiment 61 or 62, wherein the insulating material does not contain carbon. 65. The method of any one of embodiments 59-64, wherein the compressed raw mixture is shielded from the arc furnace electrode by the electrically insulating material, optionally comprising hexagonal boron nitride. 66. The method of any one of embodiments 59-65, wherein the composite matrix is composed of gains or crystallites that are less than 1000 micrometer in size. 67. The method of any one of embodiments 59-65, wherein the composite matrix is composed of gains or crystallites that are less than 100 micrometer in size. 68. The method of any one of embodiments 59-65, wherein the composite matrix is composed of gains or crystallites that are less than 50 micrometer in size. 69. The method of any one of embodiments 59-65, wherein the composite matrix is composed of gains or crystallites that are less than 10 micrometer in size. 70. The method of any one of embodiments 59-65, wherein the composite matrix is composed of gains or crystallites that are less than 1 micrometer in size. 71. The method of embodiment 58, wherein the compressed raw mixture is heated by an induction furnace. 72. The method of embodiment 71, wherein the induction furnace is heated by electromagnetic induction. 73. The method of embodiment 72, wherein the electromagnetic radiation used for electromagnetic induction has the frequency of radio waves. 74. The method of embodiment 58, wherein the mixture is heated by hot pressing. 75. The method of embodiment 58, wherein the mixture is heated by plasma spark sintering. 76. The method of any one of embodiments 71-75, wherein the reaction vessel is water cooled. 77. The method of any one of embodiments 71-75, wherein the reaction vessel is graphite lined. 78. The method of embodiment 77, wherein graphite is heated within the reaction vessel. 79. The method of embodiment 78, wherein the compressed raw mixture is shielded from the graphite lined reaction vessel by an electrically insulating material, optionally comprising hexagonal boron nitride. 80. The method of any one of embodiments 71-79, wherein the composite matrix is composed of crystallites that are less than 500 micrometers in size. 81. The method of any one of embodiments 71-79, wherein the composite matrix is composed of crystallites that are less than 200 micrometers in size. 82. The method of any one of embodiments 71-79, wherein the composite matrix is composed of crystallites that are less than 50 micrometers in size. 83. The method of any one of embodiments 58-82, wherein the density of the composite matrix is between about 5.0 g/cm3 and about 7.0 g/cm3. 84. The method of embodiment 83, wherein the density of the composite matrix is between about 5.1 g/cm3 and about 6.2 g/cm3. 85. The method of any one of embodiments 58-84, wherein the composite matrix is formed with a W to B ratio of 1:11.6. 86. The method of embodiment 85, wherein the composite matrix has oxidation resistance below 450° C. 87. The method of any one of embodiments 58-84, wherein the composite matrix is formed with a W to B ratio of 1:10.5. 88. The method of any one of embodiments 58-84, wherein the composite matrix is formed with a W to B ratio of 1:9.0. 89. The method of embodiment 88, wherein the composite matrix has oxidation resistance below 465° C. 90. The method of any one of embodiments 58-89, wherein the composite matrix has a density at or above 4.0 g/cm3. 91. A method of producing a composite matrix of Formula (II): $W_{1-x}M_xB_4$(II) wherein: W is tungsten; B is boron; M is at least one element selected from the group of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), yttrium (Y), osmium (Os), iridium (Ir), lithium (Li) and aluminum (Al); x is from 0.001 to 0.999; and wherein the method comprises: f) adding into a compression chamber a mixture of boron, tungsten, and M, wherein the ratio of boron to tungsten and M is between 3.5 and 5.0 equivalents of boron to 1 equivalent of tungsten and M; g) compressing the mixture to generate a compressed raw mixture; h) adding the compressed raw mixture to a reaction vessel; i) generating an inert atmosphere within the reaction vessel by applying a vacuum to the reaction vessel, flushing the reaction vessel with inert gas, or a combination thereof; and j) heating the reaction vessel to a temperature of between about 1200° C. and about 2200° C. to generate the composite matrix of Formula (II). 92. The method of embodiment 91, wherein the compressed raw mixture is heated by an electric arc furnace. 93. The method of embodiment 92, wherein the arc furnace electrode is made of graphite or tungsten metal. 94. The method of any one of embodiments 92-93, wherein the compressed raw mixture is partially shielded from the arc furnace electrode by an electrically insulating material, optionally comprising hexagonal boron nitride. 95. The method of any one of embodiments 92-93, wherein the composite matrix is composed of gains or crystallites that are less than 100 micrometer in size. 96. The method of any one of embodiments 92-93, wherein the composite matrix is composed of gains or crystallites that are less than 50 micrometer in size. 97. The method of any one of embodiments 92-93, wherein the composite matrix is composed of gains or crystallites that are less than 10 micrometer in size. 98. The method of any one of embodiments 92-93, wherein the composite matrix is composed of crystallites that are less than 1 micrometer in size. 99. The method of embodiment 91, wherein the compressed raw mixture is heated by an induction furnace. 100. The method of embodiment 99, wherein the induction furnace is heated by electromagnetic induction. 101. The method of embodiment 100, wherein the electromagnetic radiation used for electromagnetic induction has the frequency of radio waves. 102. The method of embodiment 91, wherein the mixture is heated by hot pressing. 103. The method of embodiment 91, wherein the mixture is heated by plasma spark sintering. 104. The method of any one of embodiments 99-103, wherein the reaction vessel is water cooled. 105. The method of any one of embodiments 99-104, wherein the reaction vessel is graphite lined. 106. The method of embodiment 105, wherein the radiofrequency induction is tuned to carbon, and the graphite is heated within the reaction vessel. 107. The method of any one of embodiments 99-106, wherein the compressed raw mixture is shielded from the graphite lined reaction vessel by an electrically insulating material, optionally comprising hexagonal boron nitride. 108. The method of any one of embodiments 99-107, wherein the composite matrix is composed of gains or crystallites that are less than 100 micrometer in size. 109. The method of any one of embodiments 99-107, wherein the composite matrix is composed of gains or crystallites that are less than 50 micrometer in size. 110. The method of any one of embodiments 99-107, wherein the composite matrix is composed of gains or crystallites that are less than 10 micrometer in size. 111. The method of any one of embodiments 91-110, wherein x is 0.001-0.200. 112. The method of any one of embodiments 91-110, wherein x is 0.201-0.400. 113. The method of any one of embodiments 91-110, wherein x is 0.401-0.600. 114. The method of any one of embodiments 91-110, wherein x is 0.601-0.800. 115. The method of any one of embodiments 91-110, wherein x is 0.801-0.999. 116. The method of any one of embodiments 91-110, wherein M is at least one element selected from the group: vanadium (V), chromium (Cr), niobium (Nb), molybdenum (Mo), tantalum (Ta), and rhenium (Re). 117. The method of embodiment 116, wherein the composite matrix comprises $W_{1-x}V_xB_4$. 118. The method of embodiment 116, wherein the composite matrix comprises $W_{1-x}Cr_xB_4$. 119. The method of embodiment 116, wherein the composite matrix comprises $W_{1-x}Nb_xB_4$. 120. The method of embodiment 116, wherein the composite matrix comprises $W_{1-x}Mo_xB_4$. 121. The method of embodiment 116, wherein the composite matrix comprises $W_{1-x}Ta_xB_4$. 122. The method of embodiment 116, wherein the composite matrix comprises $W_{1-x}Re_xB_4$. 123. A method of producing a composite material comprising a composite matrix of Formula (III): $W_{1-x}M_xB_4$(III) wherein the percentage of the composite matrix of Formula (III) and boron relative to the composite material is at least 95%, wherein, W is tungsten; B is boron; M is at least one element selected from the group of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), yttrium (Y), osmium (Os), iridium (Ir), lithium (Li) and aluminum (Al); x is from 0 to 0.999; and wherein the method comprises: h) adding into a compression chamber a mixture of boron, tungsten, and optionally M, wherein the ratio of boron to tungsten and optionally M is less than 12.0 equivalents of boron to 1 equivalent of tungsten and optionally M; i) compressing the mixture to generate a compressed raw mixture; j) partially lining the interior of the reaction vessel with an electric insulator to generate an insulated reaction vessel; k) adding the compressed raw mixture to the insulated reaction vessel; l) generating an inert atmosphere within the reaction vessel by applying a vacuum to the insulated reaction vessel, flushing the insulated reaction vessel with inert gas, or a combination thereof; m) arc melting the compressed raw mixture until at least 95% or more of the compressed raw mixture is melted; and n) cooling the insulated reaction vessel, thereby generating the composite material comprising the composite matrix of Formula (III). 124. The method of embodiment 123, wherein the composite material further comprises a metal side product, wherein optionally said metal side product is less than 4%, 3%, 2%, 1%, 0.5%, 0.1%, 0.05%, or 0.01% relative to the percentage of the composite matrix. 125. The method of embodiment 123 or 124, wherein the metal side product is tungsten diboride or tungsten monoboride. 126. The method of any one of embodiments 123-125, wherein at most about 95%, 90%, 85%, 80%, 70%, 60%, 50%, 40%, 30%, or less of the surface of the reaction vessel is coated with the electrically insulating material. 127. The method of any one of embodiments 123-126, wherein the compressed raw mixture is partially shielded from the arc furnace electrode by an electrically insulating material, optionally comprising hexagonal boron nitride. 128. The method of any one of embodiments 123-127, wherein the insulating material comprises hexagonal boron nitride (h-BN). 129. The method of any one of embodiments 123-128, wherein the compressed raw mixture is melted by an electric arc furnace or plasma arc furnace. 130. The method of embodiment 129, wherein the arc furnace electrode is made of graphite or tungsten metal. 131. The method of any of embodiments 123-130, wherein in reaction vessel is water cooled. 132. The method of any one of embodiments 123-131, wherein the cooling rate of the reaction vessel is controlled. 133. The method of any one of embodiments 123-130, wherein the reaction vessel is allowed to cool to ambient temperature. 134. The method of any one of embodiments 123-133, wherein the composite matrix is composed of gains or crystallites that are less than 100 micrometer in size. 135. The method of any one of embodiments 123-133, wherein the composite matrix is composed of gains or crystallites that are less than 123-133 micrometer in size. 136. The method of any one of embodiments 123-133, wherein the composite matrix is composed of gains or crystallites that are less than 10 micrometer in size. 137. The method of any one of embodiments 123-133, wherein the composite matrix is composed of crystallites that are less than 1 micrometer in size. 138. The method of any one of embodiments 123-137, wherein the reaction vessel is purged with an inert gas to generate the inert atmosphere. 139. The method of embodiment 138, wherein the inert gas comprises argon, nitrogen, or helium. 140. The method of any one of embodiments 123-137, wherein the reaction vessel is subjected to at least one cycle of applying a vacuum and flushing the reaction vessel with an inert gas to remove oxygen from the reaction vessel. 141. The method of any one of embodiments 123-140, wherein x is 0. 142. The method of embodiment 141, wherein the composite matrix comprises $WB_4$. 143. The method of embodiment 141 or 142, wherein the ratio of B to W is between about 11.9 and about 9 equivalents of B to 1 equivalent of W. 144. The method of embodiment 143, wherein the ratio of B to W is about 11.6, about 11, about 10.5, about 10, about 9.5, or about 9 equivalents of B to 1 equivalent of W. 145. The method of embodiment 144, wherein the composite matrix is formed with a W to B ratio of 1:11.6. 146. The method of embodiment 145, wherein the composite matrix has oxidation resistance below 450° C. 147. The method of embodiment 144, wherein the composite matrix is formed with a W to B ratio of 1:10.5. 148. The method of embodiment 144, wherein the composite matrix is formed with a W to B ratio of 1:9.0. 149. The method of embodiment 148, wherein the composite matrix has oxidation resistance below 465° C. 150. The method of any one of embodiments 123-149, wherein the composite matrix has a density at or above 4.0 g/cm3. 151. The method of any one of embodiments 123-140, wherein x is from 0.001 to 0.999. 152. The method of embodiment 151, wherein x is 0.201-0.400. 153. The method of embodiment 151, wherein x is 0.401-0.600. 154. The method of embodiment 151, wherein x is 0.601-0.800. 155. The method of embodiment 151, wherein x is 0.801-0.999. 156. The method of any one of embodiments 151-155, wherein the ratio of B to W and M is less than 5 equivalents of B to 1 equivalent of W and M. 157. The method of any one of embodiments 151-156, wherein M is at least one element selected from the group: vanadium (V), chromium (Cr), niobium (Nb), molybdenum (Mo), tantalum (Ta), and rhenium (Re). 158. The method of embodiment 157, wherein the composite matrix comprises $W_{1-x}V_xB_4$. 159. The method of embodiment 157, wherein the composite matrix comprises $W_{1-x}Cr_xB_4$. 160. The method of embodiment 157, wherein the composite matrix comprises $W_{1-x}Nb_xB_4$. 161. The method of embodiment 157, wherein the composite matrix comprises $W_{1-x}Mo_xB_4$. 162. The method of embodiment 157, wherein the composite matrix comprises $W_{1-x}Ta_xB_4$. 163. The method of embodiment 157, wherein the composite matrix comprises $W_{1-x}Re_xB_4$. 164. A composite matrix comprising a compound of Formula (I): $W_{1-x}M_xB_4$(I) wherein: W is tungsten; B is boron; M is at least one element selected from the group: vanadium (V), chromium (Cr), niobium (Nb), molybdenum (Mo), tantalum (Ta), and rhenium (Re); and x is from 0.001 to 0.999. 165. The composite matrix of embodiment 144, wherein x is 0.001-0.200. 166. The composite matrix of embodiment 144, wherein x is 0.201-0.400. 167. The composite matrix of embodiment 144, wherein x is 0.401-0.600. 168. The composite matrix of embodiment 144, wherein x is 0.601-0.800. 169. The composite matrix of embodiment 144, wherein x is 0.801-0.999. 170. The composite matrix of any one of embodiments 144-149, wherein the composite matrix is $W_{1-x}V_xB_4$. 171. The composite matrix of any one of embodiments 144-149, wherein the composite matrix is $W_{1-x}Cr_xB_4$. 172. The composite matrix of any one of embodiments 144-149, wherein the composite matrix is $W_{1-x}Nb_xB_4$. 173. The composite matrix of any one of embodiments 144-149, wherein the composite matrix is $W_{1-x}Mo_xB_4$. 174. The composite matrix of any one of embodiments 144-149, wherein the composite matrix is $W_{1-x}Ta_xB_4$. 175. The composite matrix of any one of embodiments 144-149, wherein the composite matrix is $W_{1-x}Re_xB_4$. 176. A composite matrix produced by the method of embodiments 1-56, 57-89, 90-121, or 122-162. 177. A tool comprising a composite matrix produced by the method of embodiments 1-56, 57-89, 90-121, or 122-162.

What is claimed is:

1. A method of preparing a composite matrix comprising: combining an amount of W with an amount of B and M to generate the composite matrix, wherein the ratio of B to W and M is less than 12 equivalents of B to 1 equivalent of W and M; and the composite matrix comprises:

$$W_{1-x}M_xB_4$$

wherein:
W is tungsten;
B is boron;
M is at least one element selected from the group of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), yttrium (Y), osmium (Qs), iridium (Ir), lithium (Li) and aluminum (Al);
and
x is from 0.001 to 0.999,
wherein combining the amount of W with the amount of B and M to generate the composite matrix comprises i) mixing W, B, and M to generate a mixture, ii) transferring the mixture to a reaction vessel, and iii) heating the mixture to a temperature sufficient to induce a reaction between W, B, and M to generate the composite matrix, and
wherein the mixture is heated from about 5 minutes to about 540 minutes.

2. The method of claim 1, wherein at least 10% of the atmospheric oxygen is removed from the reaction vessel.

3. The method of claim 1, wherein the mixture is heated to a temperature between about 1200° C. and about 2200° C.

4. The method of claim 1, wherein the mixture is heated by an induction furnace or conventional furnace.

5. The method of claim 1, wherein M is at least one element selected from the group: vanadium (V), chromium (Cr), niobium (Nb), molybdenum (Mo), tantalum (Ta), and rhenium (Re).

6. The method of claim 1, wherein the ratio of B to W and M is less than 10 equivalents of B to 1 equivalent of W and M.

7. The method of claim 1, wherein the reaction vessel and mixture is separated by a metal liner.

8. The method of claim 1, wherein the composite matrix is a crystalline solid characterized by at least one X-ray diffraction pattern reflection at a 2 theta of about 24.2.

9. The method of claim 8, wherein the crystalline solid is further characterized by at least one X-ray diffraction pattern reflection at a 2 theta of about 34.5 or about 45.1.

10. A tool comprising a composite matrix produced by the method of claim 1.

11. The method of claim 1, wherein the mixture is heated for about 180 minutes to about 540 minutes.

12. The method of claim 1, wherein the mixture is heated by hot pressing.

13. The method of claim 1, wherein the mixture is heated by plasma spark sintering.

14. The method of claim 1, wherein the mixture is heated by electric arc furnace.

15. The method of claim 1, wherein reaction vessel is coated with electrically insulating material.

16. The method of claim 15, wherein the electrically insulating material is hexagonal boron nitride.

17. The method of claim 5, wherein x is from 0.001 to 0.200.

18. The method of claim 5, wherein x is from 0.201 to 0.400.

19. The method of claim 1, wherein the density of the composite matrix is 4.0-9.0 g/cm$^3$.

* * * * *